(12) United States Patent
Yamauchi et al.

(10) Patent No.: US 6,231,804 B1
(45) Date of Patent: May 15, 2001

(54) MODIFIED OLEFIN (CO)POLYMER COMPOSITION, PROCESS FOR PREPARING THE SAME, AND MODIFIED OLEFIN (CO) POLYMER COMPOSITION MOLDING

(75) Inventors: Akira Yamauchi; Shingo Kikukawa, both of Ichihara; Jun Saito, Kimitsu; Hitoshi Sato, Chiba, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/402,327

(22) PCT Filed: Mar. 26, 1998

(86) PCT No.: PCT/JP98/01387

§ 371 Date: Oct. 1, 1999

§ 102(e) Date: Oct. 1, 1999

(87) PCT Pub. No.: WO98/44042

PCT Pub. Date: Oct. 8, 1998

(30) Foreign Application Priority Data

Apr. 2, 1997 (JP) .......................................................... 9-84222
Apr. 17, 1997 (JP) .................................................... 9-115245

(51) Int. Cl.[7] .............................. C08L 23/02; C08L 23/26; C08K 5/14; C08F 4/654; C08J 3/28

(52) U.S. Cl. .......................... 264/488; 264/478; 264/494; 264/496; 522/112; 522/124; 522/125; 522/28; 522/29; 522/157; 522/161; 525/240; 525/268; 526/114; 526/116; 526/127; 526/136; 526/137; 526/139; 526/140; 526/141; 526/142; 526/158; 526/159

(58) Field of Search ..................................... 525/240, 268; 526/114, 116, 127, 136, 137, 139, 140, 141, 142, 158, 159; 522/157, 161, 125, 124, 112, 28, 29; 264/496, 494, 488, 478

(56) References Cited

U.S. PATENT DOCUMENTS

| | | |
|---|---|---|
| 3,808,206 | 4/1974 | Fleming et al. . |
| 3,911,202 * | 10/1975 | Stine et al. . |
| 4,460,757 | 7/1984 | Sato et al. . |
| 4,628,073 * | 12/1986 | Fisher . |
| 4,634,740 | 1/1987 | Fujita et al. . |
| 4,923,935 | 5/1990 | Sano et al. . |
| 5,047,485 | 9/1991 | DeNicola, Jr. . |
| 5,155,080 | 10/1992 | Elder et al. . |
| 5,252,529 | 10/1993 | Ueda et al. . |
| 5,260,384 | 11/1993 | Morimoto et al. . |
| 5,266,607 * | 11/1993 | Lucas et al. . |
| 5,382,631 | 1/1995 | Stehling et al. . |
| 5,387,568 | 2/1995 | Ewen et al. . |
| 5,468,440 | 11/1995 | McAlphin et al. . |
| 5,494,982 | 2/1996 | Nakacho et al. . |
| 5,519,100 | 5/1996 | Ewen et al. . |
| 5,539,067 | 7/1996 | Parodi et al. . |
| 5,561,092 | 10/1996 | Ewen et al. . |
| 5,614,457 | 3/1997 | Ewen et al. . |
| 5,629,254 | 5/1997 | Fukuoka et al. . |
| 5,639,818 * | 6/1997 | Lee et al. . |
| 5,663,249 | 9/1997 | Ewen et al. . |
| 5,741,861 * | 4/1998 | Yamomoto et al. . |
| 5,854,354 | 12/1998 | Ueda et al. . |
| 6,004,897 | 12/1999 | Imuta et al. . |
| 6,257,408 | 5/2000 | Winter et al. . |

FOREIGN PATENT DOCUMENTS

| | | |
|---|---|---|
| 32 46 447 | 7/1983 | (DE) . |
| 0 315 481 | 5/1989 | (EP) . |
| 398 350 | 11/1990 | (EP) . |
| 534 119 | 3/1993 | (EP) . |
| 536 503 | 4/1993 | (EP) . |
| 538 749 | 4/1993 | (EP) . |
| 0 577 321 A1 | 1/1994 | (EP) . |
| 579 510 | 1/1994 | (EP) . |
| 580 033 | 1/1994 | (EP) . |
| 0 611 780 A2 | 8/1994 | (EP) . |
| 714 923 | 6/1996 | (EP) . |
| 0 856 526 | 8/1998 | (EP) . |
| 0 864 589 | 9/1998 | (EP) . |
| 1 483 960 | 8/1977 | (GB) . |
| 52-136247 | 11/1977 | (JP) . |
| 53-091954 | 8/1978 | (JP) . |

(List continued on next page.)

OTHER PUBLICATIONS

Takaya Mise et al., "Excellent Stereoregular Isotactic Polymerizations of Propylene with $C_2$–Symmetric Silylene–Bridged Metallocene Catalysts" *Chemistry Letters*, pp. 1853–1856, 1989.

Walter Spaleck et al., "The Influence of Aromatic Substituents on the Polymerization Behavior of Bridged Zirconocene Catalysts" *Organometallics*, vol. 13, No. 3 (American Chemical Society), pp. 954–963, 1994.

Kaminsky, *Metallocene Catalysts*, Dec. 7–8–9, 1992.

A. Zambelli, et al., Model Compounds and C NMR Observation of Stereosequences of Polypropylene, 1975, pp. 687–689, Macromolecules vol. 8, No. 5.

A. Zambelli, et al., Carbon–13 Observations of the Stereochemical Configuration of Polypropylene, 1973, pp. 925–926, Macromolecules vol. 6, No. 6.

*Primary Examiner*—Susan W. Berman
(74) *Attorney, Agent, or Firm*—Merchant & Gould P.C.

(57) ABSTRACT

A high molecular weight polyethylene prepared by preliminary polymerization is added at the time of main polymerization of an olefin, for example, propylene, to prepare an olefin (co)polymer composition comprising the above high molecular weight polyethylene finely dispersed as fine particles in the polyolefin, such as polypropylene, and a cross-linked structure is formed in the olefin (co)polymer composition. This process can provide a modified olefin (co) polymer composition improved in the strength in a molten state in terms of melt tension or the like and in crystallization temperature and excellent in moldability such as high-speed producibility, and a molded modified olefin (co)polymer composition excellent in properties such as heat resistance and rigidity.

30 Claims, No Drawings

FOREIGN PATENT DOCUMENTS

| | | |
|---|---|---|
| 55-123637 | 9/1980 | (JP) . |
| 56-3356 | 1/1981 | (JP) . |
| 56-110707 | 9/1981 | (JP) . |
| 57-031945 | 2/1982 | (JP) . |
| 57-63310 | 4/1982 | (JP) . |
| 57-63311 | 4/1982 | (JP) . |
| 57-65738 | 4/1982 | (JP) . |
| 57-151602 | 9/1982 | (JP) . |
| 58-017104 | 2/1983 | (JP) . |
| 58-83006 | 5/1983 | (JP) . |
| 58-138712 | 8/1983 | (JP) . |
| 58-225143 | 12/1983 | (JP) . |
| 59-093711 | 5/1984 | (JP) . |
| 60-81211 | 5/1985 | (JP) . |
| 60-139710 | 7/1985 | (JP) . |
| 61-064704 | 4/1986 | (JP) . |
| 61-130310 | 6/1986 | (JP) . |
| 61-151204 | 7/1986 | (JP) . |
| 61-152754 | 7/1986 | (JP) . |
| 62-1738 | 1/1987 | (JP) . |
| 62-025106 | 2/1987 | (JP) . |
| 62-104810 | 5/1987 | (JP) . |
| 62-104811 | 5/1987 | (JP) . |
| 62-104812 | 5/1987 | (JP) . |
| 63-12606 | 1/1988 | (JP) . |
| 1-156305 | 6/1989 | (JP) . |
| 2-135243 | 5/1990 | (JP) . |
| 2-298536 | 12/1990 | (JP) . |
| 2-305811 | 12/1990 | (JP) . |
| 3-12406 | 1/1991 | (JP) . |
| 3-12407 | 1/1991 | (JP) . |
| 3-050239 | 3/1991 | (JP) . |
| 3-220208 | 9/1991 | (JP) . |
| 4-055410 | 2/1992 | (JP) . |
| 5-63373 | 3/1993 | (JP) . |
| 5-140224 | 6/1993 | (JP) . |
| 5-0222122 | 8/1993 | (JP) . |
| 5-255436 | 10/1993 | (JP) . |
| 5-255437 | 10/1993 | (JP) . |
| 6-184371 | 7/1994 | (JP) . |
| 6-206923 | 7/1994 | (JP) . |
| 6-206939 | 7/1994 | (JP) . |
| 6-234812 | 8/1994 | (JP) . |
| 7-188317 | 7/1995 | (JP) . |
| 7-188336 | 7/1995 | (JP) . |
| 7-238114 | 9/1995 | (JP) . |
| 8-217816 | 8/1996 | (JP) . |
| 8-217889 | 8/1996 | (JP) . |
| 10-017736 | 1/1998 | (JP) . |
| WO 88/05792 | 8/1988 | (WO) . |
| WO 88/05793 | 8/1988 | (WO) . |
| WO 94/28034 | 12/1994 | (WO) . |

\* cited by examiner

MODIFIED OLEFIN (CO)POLYMER COMPOSITION, PROCESS FOR PREPARING THE SAME, AND MODIFIED OLEFIN (CO) POLYMER COMPOSITION MOLDING

TECHNICAL FIELD

The present invention relates to a modified olefin (co) polymer composition, a molded modified olefin (co)polymer composition and a method for producing the composition and the molded composition. More specifically, the present invention relates to a modified olefin (co)polymer composition having a high melting strength such as a melt tension or the like, a high crystallization temperature and that is excellent in molding property, and a molded modified olefin (co)polymer composition that is excellent in properties such as rigidity, heat resistance or the like, and a method for producing the same.

BACKGROUND OF THE INVENTION

Since polyolefin such as polypropylene, high-density polyethylene, straight chain low-density polyethylene or the like is excellent in mechanical properties, chemical resistance or the like and is extremely useful in respect of a balance with economy, it has been used in a variety of molding fields. However, the polyolefin has a small melt tension and low crystallization temperature. For this reason, molding properties such as hollow molding, foaming molding, extruding molding and the like are poor and the high-speed productivity of a molded product has limitations in various molding methods other than the above.

A method for causing polypropylene to react with organic peroxide and a crosslinking auxiliary agent in the molten state (see, for example, Japanese Patent Application Publication (Tokko Sho) Nos. 59-93711 and 61-152754 and the like), a method for causing low decomposition temperature peroxide to react with semi-crystalline polypropylene in the absence of oxygen to produce polypropylene that has a free end long chain branch and does not contain gel (Japanese Patent Application Publication (Tokko Hei) No. 2-298536) and the like have been disclosed as a method for increasing the melt tension and crystallization temperature of polypropylene.

In addition, a method in which semi-crystalline polypropylene is irradiated with electron rays to produce polypropylene that has a free end long chain branch and does not contain gel has been considered (Japanese Patent Application Publication (Tokko Hei) No. 2-298536).

A composition in which polyethylene or polypropylene having different limiting viscosity or molecular weight is blended and a method for producing such a composition by multistep polymerization has been proposed as another method for improving melt viscoelasticity such as melt tension or the like.

There have been disclosed a method for adding 2 to 30 parts by weight of superhigh molecular weight polypropylene to 100 parts by weight of ordinary polypropylene and extruding a product at a temperature that is a melting point or higher and not higher than 210° C. (Japanese Patent Application Publication (Tokko Sho) No. 61-28694), an extrusion sheet made of polypropylene that is obtained by a multistep polymerizing method and contains two components having a limiting viscosity ratio between them of 2 or more and different molecular weights each other (Japanese Patent Application Publication (Tokko Hei) No. 1-12770), a method for producing a polyethylene composition that contains 1 to 10 weight % of polyethylene having high viscosity-average molecular weight and that comprises three kinds of polyethylene having different viscosity-average molecular weights each other by a melting and kneading method or a multistep polymerizing method (Japanese Patent Application Publication (Tokko Sho) No. 62-61057), a method of polymerizing not less than 0.05 weight % and less than 1 weight % of superhigh molecular weight polyethylene having a limiting viscosity of 20 dl/g or more by a multistep polymerizing method by using a highly active titanium-vanadium solid catalyst component (Japanese Patent Application Publication (Tokko Hei) No. 5-79683), a method for polymerizing 0.1 to 5 weight % of superhigh molecular weight polyethylene having a limiting viscosity of 15 dl/g or more by using a highly active titanium catalyst component that has preliminarily been polymerized with 1-butene or 4-methyl-1-pentene by a multistep polymerizing method using a polymerization reactor having a special arrangement (Japanese Patent Application Publication (Tokko Hei) No. 7-8890) and the like.

Furthermore, there have been disclosed a method for producing polypropylene having a high melt tension in which propylene is polymerized by using a preliminary polymerization catalyst that is prepared by preliminarily polymerizing ethylene and a polyene compound on a supported titanium-containing catalyst solid component and an organic aluminum compound catalyst component (Japanese Patent Application Publication (Tokkai Hei) No. 5-222122), and a method for producing an ethylene-α-olefin copolymer having high melt tension by using an ethylene-containing preliminary polymerization catalyst that contains polyethylene having a limiting viscosity of 20 dl/g or more that is obtained by preliminarily polymerizing only ethylene by using the same catalyst component (Japanese Patent Application Publication (Tokko Hei) No. 4-55410).

As mentioned above, according to various compositions and producing methods proposed in the prior art, the melt tension can be enhanced to some extent. However, some problems, for example, residual odor, crystallization temperature, thermal stability, irradiation rate of electron rays and the like remain to be unsolved.

The process for producing high molecular weight polyolefin should be modified for the following reasons. More specifically, it is difficult closely to control the amount of olefin (co)polymerization in order to produce a small amount of polyolefin having a high molecular weight in the multistep polymerizing method that is to be incorporated into the ordinary olefin (co)polymerizing step for the main polymerization; and in addition, it is necessary to lower the polymerization temperature so as to produce polyolefin having a sufficiently high molecular weight. Furthermore, the productivity of the final polyolefin composition is lowered.

In the method for preliminarily polymerizing the polyene compound, it is necessary to prepare the polyene compound separately. In the method for preliminarily polymerizing polyethylene, the dispersion property of the preliminarily polymerized polyethylene to the polyolefin composition that is to be finally obtained is ununiform. Consequently, further improvement should be required in respect of the stability of the polyolefin composition.

Furthermore, as a method for improving the rigidity and heat resistance or the like of propylene polymer, a method for irradiating a molding including propylene polymer, which is formed by the copolymerization of propylene and alkenylsilane, with ionizing radiation so as to obtain a propylene polymer molding that is excellent in heat resistance and rigidity (Japanese Patent Application Publication (Tokko Hei) No. 3-50239).

As mentioned above, in the prior art, the polyolefin such as polypropylene polymer or the like has problems to be solved. Examples of problems include: the insufficient improvement in strength such as melt tension or the like at the time of melting and in crystallization temperature; the insufficient improvement in heat resistance, rigidity and the like; insufficient in irradiation efficiency of ionizing radiation; a problem in terms of odor or thermal stability; a problem in which a comonomer other than olefin is required and the like. Furthermore, when such a polymer is produced, the productivity is required to be improved.

It is therefore an object of the present invention to provide a modified olefin (co)polymer composition having a high melt tension and a high crystallization temperature, which is suitable for hollow molding, foaming molding and extruding molding and also capable of exhibiting a high speed productivity in the other various molding methods as well as the above; a molded modified olefin (co)polymer composition that is excellent in physical properties such as heat resistance and rigidity and the like; and a method for producing the modified olefin (co)polymer composition and the molded modified olefin (co)polymer composition.

DISCLOSURE OF INVENTION

As a result of investigations to accomplish the above-mentioned objects, the present inventors have found that olefin is main (co)polymerized by using a preliminarily activated catalyst formed by letting a catalyst for producing polyolefin support a small amount of polyolefin, which is the same kind of olefin as the olefin to be main (co)polymerized, having a specific limiting viscosity and a small amount of polyolefin having a specific high limiting viscosity, thereby obtaining an olefin (co)polymer composition having a high melt tension and high crystalline temperature, and then a cross-linked structure is formed in the above-mentioned olefin (co)polymer composition so as to obtain a modified olefin (co)polymer composition that is excellent in molding property in which the strength at the time of melting, which is represented by the melt tension or the like, or crystalline temperature are further improved, and a molded modified (co)polymer composition that is excellent in physical properties such as heat resistance, rigidity or the like. Thus, the present invention has been completed.

The first invention of the present invention provides a modified olefin (co)polymer composition comprising: an olefin (co)polymer composition containing;

(a) 0.01 to 5.0 parts by weight of high-molecular weight polyethylene that is an ethylene homopolymer or an ethylene-olefin copolymer containing 50 weight % or more of ethylene polymerization units and has a limiting viscosity [$\eta_E$] measured in tetralin at 135° C. in the range from 15 to 100 dl/g, and (b) 100 parts by weight of an olefin (co)polymer other than the high molecular weight polyethylene;

(c) wherein the high molecular weight polyethylene is finely dispersed as fine particles having a numerical average particle size of 1 to 5000 nm, and a cross-linked structure is formed in the olefin (co)polymer composition.

It is preferable in the above-mentioned composition of the present invention that the cross-linked structure is formed by irradiating the olefin (co)polymer composition with ionizing radiation and then heating the irradiated olefin (co)polymer composition.

It is preferable in the above-mentioned composition of the present invention that the ionizing radiation is at least one selected from the group consisting of a γ ray and an electron ray, and a dose of the ionizing radiation is in the range from 0.1 to 1000 KGy.

Furthermore, it is preferable in the above-mentioned composition of the present invention that the heating temperature is in the range from 60 to 350° C. More preferably, the temperature is in the range from 80 to 300° C. The preferable heating time is about 1 minute to 2 hours. With such a heat treatment, a radical generated due to the irradiation treatment with ionizing radiation can be extinguished. Residual radicals easily deteriorate the polymer. However, if the radicals are extinguished, the stability of the polymer can be obtained.

Furthermore, it is further preferable in the above-mentioned composition of the present invention that the cross-linked structure is formed by mixing a radical generator with the olefin (co)polymer composition and by melting and kneading the mixed composition.

It is preferable in the above-mentioned composition of the present invention that the olefin (co)polymer composition is mixed with 0.001 to 0.5 parts by weight of a radical generator with respect to 100 parts by weight of the olefin (co)polymer other than the high-molecular weight polyethylene. Furthermore, it is preferable in the above-mentioned composition of the present invention that the melting and kneading temperature is in the range from 150 to 300° C.

It is preferable in the above-mentioned composition of the present invention that the numerical average particle size of the high molecular weight polyethylene is in the range from 10 to 500 nm.

Furthermore, it is preferable in the above-mentioned composition of the present invention that the limiting viscosity [$\eta$] of the olefin (co)polymer composition measured in tetralin at 135° C. is in the range from 0.2 to 10 dl/g.

Furthermore, it is preferable in the above-mentioned composition of the present invention that the olefin (co) polymer other than the high molecular weight polyethylene is at least one selected from the group consisting of a propylene homopolymer and a propylene-olefin copolymer containing 50 weight % or more of propylene polymerization units.

Furthermore, it is preferable in the above-mentioned composition of the present invention that the high molecular weight polyethylene is added before or during production of the olefin (co)polymer other than the high molecular weight polyethylene.

Furthermore, it is preferable in the above-mentioned composition of the present invention that the olefin (co) polymer other than the high molecular weight polyethylene is at least one polymer selected from the group consisting of a propylene homopolymer and a propylene-olefin copolymer containing 50 weight % or more of propylene polymerization units, and the modified olefin (co)polymer composition satisfies the following formula (1):

$$\log(MS) > 4.24 \times \log[\eta_T] - 0.950 \quad \text{(formula 1)}$$

wherein MS denotes a melt tension at 230° C. and [$\eta_T$] denotes a limiting viscosity measured at 135° C. of the modified olefin (co)polymer composition.

Furthermore, it is preferable in the above-mentioned composition of the present invention that the olefin (co) polymer other than the high molecular weight polyethylene is a propylene homopolymer or a propylene-olefin copolymer containing 50 weight % or more of propylene polymerization units, and the modified olefin (co)polymer composition satisfies the following formula (2):

$$4.24 \times log[\eta_T] + 0.60 > log(MS) > 4.24 \times log[\eta_T] - 0.950 \quad \text{(formula 2)}$$

wherein MS denotes a melt tension at 230° C. and $[\eta_T]$ denotes a limiting viscosity measured at 135° C. of the modified olefin (co)polymer composition.

Furthermore, it is preferable in the above-mentioned composition of the present invention that the olefin (co)polymer other than the high molecular weight polyethylene is an ethylene homopolymer or an ethylene-olefin copolymer containing 50 weight % or more of ethylene polymerization units.

Furthermore, it is preferable in the above-mentioned composition of the present invention that 0.001 to 2 parts by weight of at least one stabilizer selected from the group consisting of a phenolic antioxidant and a phosphoric antioxidant is added with respect to 100 parts by weight of the modified olefin (co)polymer composition.

Furthermore, it is preferable in the composition of the present invention that the olefin (co)polymer other than the high molecular polyethylene is either a propylene homopolymer or a propylene-olefin copolymer containing 50 weight % or more of propylene polymerization units and that the composition of the present invention is produced by main (co)polymerizing either propylene alone or propylene and other olefin(s) having 2 to 12 carbon atoms in the presence of a preliminarily activated catalyst including a polyolefin producing catalyst formed by the combination of a transition metal compound catalyst component, 0.01 to 1000 mol of organic metal compound (AL1) of a metal selected from the group consisting of metals that belong to group I (for example, Li, Na, etc.), group II (for example, Mg, etc.), group XII (for example, Zn, etc.) and group XIII (for example, Al, etc.) of the periodic table (published in 1991) with respect to 1 mol of the transition metal atom and 0 to 500 mol of an electron donor (E1) with respect to 1 mol of the transition metal atom; and the polyethylene supported by this catalyst.

Furthermore, it is preferable in the composition of the present invention that the composition of the present invention is produced by main (co)polymerizing either propylene alone or propylene and other olefin(s) having 2 to 12 carbon atoms in the presence of olefin main (co)polymerization catalyst including, in addition to a preliminarily activated catalyst, an organic aluminum compound (AL2) of a metal selected from the group consisting of metals that belong to group I, group II, group XII and group XIII of the periodic table (published in 1991) in total amount of (AL2) and the organic metal compound (AL1) included in the preliminarily activated catalyst of 0.05 to 5,000 mol with respect to 1 mol of the transition metal atom; and an electron donor (E2) in the total amount of (E2) and the electron donors (E1) included in the preliminarily activated catalyst of 0 to 3000 mol with respect to 1 mol of the transition metal atom in the preliminarily activated catalyst.

Furthermore, it is preferable in the composition of the present invention that the preliminarily activated catalyst supports polyethylene having a limiting viscosity $[\eta_A]$ measured in tetralin at 135° C. of 15 to 100 dl/g in an amount of 0.001 to 5000 g per gram of the transition metal compound catalyst component.

Furthermore, it is preferable in the composition of the present invention that the preliminarily activated catalyst supports polypropylene that is a homopolymer or a propylene-olefin copolymer containing 50 weight % or more of propylene polymerization units, which has a limiting viscosity $[\eta_B]$ measured in tetralin at 135° C. of less than 15 dl/g, in an amount of 0.01 to 100 gram per gram of the transition metal compound catalyst component; and polyethylene having a limiting viscosity $[\eta_A]$ measured in tetralin at 135° C. of 15 to 100 dl/g in an amount of 0.001 to 5000 g per gram of the transition metal compound catalyst component.

Furthermore, it is preferable in the above-mentioned composition of the present invention that the olefin (co)polymer other than the high molecular weight polyethylene is produced in an amount of the catalyst of 0.01 to 1000 mmol in the conversion of the transition metal atom in the catalyst with respect to 1 liter of olefin (co)polymerization volume including either propylene alone or propylene and other olefin(s).

Furthermore, it is preferable in the above-mentioned composition of the present invention that the olefin (co)polymer other than the high molecular weight polyethylene is a mixture of the below mentioned (a) and (b):

(a) olefin (co)polymer being either a propylene homopolymer or a propylene-olefin copolymer containing 50 weight % or more of propylene polymerization units, which is produced by main (co)polymerizing either propylene alone or propylene and other olefin(s) having 2 to 12 carbon atoms in the presence of the preliminarily activated catalyst including the polyolefin producing catalyst formed by the combination of a transition metal compound catalyst component, 0.01 to 1000 mol of organic metal compound (AL1) of a metal selected from the group consisting of metals that belong to group I, group II, group XII and group XIII of the periodic table (published in 1991) with respect to 1 mol of the transition metal atom and 0 to 500 mol of an electron donor (E1) with respect to 1 mol of the transition metal atom; and (b) a propylene homopolymer or a propylene-olefin copolymer containing 50 weight % or more of ethylene polymerization units.

Next, the method for producing a modified olefin (co)polymer composition of the present invention is characterized by comprising the steps of producing an olefin (co)polymer composition by (co)polymerizing olefin in the presence of a preliminarily activated catalyst comprising a polyolefin producing catalyst formed by the combination of a transition metal compound catalyst component, 0.01 to 1000 mol of organic metal compound (AL1) of a metal selected from the group consisting of a metal that belong to group I (for example Li, Na, etc.), a metal that belongs to group II (for example Mg, etc.), a metal that belongs to group XII (for example Zn, etc.) and a metal that belongs to group XIII (for example Al, etc.) of the periodic table published in 1991 with respect to 1 mol of the transition metal atom and 0 to 500 mol of an electron donor (E1) with respect to 1 mol of the transition metal atom; and a polyethylene supported by this catalyst, being an ethylene homopolymer or an ethylene-olefin copolymer containing 50 weight % or more of ethylene polymerization units, and having a limiting viscosity $[\eta]$ measured in tetralin of 135° C. of 15 to 100 dl/g in an amount of 0.01 to 5,000 g per gram of the transition metal compound catalyst component: and forming a cross-linked structure in the olefin (co)polymer composition.

It is preferable in the above-mentioned method that the step of forming the cross-linked structure includes an irradiation with ionization radiation followed by heating.

It is preferable in the above-mentioned method that the ionizing radiation is at least one selected from the group consisting of a γ ray and an electron ray, and a dose of the ionizing radiation is in the range from 0.1 to 1000 KGy.

It is preferable in the above-mentioned method that the heating temperature is in the range from 60 to 350° C. More preferably, the temperature is in the range from 80 to 300° C. The preferable heating time is about 1 minute to 2 hours. With such a heat treatment, radical generated due to irradiation treatment with ionizing radiation can be extinguished. Residual radicals easily deteriorate the polymer. However, if radicals are extinguished, the stability of the polymer can be obtained.

Furthermore, it is preferable in the above-mentioned method that the cross-linked structure is formed by mixing a radical generator with the olefin (co)polymer composition and by melting and kneading the mixed composition.

It is preferable in the above-mentioned method that the melting and kneading temperature is in the range from 150 to 300° C.

It is preferable in the above-mentioned method that the olefin to be (co)polymerized is propylene alone or a combination of propylene and olefin(s) having 2 to 12 carbon atoms, and the olefin (co)polymer is a propylene homopolymer or a propylene-olefin copolymer comprising propylene and olefin(s) having 2 to 12 carbon atoms and containing 50 weight % or more of propylene polymerization units.

Furthermore, it is preferable in the above-mentioned method that, in addition to the preliminarily activated catalyst, (a) an organic aluminum compound (AL2) in the total amount of (AL2) and the organic aluminum compounds (AL1) included in the preliminarily activated catalyst of 0.05 to 5000 mol with respect to 1 mol of the transition metal atom in the preliminarily activated catalyst, and (b) an electron donor (E2) in the total amount of (E2) and the electron donors (E1) included in the preliminarily activated catalyst of 0 to 3000 mol with respect to 1 mol of the transition metal atom in the preliminarily activated catalyst are added.

Furthermore, it is preferable in the above-mentioned method that the amount of the catalyst is 0.01 to 1000 mmol converted into the transition metal atom in the catalyst for 1 liter of olefin (co)polymerization volume.

Furthermore, it is preferable in the above-mentioned method that the preliminarily activated catalyst further comprises a polypropylene supported by the catalyst in addition to the polyethylene, being a propylene homopolymer or a propylene-olefin copolymer containing 50 weight % or more of propylene polymerization units and having a limiting viscosity [$\eta_B$] measured in tetralin at 135° C. of less than 15 dl/g and being in an amount of 0.01 to 100 g per gram of the transition metal compound catalyst component.

Furthermore, it is preferable in the above-mentioned method that the amount of the catalyst is 0.01 to 1000 mmol converted into the transition metal atom in the catalyst for 1 liter of olefin (co)polymerization volume.

Furthermore, it is preferable in the above-mentioned method that an olefin(s) having 2 to 12 carbon atoms is main (co)polymerized in the presence of the preliminarily activated catalyst for (co)polymerizing olefin, which is obtained by a method of letting the transition metal compound catalyst component support a polyolefin (B) and polyolefin (A), the method comprising:

(a) a preliminary (co)polymerization step of (co)polymerizing olefin in the presence of the polyolefin producing catalyst formed by the combination of the transition metal compound catalyst component, 0.01 to 1000 mol of the organic metal compound (AL1) of the metal selected from the group consisting of metals that belong to group I, group II, group XII and group XIII of the periodic table published in 1991 with respect to 1 mol of the transition metal atom and 0 to 500 mol of the electron donor (E1) with respect to 1 mol of the transition metal atom, and thereby producing 0.01 to 100 g of the polyolefin (B) having a limiting viscosity [η] measured in tetralin at 135° C. of less than 15 dl/g per gram of the transition metal compound catalyst component; and (b) a sequent preliminary activating (co)polymerization step of (co)polymerizing olefin and producing 0.01 to 5,000 g of the polyolefin (A) having a limiting viscosity [η] measured in tetralin of 135° C. of 15 to 100 dl/g per gram of the transition metal compound catalyst component.

Furthermore, it is preferable in the above-mentioned method that olefin is main (co)polymerized in the presence of:

(a) a preliminarily activated catalyst for (co)polymerizing olefin, which is obtained by a method of letting the transition metal compound catalyst component support the polyolefin (B) and polyolefin (A), the method comprising: the preliminary (co)polymerization step of (co)polymerizing olefin in the presence of the polyolefin producing catalyst formed by the combination of the transition metal compound catalyst component, 0.01 to 1000 mol of the organic metal compound (AL1) of the metal selected from the group consisting of metals that belong to group I, group II, group XII and group XIII of the periodic table published in 1991 with respect to 1 mol of the transition metal atom and 0 to 500 mol of the electron donor (E1) with respect to 1 mol of the transition metal atom and thereby producing 0.01 to 100 g of the polyolefin (B) having the limiting viscosity [η] measured in tetralin at 135° C. of less than 15 dl/g per gram of the transition metal compound catalyst component; and the sequent preliminary activation (co)polymerization step of (co)polymerizing olefin(s) and producing 0.01 to 5,000 g of the polyolefin (A) having the limiting viscosity [η] measured in tetralin of 135° C. of 15 to 100 dl/g per gram of the transition metal compound catalyst component;

(b) the organic metal compound (AL2) of the metal selected from the group consisting of metals that belong to group I, group II, group XII and group XIII of the periodic table published in 1991 in the total amount of (AL2) and the organic metal compounds (AL1) included in the preliminarily activated catalyst of 0.05 to 5,000 mol with respect to 1 mol of the transition metal atom in the preliminarily activated catalyst; and (c) a catalyst for (co)polymerizing olefin(s) comprising the electron donor (E2) in the total amount of (E2) and the electron donors (E1) included in the preliminarily activated catalyst of 0 to 3000 mol with respect to 1 mol of the transition metal atom in the preliminarily activated catalyst.

Furthermore, it is preferable that the above-mentioned method includes the step of further adding 0.001 to 2 parts by weight of at least one stabilizer selected from the group consisting of a phenolic antioxidant and a phosphoric antioxidant with respect to 100 parts by weight of the modified olefin (co)polymer composition.

Furthermore, an olefin (co)polymer obtained by a known method can be added in an amount of 0 to 10000 parts by weight with respect to 100 parts by weight of the modified olefin (co)polymer composition obtained by the above-mentioned method.

Furthermore, the modified olefin (co)polymer composition can be mixed with the olefin (co)polymer.

Next, the molded modified olefin (co)polymer composition is a molded product obtained by any one of the above-mentioned modified olefin (co)polymer compositions. Any known molding methods may be employed.

Furthermore, the molded modified olefin (co)polymer composition of the present invention can be obtained by using an olefin (co)polymer composition comprising:

(a) 0.01 to 5.0 parts by weight of high molecular weight polyethylene that is an ethylene homopolymer or an ethylene-olefin copolymer containing 50 weight % or more of ethylene polymerization units and has a limiting viscosity $[\eta_E]$ measured in tetralin at 135° C. of 15 to 100 dl/g, (b) 100 parts by weight of an olefin (co)polymer other than the high molecular weight polyethylene, and (c) the high molecular weight polyethylene being finely dispersed as fine particles having a numerical average particle size of 1 to 5000 nm, wherein the molding is irradiated with ionizing radiation.

According to the above-mentioned explanation, the high-molecular weight polyethylene prepared by preliminary polymerization is added at the time of the main polymerization of olefin, for example, polypropylene so as to prepare an olefin (co)polymer composition comprising the above high-molecular polyethylene finely dispersed as fine particles in the polyolefin, such as polypropylene, and a cross-linked structure is formed in the olefin (co)polymer composition by a method of irradiating the composition with electron rays and then heating, or a method of adding radical generators and thereby melting and kneading. This process can provide a modified olefin (co)polymer composition improved in the strength at the time of melting in terms of melt tension or the like and in crystallization temperature and having an excellent molding property such as high-speed producibility, a molded modified olefin (co)polymer composition excellent in physical properties such as heat resistance and rigidity, and a method for producing the same.

BEST MODE FOR CARRYING OUT THE INVENTION

In the specification, the terms "polyolefin" and "olefin (co)polymer" refer to olefin (co)polymers including an olefin homopolymer having 2 to 12 carbon atoms, an olefin random copolymer comprising at least two kinds of olefin polymerization units, and an olefin block copolymers comprising at least two kinds of olefin polymerization units. Moreover, the terms "polyethylene" and "ethylene (co) polymer" refer to an ethylene (co)polymers including an ethylene homopolymer, an ethylene-olefin random copolymer containing 50 weight % or more of ethylene polymerization units, and an ethylene-olefin block copolymer containing 50 weight % or more of ethylene polymerization units. The terms "polypropylene" and "propylene (co) polymer" refer to propylene copolymers including a propylene homopolymer, propylene-olefin random copolymers containing 50 weight % or more of propylene polymerization units, and a propylene-olefin block copolymer containing 50 weight % or more of propylene polymerization units.

Furthermore, the terms "polyolefin composition" and "olefin (co)polymer composition" refer to a mixture of polyolefins that are different from each other in the polymerization unit, the molecular weight, the randomness, the blocking unit and the like.

The molded modified olefin (co)polymer composition and modified olefin (co) polymer composition of the present invention can be obtained by providing a step of forming a cross-linked structure in the specific olefin (co)polymer composition.

The olefin (co)polymer composition before the cross-linked structure is formed can be obtained by (co) polymerizing olefin by using a preliminary activated catalyst or a catalyst for (co)polymerizing olefin which can be obtained as a result of preliminary activation peculiar to the present invention. The preliminarily activated catalyst, catalyst for (co)polymerizing olefin, olefin (co)polymerization and olefin (co)polymer composition and the like will be explained hereinafter.

The term "preliminary activation" means the activation of a catalyst for producing polyolefin prior to the main (co) polymerization of olefin. The preliminary activation is performed by preliminary activating (co)polymerizing olefin in the presence of a catalyst for producing polyolefin to let the catalyst support olefin.

The preliminarily activated catalyst for (co)polymerizing olefin of the present invention is a catalyst that is preliminarily activated by letting a polyolefin producing catalyst including a transition metal compound catalyst component that has conventionally been used, an organic metal compound and if required an electron donor support a small amount of polyolefin (B) that has a certain limiting viscosity and is to be main-(co)polymerized and a small amount of polyolefin (A) having a certain high limiting viscosity.

The transition metal compound catalyst component can be any known polyolefin producing catalyst components containing a transition metal compound catalyst component as a main component. In particular, a solid catalyst component is preferably used among the known catalyst components in terms of manufacture.

Examples of the solid catalyst component include titanium-containing solid catalyst component containing a titanium trichloride composition as a main component (Japanese Patent Application Publication (Tokko Sho) Nos. 56-3356, 59-28573, 63-66323, etc.), titanium-containing supported catalyst components including titanium, magnesium, halogen and electron donor are contained as essential components, in which a magnesium compound is supported by titanium tetrachloride (Japanese Patent Application Publication (Tokkai Sho) Nos. 62-104810, 62-104811, 62-104812, 57-63310, 57-63311, 58-83006, 58-138712, etc.), and the like.

Furthermore, a transition metal compound having at least one π electron conjugated ligand can be used as a transition metal compound catalyst component. It is preferable that the transition metal at this time is selected from Zr, Ti, Hf, V, Nb, Ta and Cr.

Specific examples of the π electron conjugated ligands include a ligand having an η-cyclopentadienyl structure, an η-benzene structure, an η-cycloheptatrienyl structure, or an η-cyclooctatetraene structure. In particular, the ligand having an η-cyclopentadienyl structure is preferred.

Examples of the ligand having an η-cyclopentadienyl structure include a cyclopentadienyl group, an indenyl group, a fluorenyl group and the like. These groups may be substituted with a hydrocarbon group such as an alkyl group, an aryl group and an aralkyl group; a silicon substituted a hydrocarbon group such as a trialkylsilyl group; a halogen atom; an alkoxy group; an aryloxy group; a chain alkylene group and a cyclic alkylene group; and the like.

Furthermore, when the transition metal compound includes two or more of π electron conjugated ligands, two of the π electron conjugated ligands may be cross-linked through an alkylene group, a substituted alkylene group, a cycloalkylene group, a substituted cycloalkylene group, a substituted alkylidene group, a phenylene group, a silylene group, a substituted dimethylsilylene group, a germyl group, and the like.

At this time, the transition metal catalyst component may include, in addition to at least one π electron conjugated ligand, a hydrocarbon group such as an alkyl group, a cycloalkyl group, an aryl group and an aralkyl group; a silicon substituted hydrocarbon group; an alkoxy group; an aryloxy; a substituted sulfonato group; an amidosilylene group; an amidoalkylene group; and the like. Moreover, a bivalent group such as an amidosilylene group and an amidoalkylene group may be bonded to the π electron conjugated ligand.

The transition metal compound catalyst component having at least one π electron conjugated ligand that is generally referred to as metallocene can be used as a compound supported by a fine particle support. As the fine particle support, an inorganic or organic compound in the form of a granular or spherical fine particle solid having a particle size of 5 to 300 μm, preferably 10 to 200 μm can be used.

Examples of the inorganic compound used as the support include $SiO_2$, $Al_2O_3$, MgO, $TiO_2$, ZnO or the like, or the mixture thereof. Among them a compound that includes $SiO_2$ or $Al_2O_3$ is preferably used.

Furthermore, examples of the organic compound used as the support include a polymer or copolymer of α-olefin having 2 to 12 carbon atoms such as ethylene, propylene, 1-butene, 4-methyl-1-pentene or the like, or a polymer or a copolymer of styrene or styrene derivatives.

Examples of the organic metal compound (AL1) include a compound having an organic group of a metal selected from the group consisting of Group I, Group II, Group XII and Group XIII of the periodic table (1991), for example, an organic lithium compound, an organic sodium compound, an organic magnesium compound, an organic zinc compound, an organic aluminum compound, or the like. The organic metal compound can be used in combination with the transition metal compound catalyst component.

In particular, the organic aluminum compound expressed by a chemical formula: $AlR^1_p R^2_q X_{(3-(p+q))}$ (where $R^1$ and $R^2$ denote of the same type or different types of a hydrocarbon group such as an alkyl group, a cycloalkyl group, an aryl group or the like, or an alkoxy group; X denotes a halogen atom; and p and q denote positive integers satisfying the following formula: $0<p+q\leq 3$) preferably can be used.

Specific examples of the organic aluminum compound include trialkyl aluminum such as trimethyl aluminum, triethyl aluminum, tri-n-propyl aluminum, tri-n-butyl aluminum, tri-i-butyl aluminum, tri-n-hexyl aluminum, tri-i-hexyl aluminum, tri-n-octyl aluminum or the like, dialkyl aluminum monohalides such as diethyl aluminum chloride, di-n-propyl aluminum chloride, di-i-butyl aluminum chloride, diethyl aluminum bromide, diethyl aluminum iodide or the like, dialkyl aluminum hydrides such as diethyl aluminum hydride or the like, alkyl aluminum sesquihalides such as ethyl aluminum sesquichloride or the like, monoalkyl aluminum dihalide such as ethyl aluminum dichloride or the like, and alkoxyalkyl aluminum such as diethoxymonoethyl aluminum or the like. Trialkyl aluminum or dialkyl aluminum monohalide preferably is used. These organic aluminum compounds can be used alone or in combinations of two or more.

Furthermore, aluminoxane compound can be used as the organic metal compound (AL1). The aluminoxane means an organic aluminum compound expressed by the following general formulae 3 or 4.

(formula 3)

(formula 4)

In the above-mentioned formulae, $R^3$ denotes a hydrocarbon group having 1 to 6 carbon atoms, preferably 1 to 4 carbon atoms, more specifically, a compound that is an alkyl group such as a methyl group, an ethyl group, a propyl group, a butyl group, an isobutyl group, a pentyl group, a hexyl group or the like, an alkenyl group such as an allyl group, a 2-methylallyl group, a propenyl group, an isopropenyl group, a 2-methyl-1-propenyl group, a butenyl group or the like, a cycloalkyl group such as a cyclopropyl group, a cyclobutyl group, a cyclopentyl group, a cyclohexyl group or the like, and an aryl group or the like. Among these, an alkyl group is most preferable, and $R^3$ may be either the same or different. Furthermore, p is an integer of 4 to 30, preferably 6 to 30, and most preferably 8 to 30.

Furthermore, another example of the organic metal compound (AL1) includes boron based organic metal compound. The boron based organic metal compound can be obtained by reacting the transition metal compound with an ionic compound containing boron atom.

As the transition metal compound used at this time, the same transition metal compound catalyst component as that used when preliminarily activated catalyst for (co) polymerizing olefin (co)polymer is produced can be used. However, the transition metal compound catalyst component having at least one π electron conjugated ligand that is generally referred to as metallocene is preferably used.

Specific examples of the ionic compound containing a boron atom include tetrakis (pentafluorophenyl) triethylammonium borate, tetrakis (pentafluorophenyl) tri-n-butylammonium borate, tetrakis (pentafluorophenyl) triphenylammonium borate, tetrakis (pentafluorophenyl) methylanilinium borate, tetrakis (pentafluorophenyl) dimethylanilinium borate, tetrakis (pentafluorophenyl) trimethylanilium borate, or the like.

The boron based organic metal compound also can be obtained by bringing the transition metal compound into contact with Lewis acid containing boron atom.

As the transition metal compound used at this time, the same transition metal compound catalyst component as that used when the preliminarily activated catalyst for (co) polymerizing olefin is produced can be used. However, the transition metal compound catalyst component having at least one π electron conjugated ligand that is generally referred to as metallocene is preferably used.

Furthermore, as the Lewis acid containing a boron atom, the compounds expressed by general formula 5 below can be used.

$BR^4R^5R^6$ (formula 5)

(where $R^4$, $R^5$, and $R^6$ represent a phenyl group that may have a substituent such as a fluorine atom, a methyl group, trifluorophenyl group or the like, or a fluorine atom independently).

Specific examples of the compound expressed by the above-mentioned chemical formula include tri(n-butyl)

boron, triphenyl boron, tris[3,5-bis(trifluoromethyl)phenyl] boron, tris[(4-fluoromethyl) phenyl]boron, tris(3,5-difluorophenyl) boron, tris(2,4,6-trifluorophenyl) boron, tris (pentafluorophenyl) boron, or the like. Among these, tris (pentafluorophenyl) boron is particularly preferable.

The electron donor (E1) is used for the purpose of regulating the generation speed and/or the stereoregularity of polyolefin, if necessary.

Examples of the electron donor (E1) include an organic compound having any of oxygen, nitrogen, sulfur and phosphorus in the molecules such as ethers, alcohols, esters, aldehydes, fatty acids, ketones, nitriles, amines, amides, ureas and thioureas, isocyanate, azo compounds, phosphines, phosphites, hydrogen sulfides, thioethers, neoalcohols, and the like, silanols, and an organic silicon compound having Si—O—C bonds in the molecules, and the like.

Examples of ethers include dimethyl ether, diethyl ether, di-n-propyl ether, di-n-butyl ether, di-i-amyl ether, di-n-pentyl ether, di-n-hexyl ether, di-i-hexyl ether, di-n-octyl ether, di-i-octyl ether, di-n-dodecyl ether, diphenyl ether, ethylene glycol monoethyl ether, diethylene glycol dimethyl ether, tetrahydrofuran, or the like. Examples of alcohols include methanol, ethanol, propanol, butanol, pentanol, hexanol, octanol, 2-ethyl hexanol, allyl alcohol, benzyl alcohol, ethylene glycol, glycerin, or the like. Examples of phenols include phenol, cresol, xylenol, ethyl phenol, naphthol, or the like.

Examples of esters include monocarboxylic acid ester such as methyl methacrylate, methyl formate, methyl acetate, methyl butyrate, ethyl acetate, vinyl acetate, n-propyl acetate, i-propyl acetate, butyl formate, amyl acetate, n-butyl acetate, octyl acetate, phenyl acetate, ethyl propionate, methyl benzoate, ethyl benzoate, propyl benzoate, butyl benzoate, octyl benzoate, 2-ethylhexyl benzoate, methyl toluylate, ethyl toluylate, methyl anisate, ethyl anisate, propyl anisate, phenyl anisate, ethyl cinnamate, methyl naphthoate, ethyl naphthoate, propyl naphthoate, butyl naphthoate, 2-ethylhexyl naphthoate, ethyl phenylacetate or the like, aliphatic polycarboxylic acid ester such as diethyl succinate, diethyl methylmalonate, diethyl butylmalonate, dibutyl maleate, diethyl butylmalate or the like, and aromatic polycarboxylic acid ester such as monometyl phthalate, dimetyl phthalate, dietyl phthalate, di-n-propyl phthalate, mono-n-butyl phthalate, di-n-butyl phthalate, diisobutyl phthalate, di-n-heptyl phthalate, di-2-ethylhexyl phthalate, di-n-octyl phthalate, diethyl isophthalate, dipropyl isophthalate, dibutyl isophthalate, di-2-ethylhexyl isophthalate, diethyl terephthalate, dipropyl terephthalate, dibutyl terephthalate, diisobutyl naphthalene-dicarboxylate or the like.

Examples of aldehyde include acetaldehyde, propionaldehyde, benzaldehyde or the like. Examples of carboxylic acids include monocarboxylic acid such as formic acid, acetic acid, propionic acid, butyric acid, oxalic acid, succinic acid, acrylic acid, maleic acid, valeric acid, benzoic acid, and acid anhydride such as benzoic anhydride, phthalic anhydride and tetrahydrophthalic anhydride. Examples of ketones include acetone, methylethyl ketone, methylisobutyl ketone, benzophenone, or the like.

Examples of a nitrogen-containing compound include nitriles such as acetonitrile, benzonitrile, or the like, amine such as methyl amine, diethyl amine, tributyl amine, triethanolamine, β-(N,N-dimethylamino)ethanol, pyridine, quinoline, α-picoline, 2,4,6-trimethyl pyridine, 2,2,5,6-tetramethyl piperidine, 2,2,5,5-tetramethyl pyrrolidine, N,N,N',N'-tetramethyl ethylenediamine, aniline, dimethyl aniline, or the like, amides such as formamide, hexamethyl phosphoric acid triamide, N,N,N',N',N''-pentamethyl-N'-β-dimethylaminomethyl phosphoric acid triamide, octamethyl pyrophosphoramide or the like, urea such as N,N,N',N',-tetramethyl urea or the like, isocyanates such as phenyl isocyanate, toluyl isocyanate or the like, and an azo compound such as azobenzene or the like.

Examples of a phosphorus containing compound include phosphines such as ethylphosphine, triethylphosphine, tri-n-octylphosphine, triphenylphosphine, triphenylphosphine oxide or the like, phosphines such as dimethyl phosphite, di-n-octylphosphine, triphenylphosphine, triphenylphosphine oxide or the like; and phosphites such as dimethyl phosphite, di-n-octyl phosphite, triethyl phosphite, tri-n-butyl phosphite, triphenyl phosphite or the like.

Examples of the sulfur containing compounds include thioethers such as diethyl thioether, diphenyl thioether, methyl phenyl thioether or the like; and thioalcohols such as ethyl thioalcohol, n-propyl thioalcohol, thiophenol or the like. Furthermore, examples of the organic silicon compounds include silanols such as trimethyl silanol, triethyl silanol, triphenyl silanol or the like; and organic silicon compounds having an Si—O—C bond in the molecules, for example, trimethylmethoxysilane, dimethyldimethoxysilane, methylphenyldimethoxysilane, diphenyldimethoxysilane, methyltrimethoxysilane, vinyltrimethoxysilane, phenyltrimethoxysilane, trimethylethoxysilane, dimethyldiethoxysilane, diisopropyldimethoxysilane, diisobutyldimethoxysilane, diphenyldiethoxysilane, methyltriethoxysilane, ethyltriethoxysilane, vinyltriethoxysilane, butyltriethoxysilane, phenyltriethoxysilane, ethyltriisopropoxysilane, vinyltriacetoxysilane, cyclopentylmethyldimethoxysilane, cyclopentyltrimethoxysilane, dicyclopentyldimethoxysilane, cyclohexylmethyldimethoxysilane, cyclohexyltrimethoxysilane, dicyclohexyldimethoxysilane, 2-norbornylmethyldimethoxysilane or the like.

These electron donors can be used either alone or in combination of two or more.

In the preliminarily activated catalysts for (co) polymerizing olefin, a polyolefin (A) has a limiting viscosity [η] measured in tetralin at 135° C. of 15 to 100 dl/g, preferably of 17 to 50 dl/g. Furthermore, the polyolefin (A) is a homopolymer of olefin having 2 to 12 carbon atoms or copolymer thereof, preferably a homopolymer of ethylene or propylene, or an ethylene-olefin copolymer or propylene-olefin copolymer comprising ethylene or a propylene polymerization units at the range of 50 weight % or more, preferably 70 weight % or more, further preferably 90 weight % or more. It is preferable that the polyolefin (A) is an ethylene homopolymer or ethylene-olefin copolymer comprising ethylene polymerization units at the range of 50 weight % or more, preferably 70 weight % or more, further preferably 90 weight % or more.

Too small limiting viscosity [η] of the polyolefin (A) cannot provide a sufficient melt tension and a sufficient crystallization temperature for the polyolefin composition to be obtained as a final product by main (co)polymerization. Moreover, the upper limit for the limiting viscosity [η] is not particularly specified. However, a preferable upper limit can be about 100 dl/g in view of manufacturing efficiency and the following reason, that is, when the limiting viscosity [η] of polyolefin (A) is too different from that of the polyolefin composition to be obtained as a final product, polyolefin (A) cannot be well dispersed in the polyolefin composition, which may cause a melt tension to be insufficient. The polyolefin (A) has to be polymerized so that the limiting viscosity [η] of polyolefin (A) measured in tetralin at 135° C. is at least 15 dl/g. For the reason, an ethylene homopolymer or an ethylene-olefin copolymer comprising ethylene polymerization units at the range of 50 weight % or more is preferable in view of polymerization efficiency.

Though the density of polyolefin (A) is not particularly specified, a density of 880 to 980 g/liter is preferred.

The amount of polyolefin (A) supported by a transition metal compound catalyst component is 0.01 to 5000 g per gram of the catalyst component, preferably 0.05 to 2000 g, more preferably 0.1 to 1000 g. Less than 0.01 g of polyolefin (A) per gram of the catalyst component is not preferable because it cannot provide the polyolefin composition, which is to be obtained as a final product by main (co) polymerization of olefin, with a sufficient melt tension and a sufficient crystallization temperature. More than 5000 g of polyolefin (A) per gram of the catalyst component is not preferable because it is not effective and uniformity of the final product of olefin composition is in apprehension of deterioration.

Examples of preferable olefin to be (co)polymerized as polyolefin (A) include ethylene, propylene, 1-butene, 1-pentene, 1-hexene, 1-octene, 1-decene, 4-methyl-1-pentene and 3-methyl-1-pentene. In particular, ethylene, propylene, 1-butene and 4-methyl-1-pentene are particularly preferable.

On the other hand, polyolefin (B) is the same as polyolefin to be main (co)polymerized, and has a limiting viscosity [η] measured in tetralin at 135° C. of less than 15 dl/g. Polyolefin (B) provides polyolefin (A) in a polyolefin composition to be obtained as a final product with good dispersion into the composition. Therefore, the limiting viscosity [η] of polyolefin (B) is preferred to be lower than that of polyolefin (A) and to be higher than that of a polyolefin composition as a final product.

On the other hand, the amount of polyolefin (B) supported by a catalyst component of a transitional metal compound is suitably 0.01 to 100 g per gram of the catalyst component. In other words, the amount is preferred to be 0.001 to 1 weight % based on the obtained polyolefin composition as a reference. Too small amount of polyolefin (B) prevents polyolefin (A) from dispersing in the intended polyolefin composition. Moreover, too large amount of polyolefin (B) causes the saturation of dispersion and further lowers production efficiency of the preliminarily activated catalysts for olefin polymerization.

The preliminarily activated catalysts for (co)polymerizing olefin are produced by a preliminary activating treatment that lets a transition metal compound catalyst component support polyolefins (B) and (A). The preliminary activating treatment comprises the steps of a preliminary (co) polymerization step of (co)polymerizing olefin to be main (co)polymerized so as to produce polyolefin (B) in the presence of polyolefin producing catalyst formed by the combination of the transition metal compound catalyst component containing at least a titanium compound, an organic metal compound (AL1) and an electron donor (E1) that is used if required, and the subsequent preliminary activating polymerization step of (co)polymerizing olefin so as to produce polyolefin (A).

In the preliminary activating treatment, the transition metal compound catalyst component, the organic metal compound (AL1) of 0.01 to 1000 mol, preferably 0.05 to 500 mol, with respect to 1 mol of transition metal in the catalyst component and the electron donor (E1) of 0 to 500 mol, preferably 0 to 100 mol per 1 mol of the transition metal contained in the catalyst component are combined to be used.

Polyolefins (B) and (A) are supported by the transition metal compound catalyst component by the following method. First, polyolefin (B) in an amount of 0.01 to 100 g per gram of a transition metal compound catalyst component is formed by the preliminary polymerization with 0.01 to 500 g of olefin to be main (co)polymerized in the presence of the polyolefin producing catalyst of 0.001 to 5000 mmol, preferably 0.01 to 1000 mmol, by the conversion of transition metal atom in the catalyst component per liter of olefin polymerization volume. In this process, no solvent or a solvent of at most 100 g per gram of a transition metal compound catalyst component is used. Then polyolefin (A) in an amount of 0.01 to 5000 g per gram of a transition metal compound catalyst component is formed by the polymerization with 0.01 to 10000 g of olefin. The term "polymerization volume" in this specification refers to a volume of the liquid phase part in a polymerization reactor for liquid phase polymerization or a volume of the gas phase part in a polymerization reactor for gas phase polymerization.

The amount of the transition metal compound catalyst component for use is preferably within the above-mentioned range in view of efficient and controlled (co)polymerization rate of polyolefin (A). Too small amount of the organic metal compound (AL1) for use makes the (co)polymerization rate inappropriately slow. Moreover, too large amount of the organic metal compound is not preferable because the sufficient (co)polymerization rate cannot be expected and furthermore the polyolefin composition obtained as a final product is apt to contain much residue of the organic metal compound (AL1). In addition, too large amount of the electron (E1) donor for use makes the polymerization rate inappropriately slow. Too large amount of the solvent for use requires a large reaction container and makes it difficult to control and maintain the efficient (co)polymerization.

The preliminary activating treatment can be carried out in the liquid phase using solvents. Examples of the solvents include aliphatic hydrocarbons such as butane, pentane, hexane, peptane, octane, isooctane, decane, dodecane or the like; alicyclic hydrocarbons such as cyclopentane, cyclohexane, methylcyclohexane or the like; aromatic hydrocarbons such as toluene, xylene, ethylbenzene or the like; inert solvents such as gasoline fraction, hydrogenized diesel oil fraction or the like; and olefins per se. The preliminary activating treatment can be carried out also in the gas phase using no solvent.

In order to produce a polyolefin (A) having a high molecular weight and a limiting viscosity [η] of 15 to 100 dl/g, the preliminary activating treatment is preferably performed without using hydrogen, though the treatment can be performed in the presence of hydrogen.

The preliminary (co)polymerization for polyolefin to be main (co)polymerized is carried out at a condition for forming polyolefin (B) in an amount of 0.01 to 100 g per gram of a transition metal compound catalyst component, usually at −40 to 100° C. and 0.1 to 5 MPa for 1 minute to 24 hours. The preliminary activating (co)polymerization is carried out at a condition for forming 0.01 to 5000 g of polyolefin (A), preferably 0.05 to 2000 g, more preferably 0.1 to 1000 g per gram of a transition metal compound catalyst component. That condition is usually at a relatively low temperature such as −40 to 40° C., preferably −40 to 30° C., more preferably −40 to 20° C., and under the pressure of 0.1 to 5 MPa, preferably 0.2 to 5 MPa, further preferably 0.3 to 5 MPa for 1 minute to 24 hours, preferably 5 minutes to 18 hours, further preferably 10 minutes to 12 hours.

Furthermore, after the preliminary activating treatment is performed, an addition polymerization may be carried out by using the reacting amount of 0.01 to 100 g of olefin per gram of a transition metal compound catalyst component for the purpose of inhibiting the deterioration, which is caused by preliminary activating treatment, of the main (co) polymerization. In this case, the amount of the organic metal compound (AL1), electron donor (E1), solvent and olefin is within the same range as mentioned in terms of the (co) preliminary activating polymerization with olefin. However, the addition polymerization preferably is carried out in the presence of an electron donor in an amount of 0.005 to 10 mol, preferably 0.01 to 5 mol with respect to 1 mol of transition metal atom. The addition polymerization condition is suitably at −40 to 100° C. and 0.1 to 5 MPa for 1 minute to 24 hours.

The kind of the organic metal compounds (AL1), electron donors (E1) and solvents for the addition polymerization can be the same as those in the preliminary activating (co) polymerization. The kind of olefin for addition (co) polymerization is the same as the olefin to be main (co) polymerized.

The limiting viscosity [η] of polyolefin obtained by the addition polymerization is smaller than that of polyolefin (A). The polyolefin obtained by the addition polymerization is finally incorporated into polyolefin obtained after the main (co)polymerization.

In order to obtain the intended polyolefin composition, the preliminarily activated catalyst for (co)polymerizing olefin of the present invention can be used for the main (co) polymerization of olefin having 2 to 12 carbon atoms, either as it is or in combination with an organic metal compound (AL2) and an electron donor (E2).

The catalyst for main (co)polymerizing olefin comprises the above-mentioned preliminarily activated catalyst for (co)polymerizing olefin, an organic metal compound (AL2) and electron donor (E2). The total amount (AL1+AL2) of the organic metal compound (AL1) in the preliminarily activated catalyst for (co)polymerizing olefin and the organic metal component (AL2) for the polyolefin producing catalyst is 0.05 to 3000 mol, preferably 0.1 to 1000 mol per mol of the transition metal atom contained in the preliminarily activated catalyst. The total amount (E1+E2) of the electron donor (E1) in the preliminarily activated catalyst for (co)polymerizing olefin and electron donor (E2) for the polyolefin producing catalyst is 0 to 5000 mol, preferably 0 to 3000 mol per mol of the transition metal atom contained in the preliminarily activated catalyst.

When the total amount of the organic metal compounds (AL1+AL2) is too small, a reaction rate in the main (co) polymerization of olefin becomes too slow. On the other hand, too large amount of the organic metal compounds (AL1+AL2) is not efficient and not preferable because the desired (co)polymerization rate cannot be realized, and furthermore the residue of the organic metal compounds is increased in the obtained polyolefin composition. In addition, if the amount of the electron donors (E1+E2) is too large, the reaction rate of the main (co)polymerization of olefin is remarkably lowered.

In the catalyst for main (co)polymerizing olefin, for the kinds of the organic metal compound (AL2) and the electron donor (E2), which are used in addition to the preliminarily activated catalyst if necessary, the same as those previously described organic compound (AL1) and electron donor (E1) can be used. These may be used either alone or in combination of two or more. Furthermore, these may be the same as or different from those used in the preliminary activating treatment.

The olefin main (co)polymerization catalyst can be formed by a combination of a powder or a suspension including the powder, the organic metal compound (AL2) and, if required the electron donor (E2). The powder is formed by removing the solvent, unreacted olefin, unreacted organic metal compound (AL1) and electron donor (E1) from the preliminarily activated catalyst by filtration or decantation. Furthermore, the olefin main (co) polymerization catalyst also can be formed by a combination of another powder or a suspension including the another powder, the organic metal compound (AL2) and, if required the electron donor (E2). This powder is formed by evaporating and removing the solvent and unreacted olefin from the preliminarily activated catalyst by reduced pressure distillation or inert gas flow, etc.

Next, the polyolefin composition of the present invention is produced as follows. Olefin is (co)polymerized in the presence of the above-mentioned preliminarily activated catalyst for main (co)polymerizing olefin or an olefin main (co)polymerization catalyst. The amount of the preliminarily activated catalyst for main (co)polymerizing olefin or an olefin main (co)polymerization catalyst for use is 0.001 to 1000 mmol, preferably 0.005 to 500 mmol per liter of polymerization volume in conversion of the transition metal atom in the preliminarily activated catalyst for (co) polymerizing olefin. The above-defined range of the transition metal compound catalyst component enables efficient control of the olefin (co)polymerization rate.

The olefin can be polymerized by a known olefin (co) polymerization process: for example, a slurry polymerization in which olefin is (co)polymerized in an aliphatic hydrocarbon such as propane, butane, pentane, hexane, peptane, octane, isooctane, decane, dodecane or the like, an alicyclic hydrocarbon such as cyclopentane, cyclohexane, methylcyclohexane or the like, an aromatic hydrocarbon such as toluene, xylene, ethylbenzene or the like, or an inactive solvent such as gasoline fraction and hydrogenized diesel oil fraction etc.; a bulk polymerization in which olefin itself is used as a solvent; and a gas phase polymerization in which the olefin (co)polymerization is carried out in the gas phase; and liquid phase polymerization in which polyolefin produced by the (co)polymerization is in the form of liquid. Two or more of the above-mentioned polymerization processes can be combined.

An example of preferably polymerization conditions for the above processes include a polymerization temperature of 20 to 120° C., preferably 30 to 100° C., further preferably 40 to 100° C., a polymerization pressure of 0.1 to 5 MPa, preferably 0.3 to 5 Mpa. The processes are carried out by the continuous, semi-continuous or batch polymerization, and a polymerization time of 5 minutes to 24 hours. This condition can form polyolefin at an efficient and controlled reaction rate.

In the preferable embodiment of the method for producing the polyolefin composition of the present invention, the polymerization conditions are set in order to provide polyolefin formed in main (co)polymerization and polyolefin composition as a final product having a limiting viscosity [η] of 0.2 to 10 dl/g, preferably 0.7 to 5 dl/g and in order to adjust polyolefin (A) derived from the used preliminarily activated catalyst for (co)polymerizing olefin to be in the range from 0.01 to 5 weight % of the composition. Similarly to known methods for polymering olefin, the molecular weight of the (co)polymer can be adjusted by using hydrogen at the time of polymerization.

If the obtained polyolefin composition has a limiting viscosity [η] of less than 0.2 dl/g, the polyolefin molding obtained as a final product is deteriorated in mechanical properties. Furthermore, if the obtained polyolefin composition has a limiting viscosity [η] of more than 10 dl/g, the molding property is deteriorated.

On the other hand, when the amount of polyolefin (A) derived from the preliminarily activated catalyst for (co) polymerizing olefin is less than 0.01 weight % in the obtained polyolefin composition, the melt tension and crystallization temperature of the polyolefin composition are not sufficiently improved. Furthermore, more than 5 weight % of polyolefin (A) causes saturation of these effects, and further the uniformity of the polyolefin composition may be deteriorated.

The polyolefin formed by the main (co)polymerization not only can be an olefin homopolymer but also an olefin random copolymer or an olefin block copolymer including the range of 50 weight % or more of olefin polymerization units consisting of a main monomer. Preferably, the polyolefin is an olefin homopolymer, an olefin-random copolymer including the range of 90 weight % or more of olefin polymerization units consisting of a main monomer, or an olefin-block copolymer including the range of 70 weight % or more of olefin polymerization units consisting of a main monomer.

In the method for producing olefin composition of the present invention, olefin having 2 to 12 carbon atoms is preferred for polymerization in preparing the polyolefin composition. Examples of the olefin include ethylene, propylene, 1-butene, 1-pentene, 1-hexene, 1-octene, 1-decene, 4-methyl-1-pentene, 3-methyl-1-pentene or the like. In particular, ethylene, propylene, 1-butene, 4-methyl-1-pentene or the like are particularly preferred. These olefins can be used either alone or in combination of two or more.

Preferably, the polyolefin formed by the main (co) polymerization of olefin is a propylene homopolymer or a propylene-olefin copolymer including the range of 50 weight % or more of propylene polymerization units consisting of a main monomer. More preferably, the polyolefin is a propylene homopolymer, a propylene-olefin random copolymer including the range of 90 weight % or more of propylene polymerization units consisting of a main monomer, or a propylene-olefin block copolymer including the range of 70 weight % or more of propylene polymerization units consisting of a main monomer.

Preferably, the propylene (co)polymer has a crystallinity of 0.80 to 0.99, preferably 0.85 to 0.99, and more preferably 0.90 to 0.99, with respect to the isotactic pentad ratio (mmmm) measured by $^{13}$C-NMR (nuclear magnetic resonance spectrum). The isotactic pentad fraction (mmmm) has been proposed by A. Zambelli et al. (Macromolecules 6, 925 (1973)) and represents the isotactic fraction of the pentad units in the polypropylene (co)polymer molecular chains. To be specific, the $^{18}$C-NMR spectroscopic measurement is performed at 67.20 MHz, 130° C., using a mixing solution of o-dichlorobenzene/benzene bromide with a weight ratio of 8:2 and a polymer concentration of 20 weight % to obtain peaks. The isotactic pentad fraction (mmmm) was calculated in accordance with the assignment determination technique for the obtained peaks as proposed by A. Zambelli et al. (Macromolecules 8, 687 (1975)). As measuring equipment, for example, a JEOL-GX270 NMR measuring device (a product of NIHON DENSHI Co.) can be used.

After the main (co)polymerization of olefin is completed, a known process such as a catalyst inactivation treatment, a catalyst removing treatment and drying are performed if required. Thereafter, the intended polyolefin composition having a high melt tension and a high crystalline temperature is finally provided.

In the method for producing a polyolefin composition of the present invention, a high molecular weight polyolefin (A) is produced and uniformly dispersed in the obtained polyolefin composition. A necessary amount of the preliminarily activated catalyst for (co)polymerizing olefin can be prepared at a stretch. On the other hand, the main (co) polymerization is performed by a conventional olefin polymerization process. Therefore, similar productivity for producing polyolefin can be maintained to a usual production of polyolefin.

As mentioned above, the polyolefin composition prepared by using the preliminarily activated catalyst for (co) polymerizing olefin in the present invention has a high melt tension. It was found that when, for example, the polyolefin formed by main (co)polymerization is polypropylene, a melt tension (MS) and a limiting viscosity [η] measured in tetralin at 135° C. of the obtained polypropylene composition before modification satisfy the following relation formula:

$$log(MS) > 4.24 \times log[\eta] - 1.05.$$

The melt tension at 230° C. is a value (unit: cN) obtained by using MELT TENSION TESTER II (manufactured by TOYO SEIKI SEISAKU-SHO, Ltd), heating the olefin (co)polymer composition to 230° C. in the equipment, extruding the molten olefin (co)polymer composition through a nozzle of a diameter of 2.095 mm at the rate of 20 mm/minute to the air of 23° C. so as to make a strand, and measuring the tension of a thread like polypropylene composition when taking up the strand at a rate of 3.14 m/minute.

If necessary, various kinds of stabilizers can be further added to the obtained polyolefine composition. Hereinafter, polypropylene (PP) will be explained as an example.

In the present invention, phenolic stabilizers are added to the composition in order to improve thermal stability, melt tension and crystallization temperature of the composition.

The amount of the stabilizer for use is 0.001 to 2 parts by weight, preferably 0.005 to 1.5 parts by weight, particularly preferably 0.01 to 1 weight part with respect to 100 parts by weight of polypropylene (PP) composition in terms of realizing the above-mentioned effects of the stabilizer without inhibiting properties of the composition and from the viewpoint of the cost.

The phenolic stabilizers are not particularly limited but can be any of known phenolic stabilizers having a phenol structure. Specifically, the below mentioned compounds can be used.

Examples are 2,6-di-t-butyl-p-cresol, 2,6-di-t-butyl-4-ethylphenol, 2,6-dicyclohexyl-p-cresol, 2,6-diisopropyl-4-ethylphenol, 2,6-di-t-amyl-p-cresol, 2,6-di-t-octyl-4-n-propylphenol, 2,6-dicyclohexyl-4-n-octylphenol, 2-isopropyl-4-methyl-6-t-butylphenol, 2-t-butyl-4-ethyl-6-t-octylphenol, 2-isobutyl-4-ethyl-6-t-hexylphenol, 2-cyclohexyl-4-n-butyl-6-isopropylphenol, 2-t-butyl-6-(3'-t-butyl)-5'-methyl-2'hydroxybenzyl)-4-methylphenylacrylate, t-butylhydroquinone, 2,2'-methylenebis (4-methyl-6-t-butylphenol), 4,4'-butylidenebis (3-methyl-6-t-butylphenol), 4,4'-thiobis(3-methyl-6-t-butylphenol), 2,2'-thiobis(4-methyl-6-t-butylphenol), 4,4'-methylenebis (2,6-di-t-butylphenol), 2,2'-methylenebis [6-(1-methylcyclohexyl)-p-cresol], 2,2'-ethylidenebis (4,6-di-t-butylphenol), 2,2'-butylidenebis (2-t-butyl-p-cresol), 1,1,3-tris (2-methyl-4-hydroxy-5-t-butylphenyl) butane, triethyleneglycol-bis [3-(3-t-butyl-5-metyl-4-hydroxyphenyl) propionate], 1,6 -hexanediol-bis [3-(3,5-dit-butyl-4-hydroxyphenyl) propionate], 2,2-thiodiethylenebis [3-(3,5-di-t-butyl-4-hydroxyphenyl) propionate], n-octadecyl-3-(3',5'-di-t-butyl-4'-hydroxyphenyl) propionate, N,N'-hexamethylenebis (3,5-di-t-butyl-4-hydroxy-hydrocinnamide), 3,5-di-t-butyl-4-hydroxybenzylphosphonate-diethylester, 1,3,5-tris (2,6-dimetyl-3-hydroxy-4-t-butylbenzyl) isocyanurate, 1,3,5-tris [(3,5-di-t-butyl-4-hydroxyphenyl) propyonyloxyethyl] isocyanurate, 2,4-bis (n-octylthio)-6-(4-hydroxy-3,5-di-t-butylanilino)-1,3,5-triazine, tetrakis [methylene-3-(3,5-di-t-butyl-4-hydroxyphenyl) propionate]methane, bis (ethyl-3,5-di-t-butyl-4-hydroxybenzylphosphonate) calcium, bis (ethyl-3,5-di-t-butyl-4-hydroxybenzylphosphonate) nickel, N,N'-bis [3,5-di-t-butyl-4-hydroxyphenyl) propyonyl] hydrazine, 2,2'-methylenebis(4-methyl-6-t-butylphenol) terephthalate, 1,3,5-trimethyl-2,4,6-tris (3,5-di-t-butyl-4-hydroxybenzyl) benzene, 3,9-bis [1,1-dimethyl-2-{3-(3-t-butyl-4-hydroxy-5-methylphenyl) propionyloxy}ethyl]-2,4, 8,10-tetraoxaspiro [5,5]undecane, 2,2-bis [4-{2-(3,5-di-t-butyl-4-hydroxyhydrocinnamoyloxy)}ethoxyphenyl] propane, alkyl ester of β-(3,5-di-t-butyl-4-hydroxyphenyl) propionic acid, and the like.

In particular, preferred examples are 2,6-di-t-butyl-p-cresol, tetrakis [methylene-3-(3,5-di-t-butyl-4-hydroxyphenyl) propionate]methane, n-octadecyl-3-(3',5'-di-t-butyl-4'-hydroxyphenyl) propionate, 2-t-butyl-6-(3'-t-butyl-5'-methyl-2'-hydroxybenzyl)-4-methylphenylacrylate, 2,2'-ethylidenebis (4,6-di-t-butylphenyl), and the like. A phenolic stabilizer can be used solely, or two kinds or more of phenolic stabilizers can be combined for use.

In the present invention, a phosphoric antioxidant is blended as a component that displays high melt tension, high crystallization temperature of a polypropylene composition which should be obtained during molding, heat resistant oxidation properties, weather resistance, coloring prevention.

The blending amount is 0.001 to 2 parts by weight, more preferably 0.005 to 1.5 parts by weight, most preferably 0.01 to 1 weight part with respect to 100 parts by weight of a polypropylene composition (PP) in respect of the display of performance of the polypropylene composition according to the present invention and the cost of the antioxidant.

The phosphoric antioxidant used for the polypropylene composition according to the prior art can be utilized without restriction. More specifically, examples are as follows. The phosphoric antioxidant can be solely used, or two kinds or more of phosphoric antioxidants can be used together.

Examples of biphenylene-di-phosphonate are tetrakis (2,4-di-t-butylphenyl)-4,4'-biphenylene-di-phosphonate, tetrakis (2,4-di-t-amylphenyl)-4,4'-biphenylene-di-phosphonate, tetrakis (2,4-di-t-butyl-5-methylphenyl)-4,4'-biphenylene-di-phosphonate, tetrakis (2,6-di-t-butyl-4-methylphenyl)-4,4'-biphenylene-di-phosphonate, tetrakis (2,6-di-t-butyl-4-n-octadecyloxycarbonylethyl-phenyl)-4, 4'-biphenylene-di-phosphonate, tetrakis [2,6-di-t-butyl-4-(2',4'-di-t-butylphenoxycarbonyl)-phenyl]-4,4'-biphenylene-di-phosphonate, tetrakis(2,6-di-t-butyl-4-n-hexadecyloxycarbonyl-phenyl)-4,4'-biphenylene-di-phosphonate, bis [2,2'-methylene-bis (4-methyl-6-t-butylphenyl)]-4,4'-biphenylene-di-phosphonate, bis [2,2'-methylene-bis(4,6-di-t-butylphenyl)]-4,4'-biphenylene-di-phosphonate, bis (2,2'-ethylidene-bis (4-methyl-6-t-butylphenyl))-4,4'-biphenylene-di-phosphonate, bis [2,2'-ethylidene-bis (4,6-di-t-butylphenyl)]-4,4'-biphenylene-di-phosphonate, and the like.

Examples are catecyl-2,6-di-t-butyl-4-methylphenylphosphite, catecyl-2,4,6-tri-t-butylphenylphosphite, α-naphthylcatecylphosphite, 2,2'-methylenebis (4-methyl-6-t-butylphenyl)-2-naphthylphosphite, 4,4'-butylidene-bis (3-methyl-6-t-butylphenyl-di-tridecylphosphite), 1,1,3-tris (2-methyl-4-di-tridecylphosphite-5-t-butylphenyl) butane, trilauryltrithiophosphite, tricetyltrithiophosphite, 9,10-dihydro-9-oxa-10-phosphaphenanthrene-10-oxide, 10-hydroxy-9,10-dihydro-9-oxa-10-phosphaphenanthrene-10-oxide, triphenylphosphite, tris (nonylphenyl) phosphite, tris (2,4-di-nonylphenyl) phosphite, tris (mono-, or di-nonylphenyl) phosphite, tris (2,4-di-t-butylphenyl) phosphite, tris (2,6-di-t-butyl-4-methylphenyl) phosphite, and the like.

Examples of pentaerythritol-diphosphite are distearyl-pentaerythritol-diphosphite, diphenyl-pentaerythritol-diphosphite, bis (nonylphenyl)-pentaerythritol-diphosphite, bis (2,4-di-t-butylphenyl) pentaerythritol-diphosphite, bis (2,4-di-t-amylphenyl) pentaerythritol-diphosphite, bis (2,4-dicumylphenyl) pentaerythritol-diphosphite, bis (2,4-di-t-butyl-5-methylphenyl)-pentaerythritol-diphosphite, bis (2,6-di-t-butyl-4-methylphenyl) pentaerythritol-diphosphite, bis (2,6-di-t-butyl-4-s-butylphenyl) pentaerythritol-diphosphite, bis (2,4,6-tri-t-butylphenyl) pentaerythritol-diphosphite, bis (2,4,6-tri-t-amylphenyl) pentaerythritol-diphosphite, bis (2,6-di-t-butyl-4-n-octadecyloxycarbonylethyl-phenyl) pentaerythritol-diphosphite, bis [2,6-di-t-butyl-4-(2',4'-di-t-butylphenoxycarbonyl)-phenyl]pentaerythritol-diphosphite, bis (2,6-di-t-butyl-4-n-hexadecyloxycarbonyl-phenyl) pentaerythritol-diphosphite, and the like.

Examples of tetraoxaspiro[5.5]undecane-diphosphite are tetrakis (2,4-di-t-butylphenyl)-3,9-bis (1,1-dimethyl-2-hydroxyethyl)-2,4,8,10-tetraoxaspiro [5.5]undecane-diphosphite, tetrakis (2,4-di-t-amylphenyl)-3,9-bis (1,1-dimethyl-2-hydroxyethyl)-2,4,8,10-tetraoxaspiro [5.5] undecane-diphosphite, tetrakis (2,6-di-t-butyl-4-methylphenyl)-3,9-bis (1,1-dimethyl-2-hydroxyethyl)-2,4,8, 10-tetraoxaspiro [5.5]undecane-diphosphite, tetrakis (2,4,6-tri-t-butylphenyl)-3,9-bis (1,1-dimethyl-2-hydroxyethyl)-2, 4,8,10-tetraoxaspiro [5.5]undecane-diphosphite, tetrakis (2,4,6-tri-t-amylphenyl)-3,9-bis (1,1-dimethyl-2-hydroxyethyl)-2,4,8,10-tetraoxaspiro [5.5]undecane-diphosphite, tetrakis (2,6-di-t-butyl-4-n-octadecyloxycarbonylethyl-phenyl)-3,9-bis (1,1-dimethyl-2-hydroxyethyl)-2,4,8,10-tetraoxaspiro [5.5]undecane-diphosphite, tetrakis [2,6-di-t-butyl-4-(2',4'-di-t-butylphenoxycarbonyl-phenyl]-3,9-bis (1,1-dimethyl-2-hydroxyethyl)-2,4,8,10-tetraoxaspiro [5.5]undecane-diphosphite, tetrakis (2,6-di-t-butyl-4-n-hexadecyloxycarbonyl-phenyl)-3,9-bis (1,1-dimethyl-2-hydroxyethyl)-2,4,8,10-tetraoxaspiro [5.5]undecane-diphosphite, bis [2,2'-methylene-bis (4-methyl-6-t-butylphenyl)]-3,9-bis (1,1-dimethyl-2-hydroxyethyl)-2,4,8, 10-tetraoxaspiro [5.5]undecane-diphosphite, bis [2,2'-methylene-bis(4,6-di-t-butylphenyl)]-3,9-bis (1,1-dimethyl-2-hydroxyethyl)-2,4,8,10-tetraoxaspiro [5.5]undecane-diphosphite, bis [2,2'-methylene-bis (4,6-di-t-amylphenyl)]-3,9-bis (1,1-dimethyl-2-hydroxyethyl)-2,4,8,10-tetraoxaspiro [5.5]undecane-diphosphite, bis [2,2'-ethylidene-bis (4-methyl-6-t-butylphenyl)]-3,9-bis (1,1-dimetyl-2-hydroxyethyl)-2,4,8,10-tetraoxaspiro [5.5] undecane-diphosphite, bis [2,2'-ethylidene-bis (4,6-di-t-butylphenyl)]-3,9-bis (1,1-dimethyl-2-hydroxyethyl)-2,4,8, 10-tetraoxaspiro [5.5]undecane-diphosphite, bis [2,2'-ethylidene-bis (4,6-di-t-amylphenyl)]-3,9-bis (1,1-dimethyl-2-hydroxyethyl)-2,4,8,10-tetraoxaspiro [5,5]undecane-diphosphite, and the like.

Examples of 2,2'-bis (4,6-di-t-butylphenyl) phosphite are 2,2'-bis (4,6-di-t-butylphenyl) octylphosphite, 2,2'-bis (4,6-di-t-butylphenyl) nonylphosphite, 2,2'-bis (4,6-di-t-butylphenyl) laurylphosphite, 2,2'-bis (4,6-di-t-butylphenyl) tridecylphosphite, 2,2'-bis (4,6-di-t-butylphenyl) myristylphosphite, 2,2'-bis (4,6-di-t-butylphenyl) stearylphosphite, 2,2'-bis (4,6-di-t-butylphenyl) (2,4-di-t-butylphenyl)phosphite, 2,2'-bis (4,6-di-t-butylphenyl) (2,6-di-t-butyl-4-methylphenyl) phosphite, 2,2'-bis (4,6-di-t-butylphenyl) (2,4,6-tri-t-butylphenyl) phosphite, 2,2'-bis (4,6-di-t-butylphenyl) (2,6-di-t-butyl-4-n-octadecyloxycarbonylethyl-phenyl) phosphite, 2,2'-bis (4,6-di-t-butylphenyl) [2,6-di-t-butyl-4-(2',4'-di-t-butylphenoxycarbonyl)-phenyl]phosphite, 2,2'-bis(4,6-di-t-butylphenyl) (2,6-di-t-butyl-4-n-hexadecyloxycarbonyl-phenyl) phosphite, and the like.

Examples of 2,2'-methylene-bis (4-methyl-6-t-butylphenyl) phosphite are 2,2'-methylene-bis (4-methyl-6-t-butylphenyl)octylphosphite, 2,2'-methylene-bis (4-methyl-6-t-butylphenyl) nonylphosphite, 2,2'-methylene-bis (4-methyl-6-t-butylphenyl) laurylphosphite, 2,2'-methylene-bis (4-methyl-6-t-butylphenyl) tridecylphosphite, 2,2'-methylene-bis (4-methyl-6-t-butylphenyl) myristylphosphite, 2,2'-methylene-bis (4-methyl-6-t-butylphenyl) stearylphosphite, 2,2'-methylene-bis (4-methyl-6-t-butylphenyl) (2,4-di-t-butylphenyl) phosphite, 2,2'-methylene-bis (4-methyl-6-t-butylphenyl) (2,6-di-t-butyl-4-methylphenyl) phosphite, 2,2'-methylene-bis (4-methyl-6-t-butylphenyl) (2,4,6-tri-t-butylphenyl) phosphite, 2,2'-methylene-bis (4-methyl-6-t-butylphenyl) (2,6-di-t-butyl-4-n-octadecyloxycarbonylethyl-phenyl) phosphite, 2,2'-methylene-bis (4-methyl-6-t-butylphenyl) [2,6-di-t-butyl-4-(2',4'-di-t-butylphenoxycarbonyl)-phenyl] phosphite, 2,2'-methylene-bis (4-methyl-6-t-butylphenyl) (2,6-di-t-butyl-4-n-hexadecyloxycarbonyl-phenyl) phosphite, and the like.

Examples of 2,2'-methylene-bis (4,6-di-t-butylphenyl) phosphite are 2,2'-methylene-bis (4,6-di-t-butylphenyl) octylphosphite, 2,2'-methylene-bis (4,6-di-t-butylphenyl) nonylphosphite, 2,2'-methylene-bis (4,6-di-t-butylphenyl) laurylphosphite, 2,2'-methylene-bis (4,6-di-t-butylphenyl) tridecylphosphite, 2,2'-methylene-bis (4,6-di-t-butylphenyl) myristylphosphite, 2,2'-methylene-bis (4,6-di-t-butylphenyl) stearylphosphite, 2,2'-methylene-bis (4,6-di-t-butylphenyl) (2,4-di-t-butylphenyl) phosphite, 2,2'-methylene-bis (4,6-di-t-butylphenyl) (2,6-di-t-butyl-4-methylphenyl) phosphite, 2,2'-methylene-bis (4,6-di-t-butylphenyl) (2,4,6-tri-t-butylphenyl) phosphite, 2,2'-methylene-bis (4,6-di-t-butylphenyl) (2,6-di-t-butyl-4-n-octadecyloxycarbonylethyl-phenyl) phosphite, 2,2'-methylene-bis (4,6-di-t-butylphenyl) [2,6-di-t-butyl-4-(2',4'-di-t-butylphenoxycarbonyl)-phenyl]phosphite, 2,2'-methylene-bis (4,6-di-t-butylphenyl) (2,6-di-t-butyl-4-n-hexadecyloxycarbonyl-phenyl) phosphite, and the like.

Examples of 2,2'-methylene-bis (4,6-di-t-amylphenyl) phosphite are 2,2'-methylene-bis (4,6-di-t-amylphenyl) octylphosphite, 2,2'-methylene-bis (4,6-di-t-amylphenyl) stearylphosphite, 2,2'-methylene-bis (4,6-di-t-amylphenyl) (2,4-di-t-butylphenyl) phosphite, 2,2'-methylene-bis (4,6-di-t-amylphenyl) (2,6-di-t-butyl-4-methylphenyl) phosphite, 2,2'-methylene-bis (4,6-di-t-amylphenyl) (2,4,6-tri-t-amylphenyl) phosphite, 2,2'-methylene-bis(4,6-di-t-amylphenyl)(2,6-di-t-butyl-4-n-octadecyloxycarbonylethyl-phenyl) phosphite, 2,2'-methylene-bis (4,6-di-t-amylphenyl) [2,6-di-t-butyl-4-(2',4'-di-t-butylphenoxycarbonyl)-pheny] phosphite, 2,2'-methylene-bis (4,6-di-t-amylphenyl) (2,6-di-t-butyl-4-n-hexadecyloxycarbonyl-phenyl) phosphite, and the like.

Examples of 2,2'-ethylidene-bis (4-methyl-6-t-butylphenyl) phosphite are 2,2'-ethylidene-bis (4-methyl-6-t-butylphenyl) octylphosphite, 2,2'-ethylidene-bis (4-methyl-6-t-butylphenyl) nonylphosphite, 2,2'-ethylidene-bis (4-methyl-6-t-butylphenyl) laurylphosphite, 2,2'-ethylidene-bis (4-methyl-6-t-butylphenyl) tridecylphosphite, 2,2'-ethylidene-bis (4-methyl-6-t-butylphenyl) myristylphosphite, 2,2'-ethylidene-bis (4-methyl-6-t-butylphenyl) stearylphosphite, 2,2'-ethylidene-bis (4-methyl-6-t-butylphenyl) (2,4-di-t-butylphenyl) phosphite, 2,2'-ethylidene-bis (4-methyl-6-t-butylphenyl) (2,6-di-t-butyl-4-methylphenyl) phosphite, 2,2'-ethylidene-bis (4-methyl-6-t-butylphenyl) (2,4,6-tri-t-butylphenyl) phosphite, 2,2'-ethylidene-bis (4-methyl-6-t-butylphenyl) (2,6-di-t-butyl-4-n-octadecyloxycarbonylethyl-phenyl) phosphite, 2,2'-ethylidene-bis (4-methyl-6-t-butylphenyl) [2,6-di-t-butyl-4-(2',4'-di-t-butylphenoxycarbonyl)-phenyl]phosphite, 2,2'-ethylidene-bis (4-methyl-6-t-butylphenyl) (2,6-di-t-butyl-4-n-hexadecyloxycarbonyl-phenyl) phosphite, and the like.

Examples of 2,2'-ethylidene-bis (4,6-di-t-butylphenyl) phosphite are 2,2-ethylidene-bis (4,6-di-t-butylphenyl) octylphosphite, 2,2'-ethylidene-bis (4,6-di-t-butylphenyl) nonylphosphite, 2,2'-ethylidene-bis (4,6-di-t-butylphenyl) laurylphosphite, 2,2'-ethylidene-bis (4,6-di-t-butylphenyl) tridecylphosphite, 2,2'-ethylidene-bis (4,6-di-t-butylphenyl) myristylphosphite, 2,2'-ethylidene-bis (4,6-di-t-butylphenyl) stearylphosphite, 2,2'-ethylidene-bis (4,6-di-t-butylphenyl) (2,4-di-t-butylphenyl) phosphite, 2,2'-ethylidene-bis (4,6-di-t-butylphenyl) (2,6-di-t-butyl-4-methylphenyl) phosphite, 2,2'-ethylidene-bis (4,6-di-t-butylphenyl) (2,4,6-tri-t-butylphenyl) phosphite, 2,2'-ethylidene-bis (4,6-di-t-butylphenyl) (2,6-di-t-butyl-4-n-octadecyloxycarbonylethyl-phenyl) phosphite, 2,2'-ethylidene-bis (4,6-di-t-butylphenyl) [2,6-di-t-butyl-4-(2',4'-di-t-butylphenoxycarbonyl)-phenyl]phosphite, 2,2'-ethylidene-bis (4,6-di-t-butylphenyl) (2,6-di-t-butyl-4-n-hexadecyloxycarbonyl-phenyl) phosphite, and the like.

Examples of 2,2'-ethylidene-bis (4,6-di-t-amylphenyl) phosphite are 2,2'-ethylidene-bis (4,6-di-t-amylphenyl) octylphosphite, 2,2'-ethylidene-bis (4,6-di-t-amylphenyl) stearylphosphite, 2,2'-ethylidene-bis (4,6-di-t-amylphenyl) (2,4-di-t-amylphenyl) phosphite, 2,2'-ethylidene-bis (4,6-di-t-amylphenyl) (2,4,6-tri-t-amylphenyl) phosphite, 2,2'-ethylidene-bis(4,6-di-t-amylphenyl) (2,6-di-t-butyl-4-n-octadecyloxycarbonylethyl-phenyl) phosphite, 2,2'-ethylidene-bis (4,6-di-t-amylphenyl) [2,6-di-t-butyl-4-(2',4'-di-t-butylphenoxycarbonyl)-phenyl]phosphite, 2,2'-ethylidene-bis (4,6-di-t-amylphenyl) (2,6-di-t-butyl-4-n-hexadecyloxycarbonyl-phenyl) phosphite, and the like.

Examples of 2,2'-thio-bis (4-methyl-6-t-butylphenyl) phosphite are 2,2'-thio-bis (4-methyl-6-t-butylphenyl) octylphosphite, 2,2'-thio-bis (4-methyl-6-t-butylphenyl) nonylphosphite, 2,2'-thio-bis (4-methyl-6-t-butylphenyl) laurylphosphite, 2,2'-thio-bis (4-methyl-6-t-butylphenyl) tridecylphosphite, 2,2'-thio-bis (4-methyl-6-t-butylphenyl) myristylphosphite, 2,2'-thio-bis (4-methyl-6-t-butylphenyl) stearylphosphite, 2,2'-thio-bis (4-methyl-6-t-butylphenyl) (2,4-di-t-butylphenyl) phosphite, 2,2'-thio-bis (4-methyl-6-t-butylphenyl) (2,6-di-t-butyl-4-methylphenyl) phosphite, 2,2'-thio-bis (4-methyl-6-t-butylphenyl) (2,4,6-tri-t-butylphenyl) phosphite, 2,2'-thio-bis (4-methyl-6-t-butylphenyl) (2,6-di-t-butyl-4-n-octadecyloxycarbonylethyl-phenyl) phosphite, 2,2'-thio-bis (4-methyl-6-t-butylphenyl) [2,6-di-t-butyl-4-(2',4'-di-t-butylphenoxycarbonyl-phenyl]phosphite, 2,2'-thio-bis (4-methyl-6-t-butylphenyl) (2,6-di-t-butyl-4-n-hexadecyloxycarbonyl-phenyl) phosphite, and the like.

Examples of fluorophosphite are 2,2'-bis (4,6-di-t-butylphenyl) fluorophosphite, 2,2'-bis (4-methyl-6-t-butylphenyl) fluorophosphite, 2,2'-bis (4-t-amyl-6-methylphenyl) fluorophosphite, 2,2'-bis (4-s-eicosylphenyl) fluorophosphite, 2,2'-methylene-bis (4-methyl-6-t-butylphenyl) fluorophosphite, 2,2'-methylene-bis (4-ethyl-6-t-butylphenyl) fluorophosphite, 2,2'-methylene-bis (4-methyl-6-nonylphenyl) fluorophosphite, 2,2'-methylene-bis (4,6-dinonylphenyl) fluorophosphite, 2,2'-methylene-bis (4-methyl-6-cyclohexylphenyl) fluorophosphite, 2,2'-methylene-bis (4-methyl-6-(1'-methylcyclohexyl) phenyl) fluorophosphite, 2,2'-i-propylidene-bis (4-nonylphenyl) fluorophosphite, 2,2'-butylidene-bis (4,6-dimethylphenyl) fluorophosphite, 2,2'-methylene-bis (4,6-di-t-butylphenyl) fluorophosphite, 2,2'-methylene-bis (4,6-di-t-amylphenyl) fluorophosphite, 2,2'-ethylidene-bis (4-methyl-6-t-butylphenyl) fluorophosphite, 2,2'-ethylidene-bis (4-ethyl-6-t-butylphenyl) fluorophosphite, 2,2'-ethylidene-bis (4-s-butyl-6-t-butylphenyl) fluorophosphite, 2,2'-ethylidene-bis (4,6-di-t-butylphenyl) fluorophosphite, 2,2'-ethylidene-bis (4,6-di-t-amylphenyl) fluorophosphite, 2,2'-methylene-bis (4-methyl-6-t-octylphenyl) fluorophosphite, 2,2'-butylidene-bis (4-methyl-6-(1'-methylcyclohexyl) phenyl) fluorophosphite, 2,2'-methylene-bis (4,6-dimethylphenyl) fluorophosphite, 2,2'-thio-bis (4-t-octylphenyl) fluorophosphite, 2,2'-thio-bis (4,6-di-s-amylphenyl) fluorophosphite, 2,2'-thio-bis (4,6-di-i-octylphenyl) fluorophosphite, 2,2'-thio-bis (5-t-butylphenyl) fluorophosphite, 2,2'-thio-bis (4-methyl-6-t-butylphenyl) fluorophosphite, 2,2'-thio-bis (4-methyl-6-α-methylbenzylphenyl) fluorophosphite, 2,2'-thio-bis (3-methyl-4,6-di-t-butylphenyl) fluorophosphite, 2,2'-thio-bis (4-t-amylphenyl) fluorophosphite, and the like.

Examples of diphosphite are bis [2,2'-methylene-bis (4,6-di-t-butylphenyl)]-ethyleneglycol-diphosphite, bis [2,2'-methylene-bis (4,6-di-t-butylphenyl)]-1,4-butanediol-diphosphite, bis [2,2'-methylene-bis (4,6-di-t-butylphenyl)]-1,6-hexanediol-diphosphite, bis [2,2'-methylene-bis (4-methyl -6-t-butylphenyl)]-3,9-bis (1,1-dimethyl-2-hydroxyethyl)-2,4,8,10-tetraoxaspiro [5,5]undecane-diphosphite, bis [2,2'-methylene-bis (4,6-di-t-butylphenyl)]-3,9-bis (1,1-dimethyl-2-hydroxyethyl)-2,4,8,10-tetraoxaspiro [5,5]undecane-diphosphite, bis [2,2'-methylene-bis (4,6-di-t-amylphenyl)]-3,9-bis (1,1-dimethyl-2-hydroxyethyl)-2,4,8,10-tetraoxaspiro [5,5]undecane-diphosphite, bis [2,2'-ethylidene-bis (4-methyl-6-t-butylphenyl)]-3,9-bis -(1,1-dimethyl-2-hydroxyethyl)-2,4,8,10-tetraoxaspiro [5,5]undecane-diphosphite, bis [2,2'-ethylidene-bis (4,6-di-t-butylphenyl)]-3,9-bis (1,1-dimethyl-2-hydroxyethyl)-2,4,8,10-tetraoxaspiro [5,5] undecane-diphosphite, bis[2,2'-ethylidene-bis (4,6-di-t-amylphenyl)]-3,9-bis (1,1-dimethyl-2 -hydroxyethyl)-2,4,8,10-tetraoxaspiro [5,5]undecane-diphosphite, and bis [2,2'-methylene-bis (4,6-di-t-butylphenyl)]-N,N'-bis (2-hydroxyethyl) oxamide-diphosphite, and the like.

Examples of triphosphite are tris [2,2'-methylene-bis(4,6-di-t-butylphenyl)]-glycerin-triphosphite, tris [2,2'-methylene-bis(4,6-di-t-butylphenyl)]-trimethylolethane-triphosphite, tris [2,2'-methylene-bis (4,6-di-t-butylphenyl)]-trimethylolpropane-triphosphite, tris [2,2'-bis (4,6-di-t-butylphenyl)]-triethanolamine-triphosphite, tris [2,2'-bis (4,6-di-t-amylphenyl)]-triethanolamine-triphosphite, tris [2,2'-methylene-bis (4,6-di-t-butylphenyl)]-triethanolamine-triphosphite, tris [2,2'-methylene-bis (4,6-di-t-amylphenyl)]-triethanolamine-triphosphite, tris [2,2'-ethylidene-bis (4,6-di-t-butylphenyl)]-triethanolamine-triphosphite, tris [2,2'-ethylidene-bis(4,6-di-t-amylphenyl)]-triethanolamine-triphosphite, tris [2,2'-methylene -bis(4,6-di-t-butylphenyl)]-N,N',N''-tris (2-hydroxyethyl) isocyanurate-triphosphite, and the like.

Examples of the phosphoric antioxidant are tetrakis [2,2'-methylene-bis (4,6-di-t-butylphenyl)]-erythritol-tetraphosphite, tetrakis [2,2'-methylene-bis (4,6-di-t-butylphenyl)]-pentaerythritol-tetraphosphite, bis (2,4-di-t-butyl-6-methylphenyl) ethylphosphite, bis (2,4-di-t-butyl-6-methylphenyl)-2-ethylhexylphosphite, bis (2,4-di-t-butyl-6-methylphenyl) stearylphosphite, 2,4,6-tri-t-butylphenyl-2-ethyl-2-butyl-1,3-propanediolphosphite, and the like.

For the compositions according to the present invention, antioxidants other than the phosphoric antioxidants can be used so as to accomplish the objects of the present invention.

Examples of the antioxidant are the well-known phenolic antioxidants and thio antioxidants which are used for polypropylene compositions. Examples of the thio antioxidant include dimyristylthiodipropionate, distearylthiodipropionate, laurylstearylthiodipropionate, dilaurylstearylthiodipropionate, pentaerythritol-tetrakis (3-laurylthiopropionate), dioctadecyldisulfide, distearylthiodibutylate, and the like.

These phenolic and thio antioxidants can be used solely or in combination with two kinds of or more phenolic antioxidants.

The amount of those antioxidants for use is each 0.001 to 1.5 parts by weight to 100 parts by weight of the polypropylene composition, preferably 0.005 to 1 weight part, particularly preferably 0.01 to 0.5 weight part.

For the compositions according to the present invention, stabilizers other than the above can be used so as to accomplish the objects of the present invention.

Examples of the stabilizers include a halogen scavenger. The halogen scavenger works to capture halogen remaining as a residue of the catalyst in polypropylene contained in the composition. The use of the halogen scavenger improves the compositions of the invention on thermal stability, odors, hue, corrosion resistance, weather resistance and the like.

The halogen scavengers can be any of fatty acid metal salts, alkanoyl lactic acid metal salts, aliphatic hydroxy acid metal salts, hydrotalcites, lithium aluminum complex hydroxide salts, metal oxides, metal hydroxides, metal carbonates, metal aliphatic phosphates, epoxy compounds, aliphatic amines, aliphatic amides, hindered amine compounds, aminotriazine compounds, and the like.

Examples of the halogen scavengers include metal salts of aliphatic acids such as acetic acid, propionic acid, butyric acid, valeric acid, α-methyl butyric acid, hexanoic acid, sorbic acid, octanoic acid, 2-ethyl hexanoic acid, nonanoic acid, decanoic acid, 9-decenic acid, undecanoic acid, undecylenic acid, lauric acid, linderic acid, myristic acid, physeteric acid, myristoleic acid, palmitic acid, palmitoleic acid, hiragoic acid, stearic acid, petroselinic acid, oleic acid, elaidic acid, cis-11-octadecenic acid, vaccenic acid, linolic acid,α-eleostearic acid, β-eleostearic acid, punicic acid, linolenic acid, γ-linolenic acid, moroctic acid, stearidonic acid, stearolic acid, arachic acid, gadoleic acid, cis-11-eicosenic acid, arachidonic acid, behenic acid, cetoleic acid, erucic acid, brassidic acid, clupanodonic acid, lignoceric acid, selacholeic acid, 4, 8, 12, 15, 18, 21-tetracohexanic acid, cerotic acid, ximeric acid, montanic acid, melissic acid, lumequeic acid; metal salts of alkanoyl lactic acids such as dodecanoyl lactic acid, tetradodecanoyl lactic acid, octadecanoyl lactic acid; metal salts of aliphatic hydroxy acids such as glycollic acid, lactic acid, hydracrylic acid, α-hydroxybutyric tartronic acid, glyceric acid, malic acid, tartaric acid, methotartaric acid, racemic acid, citric acid, 2-hydroxytetradecanoic acid, ipurolic acid, 2-hydroxyhexadecanoic acid, jalapinolic acid, juniperic acid, ambrettolic acid, 9,10,16-trihydroxyhexadecenic acid, 2-hydroxyoctadecanoic acid, 12-hydroxyoctadecanoic acid, 18-hydroxyoctadecanoic acid, 9,10-dihydroxyoctadecanoic acid, ricinoleic acid, kamlolenic acid, licanic acid, 22-hydroxydocosanic acid or cerebronic acid; metal alicyclic carboxylates such as metal naphthenates; metal aromatic carboxylates derived from aromatic carboxylic acids such as benzoic acid or p-t-butyl-benzoic acid; metal alicyclic hydroxylates derived from alicyclic hydroxylic acids such as hydroxy naphthenic acid; metal aromatic hydroxylates derived from aromatic hydroxylic acid such as salicylic acid, m-hydroxy benzoic acid, p-hydroxy benzoic acid or 3,5-di-t-butyl-4-hydroxy benzoic acid; a variety of metal amino carboxylates; lithium aluminum complex hydroxide metal salts of basic aluminum lithium hydroxy carbonate hydrate and basic aluminum lithium hydroxy sulfate hydrate; metal oxides; metal hydroxides; metal carbonates; and metal phosphates.

Examples of metal salt of aliphatic phosphate are (mono-, or di-mixed) hexylphosphate, (mono-, di-mixed) octylphosphate, (mono-, or di-mixed) 2-ethylhexylphosphate, (mono-, or di-mixed) decylphosphate, (mono-, or di-mixed) laurylphosphate, (mono-, or di-mixed) myristylphosphate, (mono-, or di-mixed) palmitylphosphate, (mono-, or di-mixed) stearylphosphate, (mono-, or di-mixed) oleylphosphate, (mono-, or di-mixed) linoleicphosphate, (mono-, or di-mixed) linoleylphosphate, (mono-, or di-mixed) docosylphosphate, (mono-, or di-mixed) erucylphosphate, (mono-, or di-mixed) tetracosylphosphate, (mono-, or di-mixed) hexacosylphosphate, (mono-, or di-mixed) octacosylphosphate, and the like.

Examples of metal salt of aromatic phosphate are bis (p-t-butylphenyl) phosphate, mono(p-t-butylphenyl) phosphate, 2,2'-methylene-bis (4,6-di-t-butylphenyl) phosphate, 2,2'-methylene-bis (4,6-di-t-amylphenyl) phosphate, 2,2'-ethylidene-bis (4,6-di-tbutylphenyl) phosphate, 2,2'-ethylidene-bis (4,6-di-t-amylphenyl) phosphate, and the like.

Further examples are tribasic sulfate, hydrazone, alkene, cyclic ester, organic metal compounds, benzhydrol, epoxy compounds such as condensation product of epichlorohydrin and bisphenol A, condensation product of 2-methylepichlorohydrin and bisphenol A, triglycidylisocyanurate, epoxidized soybean oil, epoxidized linseed oil, epoxidized castor oil and the like, and hydroxylamine.

Examples of aliphatic amine are octylamine, laurylamine, myristylamine, palmitylamine, stearylamine, oleylamine, cocoamine, tallowamine, soyamine, N,N-dicocoamine, N,N-ditallowamine, N,N-disoyamine, N-lauryl-N,N-dimethylamine, N-myristyl-N,N-dimethylamine, N-palmityl-N,N-dimethylamine, N-stearyl-N,N-dimethylamine, N-coco-N,N-dimethylamine, N-tallow-N,N-dimethylamine, N-soy-N,N-dimethylamine, N-methyl-N,N-ditallowamine, N-methyl-N,N-dicocoamine, N-oleyl-1,3-diaminopropane, N-tallow-1,3-diaminopropane, hexamethylenediamine, and the like.

Examples of ammonium chloride are N-lauryl-N,N,N-trimethylammoniumchloride, N-palmityl-N,N,N-trimethylammoniumchloride, N-stearyl-N,N,N-trimethylammoniumchloride, N-docosyl-N,N,N-trimethylammoniumchloride, N-coco-N,N,N-trimethylammoniumchloride, N-tallow-N,N,N-trimethylammoniumchloride, N-soy-N,N,N-trimethylammoniumchloride, N,N,N-triethyl-N-benzylammoniumchloride, N-lauryl-N,N-dimethyl-N-benzylammoniumchloride, N-myristyl-N,N-dimethyl-N-benzylammoniumchloride, N-stearyl-N,N-dimethyl-N-benzylammoniumchloride, N-coco-N, N-dimethyl-N-benzylammoniumchloride, N,N-dioleyl-N,N-dimethylammoniumchloride, N,N-dicoco-N,N-dimethylammoniumchloride, N,N-ditallow-N,N-dimethylammoniumchloride, N,N-diiso-N,N-dimethylammoniumchloride, N,N-bis(2-hydroxyethyl)-N-lauryl-N-methylammoniumchloride, N,N-bis(2-hydroxyethyl)-N-stearyl-N-methylammoniumchloride, N,N-bis(2-hydroxyethyl)-N-oleyl-N-methylammoniumchloride, N,N-bis(2-hydroxyethyl)-N-coco-N-methylammoniumchloride, N,N-bis(polyoxyethylene)-N-lauryl-N-methylammoniumchloride, N,N-bis(polyoxyethylene)-N-stearyl-N-methylammoniumchloride, N,N-bis(polyoxyethylene)-N-oleyl-N-methylammoniumchloride, N,N-bis(polyoxyethylene)-N-oco-N-methylammoniumchloride, and the like.

Examples of betaine are N,N-bis (2-hydroxyethyl) laurylaminobetaine, N,N-bis (2-hydroxyethyl) tridecylaminobetaine, N,N-bis (2-hydroxyethyl) myristylaminobetaine, N,N-bis (2-hydroxyethyl) pentadecylaminobetaine, N,N-bis (2-hydroxyethyl) palmitylaminobetaine, N,N-bis (2-hydroxyethyl) stearylaminobetaine, N,N-bis (2-hydroxyethyl) oleylaminobetaine, N,N-bis (2-hydroxyethyl) docosylaminobetaine, N,N-bis (2-hydroxyethyl) octacosylaminobetaine, N,N-bis(2-hydroxyethyl) cocoaminobetaine, N,N-bis (2-hydroxyethyl) tallowaminobetaine, and the like, hexamethylenetetramine, alkanolamine such as triethanolamine, triisopropanolamine and the like. Examples of N-(2-hydroxyethyl) amine are N-(2-hydroxyethyl) laurylamine, N-(2-hydroxyethyl) tridecylamine, N-(2-hydroxyethyl) myristylamine, N-(2-hydroxyethyl) pentadecylamine, N-(2-hydroxyethyl) palmitylamine, N-(2-hydroxyethyl) stearylamine, N-(2-hydroxyethyl) oleylamine, N-(2-hydroxyethyl) docosylamine, N-(2-hydroxyethyl)octacosylamine, N-(2-hydroxyethyl) cocoamine, N-(2-hydroxyethyl)tallowamine, N-methyl-N-(2-hydroxyethyl) laurylamine, N-methyl-N-(2-hydroxyethyl)tridecylamine, N-methyl-N-(2-hydroxyethyl) myristylamine, N-methyl-N-(2-hydroxyethyl) pentadecylamine, N-methyl-N-(2-hydroxyethyl) palmitylamine, N-methyl-N-(2-hydroxyethyl) stearylamine, N-methyl-N-(2-hydroxyethyl) oleylamine, N-methyl-N-(2-hydroxyethyl) docosylamine, N-methyl-N-(2-hydroxyethyl) octacosylamine, N-methyl-N-(2-hydroxyethyl) cocoamine, N-methyl-N-(2-hydroxyethyl) tallowamine, and the like.

Examples of N,N-bis (2-hydroxyethyl) aliphatic amine are N,N-bis (2-hydroxyethyl) laurylamine, N,N-bis (2-hydroxyethyl) tridecylamine, N,N-bis (2-hydroxyethyl) myristylamine, N,N-bis (2-hydroxyethyl) pentadecylamine, N,N-bis (2-hydroxyethyl) palmitylamine, N,N-bis(2-hydroxyethyl) stearylamine, N,N-bis (2-hydroxyethyl) oleylamine, N,N-bis (2-hydroxyethyl) docosylamine, N,N-bis (2-hydroxyethyl) octacosylamine, N,N-bis (2-hydroxyethyl) cocoamine, N,N-bis (2-hydroxyethyl) tallowamine, and the like, mono- or di-ester of N,N-bis (2-hydroxyethyl) aliphatic amine and aliphatic acid such as lauric acid, myristic acid, palmitic acid, stearic acid, oleic acid, behenic acid, erucic acid, and the like. Examples of aminoether are polyoxyethylenelaurylaminoether, polyoxyethylenestearylaminoether, polyoxyethyleneoleylaminoether, polyoxyethylenecocoaminoether, polyoxyethylenetallowaminoether, and the like. Examples of diaminoalkyl are N,N,N',N'-tetra (2-hydroxyethyl)-1,3-diaminopropane, N,N,N',N', -tetra (2-hydroxyethyl)-1,6-diaminohexane, N-lauryl-N,N',N'-tris (2-hydroxyethyl)-1,3-diaminopropane, N-stearyl-N,N',N'-tris (2-hydroxyethyl)-1,3-diaminopropane, N-coco-N,N',N'-tris (2-hydroxyethyl)-1,3-diaminopropane, N-tallow-N,N',N'-tris (2-hydroxyethyl)-1,3-diaminopropane, N,N-dicoco-N',N'-bis (2-hydroxyethyl)-1,3-diaminopropane, N,N-ditallow-N',N'-bis (2-hydroxyethyl)-1,3-diaminopropane, N-coco-N,N',N'-tris (2-hydroxyethyl)-1,6-diaminohexane, N-tallow-N,N', N'-tris (2-hydroxyethyl)-1,6-diaminohexane, N,N-dicoco-N',N'-bis (2-hydroxyethyl)-1,6-diaminohexane, N,N-ditallow-N',N'-bis(2-hydroxyethyl)-1,6-diaminohexane, and the like.

Examples of aliphatic amide are oleic acid amide, stearic acid amide, erucic acid amide, behenic acid amide, montanic acid amide, N-stearylstearic acid amide, N-oleyloleyic acid amide, N-stearyloleic acid amide, N-oleylstearic acid amide, N-stearylerucic acid amide, N-oleylpalmitic acid amide, N,N'-methylene-bis-lauric acid amide, N,N'-methylene-bis-myristic acid amide, N,N'-methylene-bis-palmitic acid amide, N,N'-methylene-bis-palmitoleic acid amide, N,N'-methylene-bis-stearamide, N,N'-methylene-bis-12-hydroxystearic acid amide, N,N'-methylene-bis-oleic acid amide, N,N'-methylene-bis-behenic acid amide, N,N'-methylene-bis-erucic acid amide, N,N'-methylene-bis-montanic acid amide, N,N'-ethylene-bis-lauric acid amide, N,N'-ethylene-bis-myristic acid amide, N,N'-ethylene-bis-palmitic acid amide, N,N'-ethylene-bis-palmitoleic acid amide, N,N'-ethylene-bis stearic acid amide, N,N'-ethylene-bis-12-hydroxystearic acid amide, N,N'-ethylene-bis-oleic acid amide, N,N'-ethylene-bis-behenic acid amide, N,N'-ethylene-bis-erucic acid amide, N,N'-ethylene-bis-montanic acid amide, N,N'-hexamethylene-bis-stearamide, N,N'-hexamethylene-bis-oleic acid amide, N,N'-hexamethylene-bis-behenic acid amide, N,N'-distearyloxalic acid amide, N,N'-dioleyloxalic acid amide, N,N'-distearylsuccinic acid amide, N,N'-dioleylsuccinic acid amide, N,N'-distearyladipic acid amide, N,N'-dioleyladipic acid amide, N,N'-distearylsebacic acid amide, N,N'-dioleylsebacic acid amide, and the like.

Examples of aliphatic amide are N,N-bis (2-hydroxyethyl) laurylamide, N,N-bis (2-hydroxyethyl) tridecylamide, N,N-bis (2-hydroxyethyl) myristyl amide, N,N -bis (2-hydroxyethyl) pentadecylamide, N,N -bis (2-hydroxyethyl) palmitylamide, N,N-bis (2-hydroxyethyl) stearylamide, N,N-bis (2-hydroxyethyl) oleylamide, N,N-bis (2-hydroxyethyl) dococylamide, N,N-bis (2-hydroxyethyl) octacocylamide, N,N'-bis (2-hydroxyethyl) cocoamide, N,N-bis (2-hydroxyethyl) tallowamide, and the like. Examples of polyoxyalkylene of aliphatic amide are polyoxyethylenelaurylamideether, polyoxyethylenestearylamideether, polyoxyethyleneoleylamideether, polyoxyethylenecocoamideether, polyoxydethylenetallowamideether, and the like.

Examples of a hindered amine compound are 4-hydroxy-2,2,6,6-tetramethylpiperidine, 1-aryl-4-hydroxy-2,2,6,6-tetramethylpiperidine, 1-benzyl-4-hydroxy-2,2,6,6-tetramethylpiperidine, 1-(4-t-butyl-2-butenyl)-4-hydroxy-2,2,6,6-tetramethylpiperidine, 4-stearoyloxy-2,2,6,6-tetramethylpiperidine, 4-methacryloyloxy-1,2,2,6,6-pentamethylpiperidine, 1 -benzyl-2,2,6,6-tetramethyl-4-piperidylmaleate, bis(2,2,6,6-tetramethyl-4-piperidyl) succinate, bis(1,2,2,6,6-pentamethyl-4-piperidyl)succinate, bis(2,2,6,6-tetramethyl-4-piperidyl)adipate, bis(2,2,6,6-tetramethyl-4-piperidyl)cevacate, bis(2,2,6,6-tetramethyl-4-piperidyl)fumarate, bis(1,2,3,6-tetramethyl-2,6-diethyl-4-piperidyl)cevacate, bis(1-aryl-2,2,6,6-tetramethyl-4-piperidyl)phthalate, bis(1,2,2,6,6-pentamethyl-4-piperidyl) cevacate, 1,1'-(1,2-ethanediyl)bis(3,3,5,5-tetramethylpiperiazinone), 2-methyl-2-(2,2,6,6-tetramethyl-4-piperidyl)imino-N-(2,2,6,6-tetramethyl-4-piperidyl) propioneamide, 2-methyl-2-(1,2,2,6,6-pentametyl-4-peperidyl)imino-N-(1,2,2,6,6-pentamethyl-4-piperidyl) propioneamide, 1-propargyl-4-β-cyanoethyloxy-2,2,6,6-tetramethylpiperidine, 1-acetyl-2,2,6,6-tetramethyl-4-piperidyl-acetate, trimellitic acid-tris(2,2,6,6-tetramethyl-4-piperidyl)ester, 1-acryloyl-4-benzyloxy-2,2,6,6-tetramethylpiperidine, bis(1,2,2,6,6-pentamethyl-4-piperidyl)dibutylmalonate, bis(1,2,2,6,6-pentamethyl-4-piperidyl)dibenzyl-malonate, bis(1,2,3,6-tetramethyl-2,6-diethyl-4-piperidyl)dibenzyl-malonate, bis(1,2,2,6,6-pentamethyl-4-piperidyl)-2-(3,5-di-t-butyl-4-hydroxybenzyl)-2-n-butylmalonate, and the like.

Examples of a hindered amine compound are bis(2,2,6,6-tetramethyl-4-piperidyl)-1,5-dioxaspiro[5.5]undecane-3,3-dicarboxylate, bis(1,2,2,6,6-pentamethyl-4-piperidyl)-1,5-dioxaspiro[5.5]undecane-3,3-dicarboxylate, bis(1-acetyl-2,2,6,6-tetramethyl-4-piperidyl)-1,5-dioxaspiro[5.5] undecane-3,3-dicarboxylate, 1,3-bis[2,2'-[bis(2,2,6,6-tetramethyl-4-piperidyl)-1,3-dioxacyclohexane-5,5-dicarboxylate)], bis(2,2,6,6-tetramethyl-4-piperidyl)-2-[1-methylethyl[1,3-dioxacyclohexane-5,5-dicarboxylate]], 1,2-bis[2,2'-[bis(2,2,6,6-tetramethyl-4-piperidyl)-2-methyl-1,3-dioxacyclohexane-5,5-dicarboxylate]], bis(2,2,6,6-tetramethyl-4-piperidyl)-2-[2-(3,5-di-t-butyl-4-hydroxyphenyl)]ethyl-2-methyl-1,3-dioxacyclohexane-5,5-dicarboxylate, bis(2,2,6,6-tetramethyl-4-piperidyl)-1,5-dioxaspiro[5.11]heptadecane-3,3-dicarboxylate, and the like.

Examples of a hindered amine compound are hexane-1',6'-bis-(4-carbamoyloxy-1-n-butyl-2,2,6,6-tetramethylpiperidine), toluene-2',4'-bis(4-carbamoyloxy-1-n-butyl-2,2,6,6-tetramethylpiperydine), dimethyl-bis(2,2,6,6-tetramethylpiperidine-4-oxy)-silane, phenyl-tris(2,2,6,6-tetramethylpiperidine-4-oxy)-silane, tris(1-propyl-2,2,6,6-tetramethyl-4-piperidyl)-phosphite, tris(1-propyl-2,2,6,6-tetramethyl-4-piperidyl)-phosphate, phenyl-[bis(1,2,2,6,6-pentamethyl-4-piperidyl)]-phosphonate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, tetrakis(2,2,6,6-tetramethyl-4-piperidyl)-1,2,3,4-butanetetracarboxylic acid amide, tetrakis(1,2,2,6,6-pentamethyl-4-piperidyl)1,2,3,4-butanetetracarbonamide, and the like.

Examples of a hindered amine compound are 2-dibutylamino-4,6-bis(9-aza-3-ethyl-8,8,10,10-tetramethyl-1,5-dioxaspiro[5,5]-3-undecylmethoxy)-s-triazine, 2-dibutylamino-4,6-bis(9-aza-3-ethyl-8,8,9,10,10-pentamethyl-1,5-dioxaspiro[5.5]-3-undecylmethoxy)-s-triazine, tetrakis(9-aza-3-ethyl-8,8,10,10-tetramethyl-1,5-dioxaspiro[5.5]-3-undecylmethyl)-1,2,3,4-butanetetracarboxylate, tetrakis(9-aza-3-ethyl-8,8,9,10,10-pentamethyl-1,5-dioxaspiro[5.5]-3-undecylmethyl)-1,2,3,4-butanetetracarboxylate, tridecyl.tris(2,2,6,6-tetramethyl-4-piperidyl)1,2,3,4-butanetetracarboxylate, tridecyl.tris(1,2,2,6,6-pentamethyl-4-piperidyl)1,2,3,4-butanetetracarboxylate, di(tridecyl).bis(2,2,6,6-tetramethyl-4-piperidyl)1,2,3,4-butanetetracarboxylate, di(tridecyl).bis(1,2,2,6,6-pentamethyl-4-piperidyl)-1,2,3,4- butanetetracarboxylate, 2,2,4,4-tetramethyl-7-oxa-3,20-diazadispiro[5.1.11.2]heneicosane-21-one, 3,9-bis[1,1-dimethyl-2-{tris(2,2,6,6-tetramethyl-4-piperidyloxycarbonyl)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyl)butylcarbonyloxy}ethyl]-2,4,8,10-tetraoxaspiro[5.5]undecane, and the like.

Examples of a hindered amine compound are poly(2,2,6,6-tetramethyl-4-piperidylacrylate), poly(1,2,2,6,6-pentamethyl-4-piperidylacrylate), poly(2,2,6,6-tetramethyl-4-piperidylmethacrylate), poly(1,2,2,6,6-pentamethyl-4-piperidylmethacrylate), poly[[bis(2,2,6,6-tetramethyl-4-piperidyl)itaconate][vinylbutylether]], poly[[bis(1,2,2,6,6-pentamethyl-4-piperidyl)itaconate][vinylbutylether]], poly[[bis(2,2,6,6-tetramethyl-4-piperidyl)itaconate][vinyloctylether]], poly[[bis(1,2,2,6,6-pentamethyl-4-piperidyl)itaconate][vinyloctylether]], dimethylsuccinate-2-(4-hydroxy-2,2,6,6-tetramethylpiperidyl)ethanol condensation products, and the like.

Examples of a hindered amine compound are poly[hexamethylene[(2,2,6,6-tetramethyl-4-piperidyl)imino]], poly[ethylene[[2,2,6,6-tetramethyl-4-piperidyl)imino] hexamethylene [(2,2,6,6-tetramethyl-4-piperidyl)imino]], poly[[1,3,5-triazine-2,4-diyl][(2,2,6,6 -tetramethyl-4-piperidyl)imino]]hexamethylene[(2,2,6,6-tetramethyl-4-piperidyl)imino]], poly[[6-(diethylimino)-1,3,5-triazine-2,4-diyl][(2,2,6,6-tetramethyl-4-piperidyl)imino]hexamethylene[[2,2,6,6-tetramethyl-4-piperidyl)imino]], poly[[6-[(2-ethylhexyl)imino]-1,3,5-triazine-2,4-diyl][(2,2,6,6-tetramethyl-4-piperidyl)imino]hexamethylene[(2,2,6,6-tetramethyl-4-piperidyl)imino]], poly[[6-[(1,1,3,3-tetramethylbutyl)imino]-1,3,5-triazine-2,4-diyl][(2,2,6,6-tetramethyl-4-piperidyl)imino]hexamethylene[(2,2,6,6-tetramethyl-4-piperidyl)imino]], poly[[6-(cyclohexylimino)-1,3,5-triazine-2,4-diyl][(2,2,6,6-tetramethyl-4-piperidyl)imino]hexamethylene[(2,2,6,6-tetramethyl-4-piperidyl)imino]], poly[[6-morpholino-1,3,5-triazine-2,4-diyl][(2,2,6,6-tetramethyl-4-piperidyl)imino] hexamethylene[(2,2,6,6-tetramethyl-4-piperidyl)imino]], poly[[6-(butoxyimino)-1,3,5-triazine-2,4-diyl][(2,2,6,6-tetramethyl-4-piperidyl)imino]hexamethylene[(2,2,6,6-tetramethyl-4-piperidyl)imino]], poly[[1,1,3,3-tetramethylbutyl)oxy]-1,3,5-triazine-2,4-diyl][(2,2,6,6-tetramethyl-4-piperidyl)imino]hexamethylene[(2,2,6,6-tetramethyl-4-piperidyl)imino]], and the like.

Examples of a hindered amine compound are poly[oxy[6-[(1-piperidyl)-1,3,5-triazine-2,4-diyloxy-1,2-ethanediyl][(2,2,6,6-tetramethyl-3-oxo-1,4-piperidyl)-1,2-ethanediyl][(3,3,5,5-tetramethyl-2-oxo-1,4-piperidyl)-1,2-ethanediyl]], poly[oxy[6-[1,1,3,3-tetramethylbutyl)imino]-1,3,5-triazine-2,4-diyloxy-1,2-ethanediyl][(2,2,6,6-tetramethyl-3-oxo-1,4-piperidyl)-1,2-ethanediyl][(3,3,5,5-tetramethyl-2-oxo-1,4-piperidyl)-1,2-ethanediyl]], poly[[6-[(ethylacetyl)imino]-1,3,5-triazine-2,4-diyl][(2,2,6,6-tetramethyl-4-piperidyl)imino)hexamethylene[(2,2,6,6-tetramethyl-4-piperidyl)imino]], poly[[6-[(2,2,6,6-tetramethyl-4-piperidyl)butylimino]-1,3,5-triazine-2,4-diyl)][(2,2,6,6-tetramethyl-4-piperidyl)imino]hexamethylene[(2,2,6,6-tetramethyl-4-piperidyl)imino]], and the like.

Examples of a hindered amine compound are 1,6,11-tris[{4,6-bis(N-butyl-N-(2,2,6,6-tetramethyl-4-piperidyl)amino)-1,3,5-triazine-2-yl}amino]undecane, 1,6,11-tris[{4,6-bis(N-butyl-N-(1,2,2,6,6-pentamethyl-4-piperidyl)amino)-1,3,5-triazine-2-yl}amino]undecane, 1,6,11-tris[{4,6-bis(N-octyl-N-(2,2,6,6-tetramethyl-4-piperidyl)amino)-1,3,5-triazine-2-yl}amino]undecane, 1,6,11-tris[{4,6-bis(N-octyl-N-(1,2,2,6,6-pentamethyl-4-piperidyl)amino)-1,3,5-triazine-2-yl}amino]undecane, 1,5,8,12-tetrakis[4,6-bis(N-(2,2,6-6-tetramethyl-4-piperidyl)-butylamino)-1,3,5-triazine-2-yl]-1,5,8,12-tetraazadodecane, 1,5,8,12-tetrakis [4,6-bis(N-(1,2,2,6,6-pentamethyl-4-piperidyl)-butylamino)-1,3,5-triazine-2-yl]-1,5,8,12-tetraazadodecane, and the like.

Examples of an aminotriazine compound are 2,4,6-triamino-1,3,5-triazine, 2,4-diamino-6-methyl-1,3,5-triazine, 2,4-diamino-6-phenyl-1,3,5-triazine, 1,4-bis(3,5-diamino-2,4,6-triazinyl)butane, 3,9-bis[2-(3,5-diamino-2,4,6-triazaphenyl)ethyl]-2,4,8,10-tetraoxaspiro[5.5]undecane, and the like.

Examples of metals for the above-mentioned metal salts include lithium, sodium, potassium, magnesium, calcium, strontium, barium, zinc, aluminum or the like. Those metal salts can be as a normal salt or basic salt. Examples of preferred metal salts include fatty acid metal salts, alkanoyl lactic acid metal salts, aliphatic hydroxy acid metal salts, hydrotalcites, lithium aluminum complex hydroxide salts, metal oxides, metal hydroxides, metal carbonates, metal aliphatic phosphates, epoxy compounds, aliphatic amines, aliphatic amides, hindered amine compounds, aminotriazine compounds or a mixture of two or more of the above compounds. Those halogen scavengers can be either alone or in combination with two kinds or more.

The amount of the halogen scavengers for addition is 0.001 to 2 parts by weight preferably 0.005 to 1.5 parts by weight, particularly preferably 0.01 to 1 weight part with respect to 100 parts by weight of the polypropylene composition (PP).

For the compositions of the present invention, additives for polypropylene, other than the above halogen scavengers, can be used within the scope of the objects of the invention. Examples of the additives include light stabilizers, metal deactivators, clarifiers, nucleating agents, lubricants, anti-static agents, anti-fogging agents, anti-blocking agents, anti-dropping agents, flame retardants, flame retardant auxiliaries, pigments, organic or inorganic anti-bacterial agents, inorganic fillers such as talc, mica, clay, wollastonite, zeolite, kaolin, bentonite, perlite, diamaceous earth, asbestos, silicon dioxide, titanium dioxide, zinc sulfate, barium sulfate, magnesium sulfate, calcium silicate, aluminum silicate, glass fiber, potassium titanate, carbon fiber, carbon black, graphite, metal fiber or the like, coupling agents such as silane-based, titanate-based, boron-based, aluminate-based, zirco aluminate-based coupling agents or the like, the above-mentioned inorganic fillers treated with a surface active agent such as a coupling agent, and organic fillers such as wood meal, pulp, used paper, synthetic fiber, natural fiber or the like.

The olefin (co)polymer composition in which the above-mentioned antioxidants, ultraviolet ray absorbents, antistatic agents, nucleating agents, lubricants, flame retardants, anti-blocking agents, furthermore, various kinds of synthetic resins are mixed can be used in a state of pellets after being heat-treated, melted and kneaded, and further pelletized.

This olefin (co)polymer composition itself is more suitable for hollow molding, foaming molding, extruding molding as compared with the olefin (co)polymer resin obtained by the conventional method. Furthermore, it has a high melt tension and high crystallization temperature capable of exhibiting the high-speed productivity by the other kinds of molding methods.

According to the present invention, by forming a cross-linked structure in the olefin (co)polymer composition, a modified olefin (co)polymer composition that is further excellent in molding property and a molded modified olefin (co)polymer composition that is excellent in physical properties such as rigidity, heat resistance or the like can be provided.

The modified olefin (co)polymer composition and molded modified olefin (co)polymer composition are excellent in molding property or rigidity and heat resistance of molding product as compared with the olefin (co)polymer composition before modified, because the strength or crystallization temperature at the time of melting of the modified olefin (co)polymer composition can be improved as compared with the olefin (co)polymer composition before modifying.

It is preferable that the melt strength of the modified olefin (co)polymer composition is represented by the below mentioned formula when taken a modified propylene copolymer composition as an example:

$$log(MS) > 4.24 \times log[\eta_T] - 0.950$$

wherein MS denotes a melt tension at 230° C. and [η] denotes a limiting viscosity measured in tetralin at 135° C.

It is further preferable that the following relationship is satisfied:

$$4.24 \times log[\eta_T] + 0.60 > log(MS) > 4.24 \times log[\eta_T] - 0.950,$$

more preferably, $$4.24 \times log[\eta_T] + 0.40 > log(MS) > 4.24 \times log[\eta_T] - 0.950,$$

further more preferably, $$4.24 \times log[\eta_T] + 0.34 > log(MS) > 4.24 \times log[\eta_T] - 0.950,$$

and still further more preferably, $$4.24 \times log[\eta_T] + 0.34 > log(MS) > 4.24 \times log[\eta_T] - 0.830.$$

Furthermore, examples of modification include the case in which a large amount of gel fraction is generated at the time of foaming molding etc. so as to extremely change the strength at the time of melting, and the case in which the modification below the limit of gel fraction detection.

As a method for forming a cross-linked structure, a method of irradiating the olefin (co)polymer composition with ionizing radiation followed by heating can be employed.

The ionizing radiation used at this time includes α-ray, β-ray, γ-ray, X-ray and electron ray. Preferable radiation is γ-ray and electron ray. Most preferable radiation from the practical viewpoint is electron ray. The dose rate of irradiation of these ionizing radiation is not particularly limited, but in the case of γ-ray, the possible dose rate of radiation is about $2.6 \times 1.0^{-2}$ C·kg$^{-1}$/h; and in the case of electron ray, the dose rate of radiation can be 500 times as much as that of γ-ray. From an economical viewpoint, electron ray is preferred because a large amount of modified olefin (co) polymer composition can be obtained for a short time.

The dose of ionizing radiation that is to be absorbed by the olefin (co)polymer composition is not particularly limited. However, from the viewpoint of the improvement of strength at the time of melt tension and from the economical viewpoint, a dose in the range from 0.1 to 1000 kGy is suitable. More preferably, 0.5 to 800 kGy, most preferably, 1 to 600 kGy. Since the property values such as strength required at the time of melting, necessary rigidity, heat resistance is different depending upon the application of use, the dose of ionizing radiation to be absorbed is adjusted in accordance with the application of use.

Herein, (Gy) in general, is defined as the dose of ionizing radiation whereby 1 kilogram of irradiated subject absorbs 1 J of energy regardless of the radiation source. In the present invention, absorbed dose is not directly measured. However, it means that the absorbed dose is equal to the dose measured and shown by a known general dosimeter located on the surface of the irradiated subject.

It is appropriate that the temperature at the time of irradiating the olefin (co)polymer composition with ionizing radiation is in the range from −10 to 80° C., preferably −5 to 60° C., more preferably 0 to 50° C. Furthermore, although the irradiation can be carried out in the air, it is preferable that the irradiation is carried out in the atmosphere of inert gas, for example, in the atmosphere of nitrogen in terms of the improvement of the properties of the controllability of the limiting viscosity of the obtained modified olefin (co) polymer composition, tension strength, rigidity, heat resistance and the like.

Furthermore, depending upon the application of use, the molding property of the olefin (co)polymer composition is satisfied but the properties such as rigidity, heat resistance or the like of the molded composition are desired to be improved. In this case, first, the above-mentioned phenolic stabilizer, phosphoric antioxidants, thio antioxidants, a halogen scavenger or the like are mixed with the olefin (co) polymer composition powder in the above-mentioned mixing amount. Further, if necessary, an antioxidant other than the above, ultraviolet ray absorbent, antistatic agent, nucleating agents, lubricants, flame retardant, anti-blocking agents, coloring agents, inorganic or organic filler and other various additives are mixed with the olefin (co)polymer composition powder. Furthermore, after the various kinds of synthetic resins are mixed if necessary, the mixture is subjected to the general heating and kneading so as to form a granular pellet. Next, this olefin (co)polymer composition in the form of pellet is molded in accordance with various applications, the molded olefin (co)polymer composition is irradiated with ionizing radiation, that is one method according to the present invention, so as to obtain the molded modified olefin (co)polymer composition having improved properties such as rigidity, heat resistance or the like. In this case, the conditions such as a dose of irradiation, temperature at the time of irradiation, irradiation atmosphere or the like can employ the same condition at the time of the irradiation of olefin (co)polymer composition.

In the method of the present invention, the irradiated subject after the above-mentioned irradiation with ionizing radiation is sequentially heat-treated at the temperature of 60 to 350° C., preferably 80 to 300° C. The above-mentioned heat treatment is carried out for the purpose of extinguishing residual radicals. If the heat treatment is not carried out, the obtained olefin (co)polymer composition may be an unstable composition and may be deteriorated over time.

One embodiment of the heat-treatment is melting and kneading by the use of a melt kneader at 190 to 350° C., preferably at 190 to 300° C., most preferably at 200 to 280° C. The melting and kneading time is different depending upon the melt kneader to be used and is not specified. However, the sufficient time, in general, is about 20 seconds to 30 minutes. In general, after melting and kneading, pelletization by cutting in a granular state follows. Moreover, as the melt kneader, a well-known general melt kneader is used. Example of the kneader includes a uniaxial extruder, a biaxial extruder, an extruder combining the above kneaders with a gear pump, Brabender mixer, Banbury mixer and the like. Furthermore, at the time of kneading, if necessary, before heating and melting, the above-mentioned antioxidant, ultraviolet ray absorbent, antistatic agent, nucleating agents, lubricants, flame retardant, anti-blocking agents, coloring agents, inorganic and organic fillers and other kinds of additives can be mixed.

Another embodiment of heat-treatment includes a method of heating at 80 to 150° C., more preferably at 100 to 150° C. The embodiment is preferable in a case of forming for using the obtained modified olefin (co)polymer composition in a powdery state. Furthermore, according to another preferable embodiment of the present invention, heat treatment is carried out at 80 to 150° C. and then melted and kneaded at 190 to 350° C.

Although the above-mentioned heat-treatment can be carried out in the air, but it is preferable that the heat-treatment is carried out in the atmosphere of inert gas, for example, in the atmosphere of nitrogen in terms of the improvement of the controllability of the limiting viscosity of the obtained modified olefin (co)polymer composition, and the improvement of the physical properties such as rigidity, heat resistance and the like of the modified olefin (co)polymer composition.

As the method for forming a cross-linked structure, a method of mixing radical generators with olefin (co)polymer composition and then melting and kneading the mixture can be employed.

It is preferable that the radical generators having a high decomposition temperature to some extent are used in order to obtain a uniform composition. Specifically, it is preferable that the decomposition temperature is 70° C. or more, further 100° C. or more in order to obtain the half life of 10 hours. Examples of the radical generators include: benzoyl peroxide, t-butyl peroxide, t-butyl peracetate, t-butyl peroxyisopropyl carbonate, 2,5-di-methyl-2,5-di(benzoyl peroxy) hexane, 2,5-di-methyl-2,5-di(benzoyl peroxy) hexyne-3, t-butyl-di-peradipate, t-butyl peroxy-3,5,5-trimethylhexanoate, methyl-ethyl ketone peroxide, cyclohexanone peroxide, di-t-butyl peroxide, dicumyl peroxide, 2,5-dimethyl-2,5-di(t-butyl peroxy) hexane, 2,5-dimethyl-2,5-di(t-butyl peroxy) hexyne-3, 1,3-bis(t-butyl peroxyisopropyl) benzene, t-butyl cumyl peroxide, 1,1-bis (t-butyl peroxy)-3,3,5-trimethylene cyclohexane, 2,2-bis(t-butyl peroxy) butane, p-menthane hydroperoxide, di-isopropyl benzene hydroperoxide, cumene hydroperoxide, t-butyl hydroperoxide, p-cymene hydroperoxide, 1,1,3,3-tetra-methyl butyl hydroperoxide, 2,5-di-methyl-2,5-di(hydroperoxy) hexane, trimethylsilyl-cumyl peroxide, 2,5-di-methyl-2,5-bis(trimethylsilyl peroxy) hexane, 2,5-di-methyl-2,5-bis(trimethylsilyl peroxy) hexyne-3, 1,3-bis (trimethylsilyl peroxy isopropyl) benzene or the like. In particular, 2,5-di-methyl-2,5-di(t-butylperoxy) hexane, 2,5-di-methyl-2,5-di-(t-butylperoxy) hexyne-3 and 1,3-bis(t-butyl peroxy isopropyl) benzene are preferable. These radical generators can be used alone or used in combination with two or more of the above.

The mixing ratio of the radical generators is generally in the range from 0.001 to 0.5 parts, preferably in the range from 0.01 to 0.2 parts by weight with respect to 100 parts by weight of olefin (co)polymer.

The above-mentioned radical generators and olefin (co) polymer composition are mixed at the temperature that does not cause the decomposition of radical generator by using commonly used various kinds of mixing devices such as a Henschel mixer (tha name of commercial product), a super mixer, a ribbon blender, a Banbury mixer, a tumbler, and the like. The mixture is melted and kneaded by the use of general melting and kneading device such as a uniaxis extruder, a biaxial extruder, a brabender roll or the like, preferably by the use of melting and kneading device equipped with a deaerator part. In addition, at the time of melting and kneading, if necessary, before heating and melting, the above-mentioned antioxidant, ultraviolet ray absorbent, antistatic agent, nucleating agents, lubricants, flame retardant, anti-blocking agents, coloring agents, inorganic and organic fillers and other kinds of additives can be mixed.

The temperature for melting and kneading is in the range form 150 to 300° C., preferably in the range from 180 to 270° C. When the temperature of melting and kneading treatment is less than 150° C., it is difficult to carry out a sufficient improvement. The temperature of more than 300° C. accelerates the deterioration of the olefin (co)polymer due to heat oxidation, causing the remarkable coloring of the olefin (co)polymer.

Although the melting and kneading can be carried out in the air, it is preferable that the melting and kneading is carried out in the atmosphere of inert gas, for example, in the atmosphere of nitrogen in terms of the improvement of the controllability of the limiting viscosity of the obtained modified olefin (co)polymer composition, and physical properties such as rigidity, heat resistance and the like of the molded modified olefin (co)polymer composition.

EXAMPLES

Hereinafter, the present invention will be described more specifically by way of examples and comparative examples. However, the present invention is not limited to the following examples alone.

Moreover, the definition of terms and measurement methods used in the examples and comparative examples are as follows.

(1) Liminting viscosity [η]: a value (unit: dl/g) as a result of measurement by using an Ostwald's viscometer (manufactured by Mitsui Toatsu Chemicals, Inc.) of a limiting viscosity measured in tetralin at 135° C.

(2) Melt tension (MS): a value (unit: cN) as a result of measurement by using MELT TENSION TESTER II (manufactured by TOYO SEIKI SEISAKU-SHO, Ltd).

(3) Crystallization temperature (Tc): a temperature (unit:° C.) when a maximum peak of heat absorption at the time of crystallization, which is obtained by using a DSC7 type differential scanning calorimeter (manufactured by PERKIN-ELMER Ltd.), warming a propylene composition from room temperature to 230° C. at 30° C./min, allowing it to stand at 230° C. for 10 min., cooling it to −20° C. at −20° C./min., allowing it to stand at −20° C. for 10 min., warming it to 230° C. at 20° C./min, allowing it to stand at 230° C. for 10 min., cooling it to 150° C. at −80° C./min, and further cooling it from 150° C. at −5° C./min.

(4) Gel fraction: a value as a result of calculating residue extracted from the pellet or test piece resin that has finely been cut and contained in a 500-mesh wire screen and extracted after 24-hour extraction with boiled xylene. The value is defined as a gel fraction (%) and an index for the degree of cross-linking.

(5) Heat behavior of sheet: a sheet having a thickness of 0.4 mm is used as a sample sheet. This sample sheet is fixed to a frame having an opening of 300×300 nm and horizontally maintained in a heating furnace kept at 180° C. for a certain time.

In a case where a sheet using polyolefin resin and its composition is subjected to the above-mentioned evaluation, the following phenomenon occurs in general. First, the central part of the sheet hangs down due to heating. Next, a returing phenomenon is observed. More specifically, one part of the hanged-down portion returns back to the original state and this state lasts for a certain time. Finally, the sheet hangs down again, and thereafter the returning phenomenon of the hanged-down portion is not observed again.

The amount of hanging down at the first time is defined as "hanged-down amount" (mm). The time for which the state in which the above-mentioned hanged-down portion returns is maintained is defined as "maintaining time" (second). The "returning rate" (%) was calculated by the following formula.

[{The amount in which a part of the hanged-down portion returns (mm)}/{the amount hanged down at the first time (mm)}]×100

These "hanged-down amount", "returning rate," and "maintaining time" were used as the index for evaluating the molding property of the sheet.

Example 1-1

(1) Preparation of a transition metal compound catalyst component 0.3 liter of decane, 48 g of magnesium chloride anhydride, 170 g of orthotitanate-n-butyl and 195 g of 2-ethyl-1-hexanol were mixed in a stainless steel reactor with a stirrer, then heated and dissolved while stirring at 130° C. for one hour so as to have a uniform solution. This uniform solution was heated to 70° C. Then 18 g of di-i-butyl phthalate was added to the solution while stirring. One hour later, 520 g of silicon tetrachloride was added over 2.5 hours so as to form a solid precipitate. Further, the solution was heated at 70° C. and maintained for one hour. The solid was separated from the solution and washed with hexane to obtain a solid product.

The whole amount of the solid product was mixed with 1.5 liters of titanium tetrachloride dissolved in 1.5 liters of 1,2-dichloroethane. Then, 36 g of di-i-butyl phthalate was added thereto and the mixture was reacted at 100° C. for two hours while stirring. The liquid phase part was removed by decantation at the same temperature, then 1.5 liters of 1,2-dichloroethane and 1.5 liters of titanium tetrachloride were added and maintained at 100° C. for two hours while stirring, then washed with hexane and dried. Thus, a supported titanium catalyst component (a transition metal compound catalyst component) containing 2.8 weight % of titanium was obtained.

(2) Preparation of a preliminarily activated catalyst

After substituting a 5-liter capacity stainless steel reactor having an inclined-turbine agitator with a nitrogen gas, 2.8 liters of n-hexane, 4 mmol of triethyl aluminum (organic metal compound (AL1)) and 9.0 g of the supported titanium catalyst component prepared as mentioned above (5.26 mmol in a titanium atom conversion) were added, then 20 g of propylene was supplied to carry out a preliminary polymerization at −2° C. for ten minutes.

Polymer produced in a preliminary polymerization separately conducted under the same conditions was analyzed to find that 2 g of propylene became polypropylene (B) per gram of the supported titanium catalyst component, and the limiting viscosity $[\eta_B]$ of the polypropylene (B) measured in tetralin at 135° C. was 2.8 dl/g.

After the reaction period, unreacted propylene was discharged outside the reactor. After substituting the gas phase part in the reactor with a nitrogen gas once, ethylene was continuously supplied for two hours so as to maintain the inside pressure at 0.59 MPa while maintaining the temperature inside the reactor at −1° C. to carry out the preliminary activation.

Polymer produced in a preliminary activating polymerization separately conducted under the same conditions was analyzed to find that 24 g of polymer existed per gram of the supported titanium catalyst component, and the polymer had a limiting viscosity $[\eta_{T2}]$ measured in tetralin at 135° C. of 31.4 dl/g.

The amount ($W_2$) of polyethylene (A) per gram of the supported titanium catalyst component produced in the preliminary activating polymerization with ethylene can be calculated as a difference between the produced amount ($W_{T2}$) of polymer per gram of the supported titanium catalyst component after the preliminary activating treatment and the produced amount ($W_1$) of polypropylene (B) per gram of the supported titanium catalyst component after the preliminary polymerization by the following formula:

$$W_2 = W_{T2} - W_1.$$

Furthermore, the limiting viscosity $[\eta_A]$ of the polyethylene (A) produced in the preliminary activating polymerization with ethylene can be calculated from the limiting viscosity $[\eta_B]$ of the polypropylene (B) produced in the preliminary polymerization and the limiting viscosity $[\eta_{T2}]$ of the polymer produced in the preliminary activating treatment by the following formula:

$$[\eta_A] = ([\eta_{T2}] \times W_{T2} - [\eta_B] \times W_1)/(W_{T2} - W_1) = [\eta_E].$$

According to the above-mentioned formula, the amount of the polyethylene (A) produced in the preliminary activating polymerization with ethylene was 22 g per gram of the supported titanium catalyst component and the limiting viscosity $[\eta_A]$ was 34.0 dl/g.

After the reaction period, unreacted ethylene was discharged outside the reactor. After substituting the gas phase part of the reactor with a nitrogen gas once and adding 1.6 mmol of diisopropyldimethoxysilane (electron donor (E1)) in the reactor, and then supplying 20 g of propylene and maintaining at 1° C. for 10 minutes, the addition polymerization was carried out after the preliminary activating treatment.

Polymer produced in the addition polymerization separately conducted under the same conditions was analyzed to find that 26 g of polymer existed per gram of the supported titanium catalyst component, and the polymer had a limiting viscosity $[\eta_{T3}]$ measured in tetralin at 135° C. of 29.2 dl/g. The amount ($W_3$) of polypropylene produced by the addition polymerization calculated as mentioned above was 2 g per gram of the supported titanium catalyst component and the limiting viscosity $[\eta_C]$ was 2.8 dl/g.

After the reaction period, unreacted propylene was discharged outside the reactor. The gas phase part of the reactor was substituted with a nitrogen gas once to obtain the preliminarily activated catalyst slurry for a main (co) polymerization.

(3) Production of polypropylene composition (main (co) polymerization of propylene)

After substituting a 500 liter capacity stainless steel polymerization reactor having a stirrer with a nitrogen gas, 240 liters of n-hexane, 780 mmol of triethyl aluminum (organic metallic compound (AL2)), 78 mmol of diisopropyldimethoxysilane (electron donor (E2)) and ½ amount of the preliminarily activated catalyst slurry obtained as mentioned above were added at 20° C. Then, after introducing 15 liters of hydrogen into the polymerization reactor and raising the temperature to 70° C., propylene was supplied continuously into the polymerization reactor while maintaining the pressure of the gas phase part in the polymerization reactor at 0.79 MPa for two hours in the condition of the polymerization temperature at 70° C. to carry out the main polymerization of propylene.

After the polymerization, 1 liter of methanol was introduced into the polymerization reactor and a catalyst deactivation reaction was conducted at 70° C. for 15 minutes. Then, after discharging the unreacted gas, the solvent was separated and the polymer was dried to obtain 40.1 Kg of polymer having the limiting viscosity $[\eta_T]$ of 2.73 dl/g. The obtained polymer was a polypropylene composition containing 0.25 weight % of the polyethylene (A) according to the preliminary activating polymerization as the (a) component. The limiting viscosity $[\eta_P]$ of the polypropylene as the (b) component was 2.65 dl/g.

0.1 parts by weight of 2,6-di-t-butyl-p-cresol and 0.1 parts by weight of calcium stearate were mixed with 100 parts by weight of the polypropylene composition separately produced similarly to the same conditions. The mixture was pelletized at 230° C. by using an extruding pelletizer having a screw diameter of 40 mm so as to have pellets. Various physical properties of the pellets were measured and evaluated to find that the pellets had an MFR of 0.50 g/10 minutes, the crystallization temperature of 116.8° C. and the melt tension (MS) of 9.0 cN. Detailed physical properties are shown in Table 1.1.

(4) Irradiation of polypropylene composition powder with electron rays 200 gram of the obtained propylene polymer composition powder was placed in a polyethylene terephthalate bag with a stopcock. Then, inside the bag was made to be a nitrogen atmosphere by repeating operations of evacuating the inside of the bag and supplying nitrogen gas up to atmospheric pressure ten times. Then, the bag was fixed to the conveyor for irradiation of electron rays so that the thickness of polypropylene composition was 1 cm. The irradiation of electron rays was carried out by using the Cockcroft-Walton accelerator, passing the bag through a conveyor (conveyor rate: 0.97 m/min) at the point 20 cm below from the irradiation window under the conditions of acceleration voltage of 2 MV and electric current of 1.0 mA, so that the dose absorbed by the propylene polymer composition contained in the polyethylene terephthalate bag on the conveyor was 10.0 kGy. The temperature at the time of irradiation was 25° C.

Thereafter, the polypropylene composition that had been irradiated with electron ray was placed in an oven in a state in which it was in a nitrogen atmosphere and contained in the polyethylene terephthalate bag and then heat-treated at 135° C. for 30 minutes. Thus, a modified polypropylene composition powder was obtained.

(5) Pelletization of modified polypropylene composition powder 0.1 parts by weight of tetrakis[methylene-3-(3',5'-di-t-butyl-4'-hydroxyphenyl) propionate]methane and 0.1 parts by weight of calcium stearate were mixed with 100 parts by weight of the obtained modified polypropylene composition, and the mixture was melted and kneaded and pelletized with an extruding pelletizer having a screw diameter of 40 mm at 230° C., thus preparing modified polypropylene composition pellets.

The various physical properties of the obtained pellets were evaluated to find that the pellets had an MFR of 0.80 g/10 minutes, a crystallization temperature of 133.4° C. and a melt tension (MS) of 13.0 cN. Other detailed properties are shown in Table 1-1.

It was found that the irradiation of electron rays greatly improved the melt tension and crystallization temperature.

Example 1-2

Polypropylene composition pellet was obtained by the same method as in Example 1-1, and by using this pellet, a JIS type test piece was produced with an injection molding machine under the conditions of a molten resin temperature at 230° C. and a die temperature at 50° C. The test piece was placed in a polyethylene terephthalate bag with a stopcock. Then, inside the bag was made to be a nitrogen atmosphere by repeating operations of evacuating the inside of the bag and supplying nitrogen gas up to the atmospheric pressure ten times. Then, the bag was fixed to the conveyor for irradiation of electron rays.

For irradiation with electron rays, Cockcroft-Walton accelerator was used and was carried out by passing the bag through a conveyor (conveyor rate: 0.97 m/min) at the point 20 cm below from the irradiation window under the conditions of acceleration voltage of 2 MV and electric current of 1.0 mA, so that the dose absorbed by the propylene polymer composition contained in the polyethylene terephthalate bag on the conveyor was 200 kGy. The temperature at the time of irradiation was 25° C.

Thereafter, the test piece of polypropylene composition that had been irradiated with electron ray was placed in an oven in a state in which it was in a nitrogen atmosphere and contained in the polyethylene terephthalate bag and then heat-treated at 135° C. for 30 minutes. Thus, a modified polypropylene composition test piece was obtained.

The various physical properties of the test piece was evaluated to find that the test piece had an MFR of 1.50 g/10 minutes, a crystallization temperature of 131.0° C. and a gel fraction was 35.0%. Other detailed properties are shown in Table 1-1.

It was found that the irradiation of electron rays greatly improved the crystallization temperature and that the gel fraction became so high as 35.0%, which shows that a cross-linked structure was introduced and it contributed to the improvement of the rigidity.

Comparative Example 1-1

A polypropylene composition powder was obtained and then polypropylene composition pellet was obtained in the same manner as the example 1-1 except that in the example 1-1(2), the preliminary activating polymerization with ethylene was replaced by the procedure in which 220 g of propylene was supplied into the reactor in three steps, namely, 80 g was supplied at initiating the preliminary activating polymerization, 80 g at 30 minutes after the initiation and 60 g at 60 minutes after the initiation, and that the electron ray irradiating process (4) was omitted.

The various physical properties of the pellets were measured and evaluated to find that the pellets had an MFR of 0.50 g/10 minutes, a crystallization temperature of 114.5° C., and a melt tension of 4.1 cN. Other detailed properties are shown in Table 1-1.

It was found that the crystallization temperature and the melt tension were significantly deteriorated as compared with the polypropylene composition before irradiation obtained in the process of Example 1-1 (3) and the modified polypropylene composition that was obtained as a final product of Example 1-1.

Comparative Example 1-2

A polypropylene composition pellet was obtained in the same manner as the example 1-1 (4) and (5) except that the same composition as polypropylene composition powder obtained in the comparative example 1-1 was used as a sample.

The various physical properties of the pellets were measured and evaluated to find that the pellets had an MFR of 1.30 g/10 minutes, a crystallization temperature of 120.5° C., and a melt tension of 2.8 cN. Other detailed properties are shown in Table 1-1.

It was found that the crystallization temperature and the melt tension were significantly deteriorated as compared with Example 1-1.

Comparative Example 1-3

Polypropylene composition pellet obtained by the same method as in comparative example 1-1 was formed in a JIS type test piece by using an injection molding machine with a molten resin temperature of 230° C. and a die temperature of 50° C. The test piece was placed in a polyethylene terephthalate bag with a stopcock. Then, inside the bag was made to be a nitrogen atmosphere by repeating operations of evacuating the inside of the bag and supplying nitrogen gas up to the atmospheric pressure ten times. Then, the bag was fixed to the conveyor for irradiation of electron rays.

For irradiation with electron rays, Cockcroft-walton accelerator was used and irradiation was carried out by passing the bag through a conveyor (conveyor rate: 0.97 m/min) at the point 20 cm below from the irradiation window under the conditions of acceleration voltage of 2 MV and electric current of 1.0 mA, so that the absorbing dose of the propylene polymer composition contained in the polyethylene terephthalate bag on the conveyor was 200 kGy. The temperature at the time of irradiation was 25° C.

Thereafter, the test piece of polypropylene composition that had been irradiated with electron ray was placed in an oven in a state in which it was in a nitrogen atmosphere and contained in the polyethylene terephthalate bag and then heat-treated at 135° C. for 30 minutes. Thus, a test piece of irradiated polypropylene composition was obtained.

The various physical properties of the test piece was measured and evaluated to find that the test pieces had an MFR of 1.70 g/10 minutes, a crystallization temperature of 130.2° C. and a gel fraction was 10.2%. Other detailed properties are shown in Table 1-1. It was found that the gel fraction was low and irradiation efficiency of the electron rays was inferior to that in Example 1-2.

Comparative Example 1-4

A polypropylene composition powder was obtained and then polypropylene composition pellet was obtained in the same manner as Example 1-1 except that the preliminary activating polymerization with ethylene was not carried out in Example 1-1 (2), and that the electron ray irradiating process (4) was omitted.

The various physical properties of the pellets were measured and evaluated to find that the pellets had an MFR of 0.50 g/10 minutes, a crystallization temperature of 114.5° C., and a melt tension of 4.1 cN. Other detailed properties are shown in Table 1-1.

It was found that the crystallization temperature and the melt tension were significantly deteriorated as compared with the polypropylene composition before irradiation obtained in the process of Example 1-1 (3) and the modified polypropylene composition that was obtained as a final product of Example 1-1.

TABLE 1-1

|  | Examples | | Comparative Examples | | | |
| --- | --- | --- | --- | --- | --- | --- |
|  | 1-1 | 1-2 | 1-1 | 1-2 | 1-3 | 1-4 |
| Remarks | Before modified with Electron rays | After modified with electron rays | *3 | *3 | *3 |  |
| Dose of electron rays (KGy) | 0 | 10 | 200 | 0 | 10 | 200 | 0 |
| Preliminary polymerization (polypropylene (B)) | | | | | | |
| Limiting viscosity [$\eta_B$](dl/g) | 2.8 | — | — | 2.8 | — | — | 2.8 |
| Composition ratio *1 (wt. %) | 0.02 | 0.02 | 0.02 | 0.02 | 0.02 | 0.02 | 0.02 |
| Preliminary activation (polyethylene (A)) | | | | | | |
| Limiting viscosity [$\eta_A$](dl/g) | 34.0 | — | — | 2.8 | — | — | — |
| Composition ratio *1 (wt. %) | 0.25 | 0.25 | 0.25 | 0.25 | 0.25 | 0.25 | 0 |
| Addition polymerization (polypropylene (C)) | | | | | | |
| Limiting viscosity [$\eta_C$](dl/g) | 2.8 | — | — | 2.8 | — | — | — |
| Composition ratio *1 (wt. %) | 0.02 | 0.02 | 0.02 | 0.02 | 0.02 | — | — |

TABLE 1-1-continued

|  | Examples | | Comparative Examples | | | |
| --- | --- | --- | --- | --- | --- | --- |
|  | 1-1 | 1-2 | 1-1 | 1-2 | 1-3 | 1-4 |
| Propylene polymer | | | | | | |
| Limiting viscosity [η$_P$](dl/g) | 2.65 | — | — | 2.73 | — | 2.73 |
| Composition ratio *1 (wt. %) | 99.7 | 99.7 | 99.7 | 99.7 | 99.7 | 99.7 | 100 |
| (Modified) propylene polymer composition | | | | | | |
| Limiting viscosity [η$_T$](dl/g) | 2.73 | 2.52 | #1 | 2.73 | 2.32 | #1 | 2.73 |
| MFR (g/10 minutes) | 0.50 | 0.80 | 1.50 | 0.50 | 1.30 | 1.7 | 0.50 |
| Melt tension (MS) (cN) | 9.0 | 13.0 | #2*2 | 4.1 | 2.8 | #2*2 | 4.1 |
| Crystallization temperature (° C.) | 116.8 | 133.1 | 131.0 | 114.5 | 120.5 | 130.2 | 114.5 |
| Gel fraction (wt %) | 0 | 0 | 35.0 | 0 | 0 | 10.2 | 0 |

Remarks:
*1: composition ratio in the propylene polymer composition (wt %)
*2: Since the gel parts are included, the molten resin is not stretched but cut.
*3: Propylene was used as a monomer for preliminary activation.
1: non-dissolved portions were frequently generated.
2: not measurable Comparative Example 1-5

Pellets of polypropylene composition were obtained in the same manner as in the processes in Example 1-1 (4) and (5) except that the same products as polypropylene composition powder obtained in the comparative example 1-4 was used as a sample.

The various physical properties of the pellets were measured and evaluated to find that the pellets had an MFR of 1.30 g/10 minutes, a crystallization temperature of 120.5° C., and a melt tension of 2.8 cN. Other detailed properties are shown in Table 1-2. It was found that the crystallization temperature and the melt tension were significantly deteriorated as compared with Example 1-1.

Comparative Example 1-6

An irradiated test piece of a polypropylene composition was obtained in the same manner as the process of Example 1-2 except that the same product as the polypropylene composition powder obtained in the comparative example 1-4 was used as a sample.

The various physical properties of the test pieces were measured and evaluated to find that the test pieces had an MFR of 1.70 g/10 minutes, a crystallization temperature of 130.0° C., and a gel fraction 10.0%. Other detailed properties are shown in Table 1-2. It was found that the gel fraction was lower than that in Example 1-2, and the irradiation efficiency of the electron rays was inferior to that in Example 1-2.

Comparative Example 1-7

Only the preliminary activating polymerization with ethylene in Example 1-1 (2) was carried out without the preliminary polymerization with propylene and the addition polymerization with propylene. 1 liter of methanol was added to the obtained preliminarily activated catalyst slurry to cause a deactivation reaction at 70° C. for one hour. After the reaction, polyethylene was separated from the slurry by filtration, then dried under a reduced pressure to obtain 200 g of polyethylene having a limiting viscosity [η$_A$] of 34.0 dl/g.

20 kg of polypropylene obtained by the main polymerization of propylene without the preliminary activating polymerization with ethylene and the addition polymerization with propylene in Example 1-1 (2) and 50 g of the above-prepared polyethylene were mixed so as to obtain a polypropylene composition. To the above-obtained mixture, the same irradiation as in Example 1-1 (4) was conducted, and 20 g of 2,6-di-t-butyl-p-cresol and 20 g of calcium stearate were added and mixed by using a 100-liter capacity Henschel mixer for three minutes. Then, the mixture was pelletized with an extruding pelletizer having a screw diameter of 40 mm at 230° C. to thus obtain pellets.

Various physical properties of the obtained pellets were measured and evaluated to find that the pellet had an MFR of 0.51 g/10 minutes, melt tension (MS) of 4.1 cN and the crystallization temperature of 115.0° C. Other detailed properties are shown in Table 1-2.

It was found that the crystallization temperature and the melt tension were significantly deteriorated as compared with the polypropylene composition before irradiation obtained in the process of Example 1-1 (3) and the modified polypropylene composition that was obtained as a final product of Example 1-1.

Comparative Example 1-8

A polypropylene composition pellet was obtained in the same manner as the processes in Example 1-1 (4) and (5) except that a product obtained by the same manner as the polypropylene composition powder obtained in the comparative example 1-7 was used as a sample.

The various physical properties of the pellets were measured and evaluated to find that the pellets had an MFR of 1.30 g/10 minutes, a crystallization temperature of 121.0° C., and a melt tension of 2.8 cN. Other detailed properties are shown in Table 1-2. It was found that the crystallization temperature and the melt tension were significantly deteriorated as compared with Example 1.1.

Comparative Example 1-9

An irradiated test piece of a polypropylene composition was obtained in the same processes in Example 1-2 except that the same composition as the polypropylene composition obtained in the comparative example 1-7 was used as a sample.

The various physical properties of the test piece were measured and evaluated to find that the test pieces had an MFR of 1.70 g/10 minutes, a crystallization temperature of 130.2° C., and a gel fraction was 12.2%. Other detailed properties are shown in Table 1-2. It was found that the gel fraction was much lower than that in Example 1-2 and irradiation efficiency of electron rays was inferior to that in Example 1-2.

TABLE 1-2

|  | Comparative Examples | | | | |
| --- | --- | --- | --- | --- | --- |
|  | 1-5 | 1-6 | 1-7 | 1-8 | 1-9 |
| Remarks |  |  | *4 | *4 | *4 |
| Dose of electron rays (KGy) | 10 | 200 | 0 | 10 | 200 |
| Preliminary polymerization (polypropylene (B)) |  |  |  |  |  |
| Limiting viscosity [$\eta_B$](dl/g) | — | — | — | — | — |
| Composition ratio *1 (wt. %) | 0.02 | 0.02 | 0 | 0 | 0 |
| Preliminary activation (polyethylene (A)) |  |  |  |  |  |
| Limiting viscosity [$\eta_A$](dl/g) | — | — | 34.0 | — | — |
| Composition ratio *1 (wt. %) | 0 | 0 | 0.25 | 0.25 | 0.25 |
| Addition polymerization (polypropylene (C)) |  |  |  |  |  |
| Limiting viscosity [$\eta_C$](dl/g) | — | — | — | — | — |
| Composition ratio *1 (wt. %) | 0.02 | 0.02 | 0 | 0 | 0 |
| Propylene polymer |  |  |  |  |  |
| Limiting viscosity [$\eta_P$](dl/g) | — | — | 2.70 | — | 1.70 |
| Composition ratio *1 (wt. %) | 100 | 100 | 99.8 | 99.8 | 99.8 |
| (Modified) propylene polymer composition |  |  |  |  |  |
| Limiting viscosity [$\eta_T$](dl/g) | 2.32 | #1 | 2.71 | 2.32 | #1 |
| MFR (g/10 minutes) | 1.30 | 1.70 | 0.50 | 1.30 | 1.70 |
| Melt tension (MS) (cN) | 2.8 | #2*2 | 4.1 | 2.8 | #2*2 |
| Crystallization temperature (° C.) | 120.5 | 130.0 | 115.0 | 121.0 | 130.2 |
| Gel fraction (wt %) | 0 | 10 | 0 | 0 | 10.2 |

Remarks:
*1: composition ratio in the propylene polymer composition (wt %)
*2: Since the gel parts are included, the molten resin is not stretched but cut.
*4: mechanical and simple mixing of polyethylene and main polymerized polypropylene.
1: non-dissolved portions were frequently generated.
2: not- measurable Example 1-3

The pellets of modified polypropylene composition that had been obtained by the same manner as in Example 1-1 were used and formed into a sheet having a thickness of 0.4 mm by the use of a T die sheet molding machine having a screw diameter of 65 mm at the resin temperature of 230° C. and cooling temperature of 60° C. The data of heating behavior to show the molding properties of the sheet at this time are shown in Table 1-3.

It was found that the resultant molding properties were quite excellent: more specifically, the hanging amount is small, the returning rate was 100% and maintaining time was very long such as 150 seconds. In particular, the molding property was suitable for thermally molding a large size sheet.

Comparative Example 1-10

A sheet having a thickness of 0.4 mm was formed by the same method as in Example 1-3 except that the polypropylene composition pellets before irradiation that was obtained by the same process as in Example 1-1 (3) was used. The data of heating behavior to show the molding properties of the sheet at this time are shown in Table 1-3. It was found that the resultant molding properties were excellent, however it was somewhat inferior to those of Example 1-3.

Comparative Example 1-11

A sheet having a thickness of 0.4 mm was formed by the same manner as in Example 1-3 except that the pellet obtained by the same method as that of the polypropylene composition pellet obtained in comparative example 1-1 was used. The data of heating behavior to show the molding properties of the obtained sheet at this time are shown in Table 1-3. It was found that the resultant molding properties were quite inferior to those of Example 1-3.

Comparative Example 1-12

A sheet having a thickness of 0.4 mm was formed by the same manner ass in Example 1-3 except that the pellet obtained by the same method as that of the polypropylene composition pellet obtained as a final product in comparative example 1-2 was used. The data of heating behavior to show the molding properties of the obtained sheet at this time are shown in Table 1-3. It was found that the resultant molding properties were quite inferior to those of Example 1-3.

Comparative Example 1-13

A sheet having a thickness of 0.4 mm was formed by the same manner as in Example 1-3 except that the pellet obtained by the same method as that of the polypropylene composition pellet obtained in comparative example 1-4 was used. The data of heating behavior to show the molding properties of the obtained sheet at this time are shown in Table 1-3. It was found that the resultant molding properties were quite inferior to those of Example 1-3.

Comparative Example 1-14

A sheet having a thickness of 0.4 mm was formed by the same manner as in Example 1-3 except that the pellet obtained by the same method as that of the polypropylene composition pellet obtained as a final product in comparative example 1-5 was used. The data of heating behavior to show the molding properties of the obtained sheet at this time are shown in Table 1-3. It was found that the resultant molding properties were quite inferior to those of Example 1-3.

Comparative Example 1-15

A sheet having a thickness of 0.4 mm was formed by the same manner as in Example 1-3 except that the pellet obtained by the same method as that of the polypropylene composition pellet obtained in comparative example 1-7 was used. The data of heating behavior to show the molding properties of the obtained sheet at this time are shown in Table 1-3. It was found that the resultant molding properties were quite inferior to those of Example 1-3.

Comparative Example 1-16

A sheet having a thickness of 0.4 mm was formed by the same manner as in Example 1-3 except that the pellet obtained by the same method as that of the polypropylene composition pellet obtained as a final product in comparative example 1-8 was used. The data of heating behavior to show the molding properties of the obtained sheet at this time are shown in Table 1-3. It was found that the resultant molding properties were quite inferior to those of Example 1-3.

TABLE 1-3

| | Example | Comparative Example | | | | | | |
|---|---|---|---|---|---|---|---|---|
| | 1-3 | 1-10 | 1-11 | 1-12 | 1-13 | 1-14 | 1-15 | 1-16 |
| Hanged-down amount (mm) | 5 | 13 | 15 | 15 | 14 | 15 | 15 | 15 |
| Returning rate (%) | 100 | 100 | 92 | 85 | 92 | 85 | 90 | 85 |
| Maintaining time (sec) | 150 | 80 | 50 | 40 | 50 | 40 | 50 | 45 |

Example 2-1

(1) Preparation of a transition metal compound catalyst component

A supported titanium catalyst component was obtained by the same operation as in Example 1-1 (1).

(2) Preparation of a preliminarily activated catalyst

Preliminarily activated catalyst slurry was obtained by the same operation as in Example 1-1 (2).

(3) Production of polypropylene composition (main (co) polymerization of propylene)

After substituting a 500-liter capacity stainless steel polymerization reactor having a stirrer with a nitrogen gas, 240 liters of n-hexane, 780 mmol of triethyl aluminum (organic metallic compound (AL2)), 78 mmol of diisopropyldimethoxysilane (electron donor (E2)) and ½ amount of the preliminarily activated catalyst slurry obtained as mentioned above were added at 20° C. Then, after introducing 55 liters of hydrogen into the polymerization reactor and raising the temperature to 70° C., propylene was supplied continuously into the polymerization reactor while maintaining the pressure of the gas phase part in the polymerization reactor at 0.79 MPa for two hours under the condition of the polymerization temperature at 70° C. to carry out the main polymerization of propylene.

After the polymerization, 1 liter of methanol was introduced into the polymerization reactor and a catalyst deactivation reaction was conducted at 70° C. for 15 minutes. Then, after discharging the unreacted gas, the solvent was separated and the polymer was dried to obtain 40.1 kg of polymer having the limiting viscosity $[\eta_T]$ of 1.97 dl/g. The obtained polymer was a polypropylene composition containing 0.25 weight % of the polyethylene (A) according to the preliminary activating polymerization as the (a) component. The limiting viscosity $[\eta_P]$ of the polypropylene as the (b) component was 1.89 dl/g.

(4) Addition of radical generators and pelletization 0.01 parts by weight of 2,5-di-methyl-2,5-di(t-butyl peroxy) hexane, 0.1 parts by weight of 2,6-di-t-butyl-p-cresol and 0.1 parts by weight of calcium stearate were mixed with 100 parts by weight of the obtained polypropylene composition. The mixture was pelletized at 230° C. by using an extruding pelletizer having a screw diameter of 40 mm so as to have pellets.

Various physical properties of the pellets were measured and evaluated. As shown in Table 2-1, the obtained pellets had an MFR of 5.3 g/10 minutes and the melt tension (MS) of 7.0 cN.

Example 2-2

0.03 parts by weight of 2,5-di-methyl-2,5-di(t-butyl peroxy) hexane, 0.1 parts by weight of 2,6-di-t-butyl-p-cresol and 0.1 parts by weight of calcium stearate were mixed with 100 parts by weight of the polypropylene composition that had been obtained in Example 2-1 (3). The mixture was pelletized at 230° C. by using an extruding pelletizer having a screw diameter of 40 mm so as to have pellets.

Various physical properties of the pellets were measured and evaluated. As shown in Table 2-1, the obtained pellets had an MFR of 16 g/10 minutes and the melt tension (MS) of 2.1 cN.

Comparative Example 2-1

0.1 parts by weight of 2,6-di-t-butyl-p-cresol and 0.1 parts by weight of calcium stearate were mixed with 100 parts by weight of the polypropylene composition that had been obtained in Example 2-1 (3). The mixture was pelletized at 230° C. by using an extruding pelletizer having a screw diameter of 40 mm so as to have pellets. Various physical properties of the pellets were measured and evaluated. As shown in Table 2-1, the obtained pellets had an MFR of 3.5 g/10 minutes and the melt tension (MS) of 4.9 cN.

Comparative Example 2-2

Polypropylene was produced by the same operations as in Examples 2-1 (1) to (3) except that the supported titanium catalyst component was not subjected to the preliminary activating polymerization with ethylene in Example 2-1 (2). 0.1 parts by weight of 2,6-di-t-butyl-p-cresol and 0.1 parts by weight of calcium stearate were mixed with 100 parts by weight of the obtained polypropylene composition. The mixture was pelletized at 230° C. by using an extruding pelletizer having a screw diameter of 40 mm so as to form pellets. Various physical properties of the pellets were measured and evaluated. As shown in Table 2-1, the obtained pellets had an MFR of 4.5 g/10 minutes and the melt tension (MS) of 0.8 cN.

Comparative Example 2-3

0.01 parts by weight of 2,5-di-methyl-2,5-di(t-butyl peroxy) hexane, 0.1 parts by weight of 2,6-di-t-butyl-p-cresol and 0.1 parts by weight of calcium stearate were mixed with 100 parts by weight of the polypropylene composition that had been obtained in comparative example 2-2. The mixture was pelletized at 230° C. by using an extruding pelletizer having a screw diameter of 40 mm so as to form pellets. The results of the measured and evaluated various physical properties of the pellets are shown in Table 2-1.

Comparative Example 2-4

0.03 parts by weight of 2,5-di-methyl-2,5-di(t-butyl peroxy) hexane, 0.1 parts by weight of 2,6-di-t-butyl-p- cresol and 0.1 parts by weight of calcium stearate were mixed with 100 parts by weight of the polypropylene composition that had been obtained in comparative example 2-2. The mixture was pelletized at 230° C. by using an extruding pelletizer having a screw diameter of 40 mm so as to form pellets. The results of the evaluated various physical properties of the pellets are shown in Table 2-1.

Example 2-3

Polypropylene was produced and pelletized by the same operation as in Example 2-1 except that the producing amount of polythylene (A) by changing the conditions for preliminary activating polymerization with ethylene in Example 2-1 (2). Various physical properties of the pellets were measured and evaluated. As shown in Table 2-1, the obtained pellets had an MFR of 7 g/10 minutes and the melt tension (MS) of 1.8 cN.

TABLE 2-1

| | Examples | | | Comparative Examples | | | |
|---|---|---|---|---|---|---|---|
| | 2-1 | 2-2 | 2-3 | 2-1 | 2-2 | 2-3 | 2-4 |
| Preliminary polymerization (polypropylene (B)) | | | | | | | |
| Limiting viscosity $[\eta_B](dl/g)$ | 2.8 | 2.8 | 2.8 | 2.8 | 2.8 | 2.8 | 2.8 |
| Amount of production *1 (g/g) | 2.0 | 2.0 | 2.0 | 2.0 | 2.0 | 2.0 | 2.0 |
| Composition ratio *2 (wt. %) | 0.02 | 0.02 | 0.02 | 0.02 | 0.02 | 0.02 | 0.02 |
| Preliminary activation (polyethylene (A)) | | | | | | | |
| Limiting viscosity $[\eta_A](dl/g)$ | 34.0 | 34.0 | 34.0 | 34.0 | — | — | — |
| Amount of production *1 (g/g) | 22.0 | 22.0 | 4.5 | 22.0 | — | — | — |
| Composition ratio *2 (wt. %) | 0.25 | 0.25 | 0.05 | 0.25 | — | — | — |
| Addition polymerization (polypropylene (C)) | | | | | | | |
| Limiting viscosity $[\eta_C](dl/g)$ | 2.8 | 2.8 | 2.8 | 2.8 | 2.8 | 2.8 | 2.8 |
| Amount of Production *1 (g/g) | 2.0 | 2.0 | 2.0 | 2.0 | 2.0 | 2.0 | 2.0 |
| Composition ratio *2 (wt. %) | 0.02 | 0.02 | 0.02 | 0.02 | 0.02 | 0.02 | 0.02 |
| Polymerization process | | | | | | | |
| Limiting viscosity $[\eta^D](dl/g)$ | 1.89 | 1.89 | 1.90 | 1.89 | 1.89 | 1.89 | 1.89 |
| Composition ratio *2 (wt. %) | 99.7 | 99.7 | 99.9 | 99.7 | 100 | 100 | 100 |
| Propylene (co)polymer Limiting viscosity $[\eta_P](dl/g)$ | 1.89 | 1.89 | 1.90 | 1.89 | 1.89 | 1.89 | 1.89 |
| Radical generators(X) *3 | 0.01 | 0.03 | 0.01 | 0 | 0 | 0.01 | 0.03 |
| (Modified) propylene (co)polymer composition | | | | | | | |
| Limiting viscosity $[\eta_T](dl/g)$ | 1.84 | 1.53 | 1.76 | 1.97 | 1.89 | 1.77 | 1.52 |
| Melt tension (MS) (cN) | 7.0 | 2.1 | 1.8 | 4.9 | 0.8 | 0.3 | 0.1 |
| MFR (g/10 minutes) | 5.3 | 16 | 7.0 | 3.5 | 4.5 | 6.8 | 17 |

Remarks:
*1: amount of production per gram of transition metal compound catalyst component (g)
*2: composition ratio in the propylene (co)polymer composition (wt %)
*3: 2,5-dimethyl-2,5-di(t-butyl peroxy) hexane

Example 2-4

(1) Preparation of a transition metal compound catalyst component 37.5 liter of decane, 7.14 kg of magnesium chloride anhydride and 35.1 liter of 2-ethyl-1-hexanol were mixed in a stainless steel reactor with a stirrer, then heat-reacted while stirring at 140° C. for 4 hours so as to have a uniform solution. 1.67 kg of phthalic anhydride was added into this uniform solution and, further mixed at 130° C. for one hour while stirring, and phthalic anhydride was dissolved in this uniform solution.

The obtained uniform solution was cooled to room temperature (23° C.) and then the whole amount of this uniform solution was dripped into 200 liters of titanium tetrachloride that was kept at −20° C. over three hours. After dripping, the temperature was raised to 110° C. over 4 hours. When the temperature reached 110° C., 5.03 liters of di-i-butyl phthalate was added thereto and the mixture was reacted while stirring at 110° C. for two hours. After two hours of the reaction was completed, the solid phase part was taken by thermal filtration. Thereafter, the solid parts were suspended in 275 liters of titanium tetrachloride again, and then the reaction was maintained again for two hours at 110° C. After the reaction was completed, the solid parts were taken by thermal filteration again and washed with n-hexane until no free titanium was detected in the washing solution. Sequentially, the solvent was separated by filtration, and the solid parts was dried under a reduced pressure to obtain a supported titanium catalyst component (a transition metal compound catalyst component) containing 2.4 weight % of titanium was obtained.

(2) Preparation of a preliminarily activated catalyst

After substituting a 30-liter capacity stainless steel reactor having an inclined-turbine agitator with a nitrogen gas, 18 liters of n-hexane, 60 mmol of triethyl aluminum (organic metal compound (AL1)) and 150 g of the supported titanium catalyst component prepared as mentioned above (75.16 mmol in a titanium atom conversion) were added, then 210 g of propylene was supplied to carry out a preliminary polymerization at −1° C. for 20 minutes.

Polymer produced after a preliminary polymerization separately conducted under the same conditions was analyzed to find that 1.2 g of polypropylene (B) per gram of the supported titanium catalyst component was produced and this polypropylene (B) had a limiting viscosity [$\eta_B$] measured in tetralin at 135° C. of 2.7 dl/g.

After the reaction period, unreacted propylene was discharged outside the reactor. After substituting the gas phase part in the reactor with a nitrogen gas once, ethylene was supplied continuously into the reactor for three hours so as to maintain the inside pressure at 0.59 MPa while maintaining the inside temperature at −1° C. to carry out the preliminary activating polymerization.

Polymer produced in a preliminary activating polymerization that was separately conducted under the same conditions was analyzed to find that 33.2 g of polymer existed per gram of the supported titanium catalyst component and the polymer had a limiting viscosity [$\eta_{T2}$] measured in tetralin at 135° C. of 29.2 dl/g.

The amount of polyethylene (A) that was newly produced in the preliminary activating polymerization with ethylene was 32 g per gram of the supported titanium catalyst component and the limiting viscosity [$\eta_A$] was 30.2 dl/g.

After the reaction period, unreacted ethylene was discharged outside the reactor. After substituting the gas phase part of the reactor with a nitrogen gas once and adding 22.5 mmol of diisopropyldimethoxysilane (electron donor (E1)), and then 385 g of propylene was supplied and kept at 0° C. for 20 minutes to carry out the addition polymerization after the preliminary activating treatment. After the reaction period, unreacted ethylene was discharged outside the reactor. Then, after the gas phase part of the reactor was substituted with a nitrogen gas once, a preliminarily activated catalyst slurry for main (co)polymerization was obtained.

Polymer produced in the addition polymerization separately conducted under the same conditions was analyzed to find that 35.4 g of polymer existed per gram of the supported titanium catalyst component, and the polymer had a limiting viscosity [$\eta_{T3}$] measured in tetralin at 135° C. of 27.6 dl/g.

The results show that the amount of newly produced polypropylene by the addition polymerization was 2.2 g per gram of the supported titanium catalyst component and the limiting viscosity [$\eta_C$] was 2.8 dl/g.

(3) Production of polypropylene composition (main (co) polymerization of propylene)

After substituting a 110-liter capacity continuous horizontal gas phase polymerization reactor with a stirrer (length/diameter=3.7) with a nitrogen gas, 25 kg of polypropylene powders were introduced, and further the preliminary activating catalyst slurry was continuously supplied at the rate of 0.61 g/h in conversion of the supported titanium catalyst component. Furthermore, 15 weight % n-hexane solution of triethyl aluminum (organic metallic compound (AL2)) and diisopropyl dimethoxy silane (electron donor (E2)) were continuously supplied so that the molar ratios became 90 and 15 respectively for the titanium atoms in the supported titanium catalyst component.

Furthermore, at the polymerization temperature of 70° C., hydrogen was supplied so as to have the concentration ratio of hydrogen with respect to propylene in the polymerization reactor became 0.006, and furthermore, propylene was supplied so as to maintain the pressure inside the polymerization reactor at 2.15 MPa to conduct the gas phase polymerization of propylene continuously for 150 hours.

During the polymerization period, polymer was taken out from the polymerization reactor at the rate of 11 kg/h so as to maintain the polymer level in the polymerization reactor at 60 volume %.

The taken-out polymer was treated by bringing it into contact with a nitrogen gas containing 5 volume % of water vapor at 100° C. for 30 minutes to obtain a polymer having a limiting viscosity [$\eta T$] of 1.80 dl/g.

The content of polyethylene (A) produced by the preliminary activating treatment in the polymer was 0.18 weight % and the limiting viscosity [$\eta_P$] of polypropylene was 1.75 dl/g.

(4) Addition of radical generators and pelletization 0.03 parts by weight of 1,3-bis(t-butyl peroxy isopropyl) benzene, 0.1 parts by weight of 2,6-di-t-butyl-p-cresol and 0.1 parts by weight of calcium stearate were mixed with 100 parts by weight of the obtained polypropylene composition. The mixture was pelletized at 230° C. by using an extruding pelletizer having a screw diameter of 40 mm so as to have pellets. Various physical properties of the pellets were measured and evaluated. As shown in Table 2-2, the obtained pellets had the MFR of 30 g/10 minutes and the melt tension (MS) of 1.2 cN.

Comparative Example 2-5

Polymer was produced by the same operations as in Example 2-4 (1) to (3) except that the preliminary activating polymerization with ethylene was not carried out in Example 2-4 (2). The obtained polypropylene composition was pelletized under the same conditions as comparative example 2-1. The various properties of the obtained pellet were evaluated and the results are shown in Table 2-2.

Comparative Example 2-6

The polypropylene composition obtained in the comparative example 2-5 was pelletized under the same conditions as in example 2-4 (4). Various properties of the obtained pellets were evaluated and the results were shown in Table 2-2.

Example 2-5

(1) Preparation of a transition metal compound catalyst component

A supported titanium catalyst component was obtained by the same operations as in Example 2-1 (1).

(2) Preparation of a preliminarily activated catalyst

Preliminarily activated catalyst slurry was obtained in the same manner as in Example 2-1 (2) other than that the preliminary polymerization with propylene was omitted.

Polymer produced by a preliminary activating polymerization separately conducted under the same conditions was analyzed to find that 22.2 g of polypropylene (A) existed per gram of the supported titanium catalyst component and the polymer had a limiting viscosity $[\eta_A]$ measured in tetralin at 135° C. of 32.5 dl/g.

Furthermore, the polymer obtained after a preliminary activating polymerization and addition polymerization conducted under the same conditions was analyzed to find that 2.0 g of polymer was newly produced by the addition polymerization with respect to 1 gram of the supported titanium catalyst component and the newly obtained polymer had a limiting viscosity $[\eta_C]$ measured in tetralin at 135° C. of 2.3 dl/g.

(3) Production of polypropylene composition (main (co) polymerization of propylene)

Polypropylene was produced by the main polymerization of propylene under the same conditions of Example 2-1 (3) by using the preliminarily activated catalyst that had been prepared in the above.

(4) Addition of radical generators and pelletization

The obtained polypropylene was pelletized under the same conditions as in Example 2-1 (4). Various physical properties of the pellets were measured and evaluated. As shown in Table 2-2, the obtained pellets had the MFR of 5.1 g/10 minutes and the melt tension (MS) of 3.2 cN.

Example 2-6

(1) Preparation of a transition metal compound catalyst component

A supported titanium catalyst component was obtained under the same conditions as in Example 2-4 (1).

(2) Preparation of a preliminarily activated catalyst

The preliminary activating polymerization and addition polymerization with propylene and addition polymerization with propylene in Example 2-4 (2) were omitted and only the preliminary activating polymerization was carried out under the same conditions as in Example 2-4 (2).

Polymer produced by a preliminary activating polymerization separately conducted in the same conditions was analyzed to find that 29 g of polypropylene (A) existed per gram of the supported titanium catalyst component and the polymer had a limiting viscosity $[\eta_A]$ measured in tetralin at 135° C. of 35.5 dl/g.

(3) Production of polypropylene composition (main (co) polymerization of propylene)

Polypropylene was produced by the main polymerization of propylene under the same conditions of Example 2-4 (3) by using the preliminarily activated catalyst that had been prepared in the above.

(4) Addition of radical generators and pelletization

The obtained polypropylene was pelletized under the same conditions as in Example 2-1 (4). Various physical properties of the pellets were measured and evaluated. As shown in Table 2-2, the obtained pellets had the MFR of 9.8 g/10 minutes and the melt tension (MS) of 1.1 cN.

TABLE 2-2

| | Examples | | | Comparative Examples | |
|---|---|---|---|---|---|
| | 2-4 | 2-5 | 2-6 | 2-5 | 2-6 |
| Preliminary polymerization (polypropylene (B)) | | | | | |
| Limiting viscosity $[\eta_B]$(dl/g) | 2.7 | — | — | 2.7 | 2.7 |
| Amount of Production *1 (g/g) | 1.2 | — | — | 1.2 | 1.2 |
| Composition ratio *2 (wt. %) | 0.01 | — | — | 0.01 | 0.01 |
| Preliminary activation (polyethylene (A)) | | | | | |
| Limiting viscosity $[\eta_A]$(dl/g) | 30.2 | 32.5 | 35.5 | — | — |
| Amount of Production *1 (g/g) | 32.0 | 22.2 | 29.0 | — | — |
| Composition ratio *2 (wt. %) | 0.18 | 0.25 | 0.18 | — | — |
| Additional polymerization (polypropylene (C)) | | | | | |
| Limiting viscosity $[\eta_C]$(dl/g) | 2.8 | 2.3 | — | 2.8 | 2.8 |
| Amount of production *1 (g/g) | 2.2 | 2.0 | — | 2.2 | 2.2 |
| Composition ratio *2 (wt. %) | 0.01 | 0.02 | — | 0.01 | 0.01 |
| Polymerization process | | | | | |
| Limiting viscosity $[\eta^D]$(dl/g) | 1.75 | 1.89 | 1.68 | 1.75 | 1.75 |
| Composition ratio *1 (wt. %) | 99.8 | 99.7 | 99.8 | 100 | 100 |
| Propylene (co)polymer Limiting viscosity $[\eta_P]$(dl/g) | 1.75 | 1.89 | 1.81 | 1.75 | 1.75 |
| Radical generators | | | | | |
| (X)*3 | 0 | 0.01 | 0.01 | 0 | 0 |
| (Y)*4 | 0.03 | 0 | 0 | 0 | 0.03 |
| (Modified) propylene polymer composition | | | | | |
| Limiting viscosity $[\eta_T]$(dl/g) | 1.38 | 1.85 | 1.66 | 1.75 | 1.39 |
| Melt tension (MS) (cN) | 1.2 | 3.2 | 1.1 | 0.6 | —*5 |
| MFR (g/10 minutes) | 30 | 5.1 | 9.8 | 7.2 | 28 |

Remarks:
*1: amount of production per gram of the transition metal compound catalyst component (g)
*2: composition ratio in the propylene (co)polymer composition (wt %)
*3: 2,5-dimethyl-2,5-di(t-butyl peroxy) hexane
*4: 1,3-bis(t-butyl peroxy isopropyl) benzene
*5: not measurable because strand was cut

Example 2-7

(1) Preparation of a transition metal compound catalyst component

A supported titanium catalyst component was obtained by the same operations as in Example 2-4 (1).

(2) Preparation of a preliminarily activated catalyst

Preliminarily activated catalyst slurry was obtained by the same operations as in Example 2-4 (2).

(3) Production of polypropylene composition (main (co) polymerization of propylene)

Polymerization process (1) was carried out similarly to Example 2-4 (3) except that hydrogen was supplied so as to have the concentration ratio of hydrogen with respect to propylene in the polymerization reactor (I) of 0.002, and propylene further was supplied so as to maintain the pressure inside the polymerization reactor at 1.77 MPa.

A polymer obtained by the polymerization process separately conducted under the same conditions was analyzed to find that the MFR was 1.1 g/10 minutes, the limiting viscosity $[\eta_T]$ of the polymer measured in tetralin of 135° C. was 2.39 dl/g. The limiting viscosity $[\eta_P]$ of polypropylene in the polymerization process (I) was 2.32 dl/g.

The polymer obtained in the above-mentioned process was continuously supplied to a polymerization reactor (II) at 60° C. so as to maintain the concentration ratio of hydrogen with respect to propylene in the polymerization reactor of 0.003 and the concentration ratio of ethylene with respect to propylene in the polymerization reactor of 0.2, respectively, and to maintain the pressure inside the polymerization reactor at 1.57 MPa to carry out the polymerization process (II).

During the polymerization period, polymer was taken out from the polymerization reactor at the rate of 9.4 kg/h so as to maintain the polymer level in the polymerization reactor at 60 volume %.

The taken-out polymer was treated by bringing it into contact with a nitrogen gas containing 5 volume % of water vapor at 100° C. for 30 minutes to obtain a polymer having a limiting viscosity $[\eta_T]$ of 2.69 dl/g.

The ratio of polyethylene (A) produced by the preliminary activating treatment in the polymer was 0.21 weight % and the limiting viscosity $[\eta_P]$ of the polypropylene·α-olefin block copolymer composition (b) was 2.63 dl/g.

The polymerization ratio of the polymerization process (I) and the polymerization process (II) was calculated as follows. Copolymers having different reaction amount ratios of ethylene/propylene were prepared beforehand; they were used as the standard sample to make a calibration curve with the infrared absorption spectrum; and further calculated the amount of propylene reacted in the polymerization process (II) from the ethylene/propylene reaction amount ratio in the polymerization process (II) and the ethylene containing amount in the entire polymer. The results are shown in Table 2-3.

(4) Addition radical generators and pelletization

Polymer pellets were prepared with an extruding pelletizer under the same conditions as Example 2-1 (4). Various physical properties of the pellets were measured and evaluated to find that the MFR was 1.1 g/10 minutes and the melt tension (MS) was 4.0 cN, respectively.

Comparative Example 2-7

The supported titanium catalyst slurry was obtained under the same conditions as comparative example 2-5. By using this supported titanium catalyst slurry, the polypropylene·α-olefin block copolymer composition was produced under the same conditions as in example 2-7 (3) and pelletized by using an extruding pelletizer under the same conditions as in Example 2-1 (4).

Various physical properties of the obtained pellets were evaluated and the results are shown in Table 2-3.

Example 2-8

(1) Preparation of a transition metal compound catalyst component

A supported titanium catalyst component was obtained by the same operations as in Example 2-1 (1).

(2) Preparation of a preliminarily activated catalyst

Preliminarily activated catalyst slurry was obtained by the same operation as in Example 2-1 (2).

(3) Production of polypropylene composition (main (co) polymerization of propylene)

After substituting a 500-liter capacity stainless steel polymerization reactor having a stirrer with a nitrogen gas, 240 liters of n-hexane, 780 mmol of triethyl aluminum (organic metal compound (AL2)), 78 mmol of diisopropyldimethoxysilane (electron donor (E2)) and ½ amount of the preliminarily activated catalyst slurry obtained as mentioned above were placed in a polymerization reactor at 20° C. Then, hydrogen and ethylene were supplied so as to maintain the concentration ratio of hydrogen with respect to propylene and the concentration ratio of ethylene with respect to propylene at 0.004 and 0.2, respectively, and the temperature was raised to 60° C. Thereafter, the copolymerization of propylene·α-olefin was carried out by continuously supplying propylene, hydrogen and ethylene in the polymerization reactor for 2 hours while maintaining the pressure inside the polymerization reactor at 0.79 MPa.

After the polymerization duration, 1 liter of methanol was introduced into the polymerization reactor and a catalyst deactivation reaction was conducted at 60° C. for 15 minutes. Then, after discharging unreacted gas, the solvent was separated and the polymer was dried to obtain 41.0 Kg of polymer having the limiting viscosity $[\eta_T]$ of 1.91 dl/g.

The obtained polymer was a polypropylene·α-olefin random copolymer composition containing 0.24 weight % of the polyethylene (A) according to the preliminary activating polymerization as the (a) component. The limiting viscosity $[\eta_P]$ of the a polypropylene·α-olefin random copolymer composition as the (b) component was 1.83 dl/g.

(4) Addition of radical generators and pelletization

Polymer pellet was obtained by the same conditions as in Example 2-1 (4) by using an extruding pelletizer. Various physical properties of the pellets were measured and evaluated. As shown in Table 2-3, the MFR was 6.1 g/10 minutes and the melt tension (MS) was 1.5 cN.

Comparative Example 2-8

The supported titanium catalyst slurry was obtained under the same conditions as in comparative example 2-2. By using this supported titanium catalyst slurry, propylene·α-olefin copolymer composition was produced under the same conditions as in example 2-8 (3) and granulated and pelletized by using the extruding pelletizer under the same conditions as in example 2-1 (4). The results of the evaluation of the various physical properties of the obtained pellet are shown in Table 2-3.

TABLE 2-3

|  | Examples | | Comparative Example | |
|---|---|---|---|---|
|  | 2-7 | 2-8 | 2-7 | 2-8 |
| Preliminary polymerization (polypropylene (B)) | | | | |
| Limiting viscosity [$\eta_B$](dl/g) | 2.7 | 2.8 | 2.7 | 2.8 |
| Amount of production *1 (g/g) | 1.2 | 2.0 | 1.2 | 2.0 |
| Composition ratio *2 (wt. %) | 0.01 | 0.02 | 0.01 | 0.02 |
| Preliminary activation (polyethylene (A)) | | | | |
| Limiting viscosity [$\eta_A$](dl/g) | 30.2 | 34.0 | — | — |
| Amount of production *1 (g/g) | 32.0 | 22.0 | — | — |
| Composition ratio *2 (wt. %) | 0.01 | 0.24 | — | — |
| Additional polymerization (polypropylene (C)) | | | | |
| Limiting viscosity [$\eta_C$](dl/g) | 2.8 | 2.8 | 2.8 | 2.8 |
| Amount of production *1 (g/g) | 2.2 | 2.0 | 2.2 | 2.0 |
| Composition ratio *2 (wt. %) | 0.01 | 0.02 | 0.01 | 0.02 |
| Polymerization(I) process | | | | |
| Ethylene (wt %) | 0 | 2.7 | 0 | 2.5 |
| Limiting viscosity [$\eta^D$](dl/g) | 2.32 | 1.83 | 2.29 | 1.97 |
| Composition ratio *2 (wt. %) | 85.7 | 99.7 | 86.1 | 100 |
| Polymerization(II) process | | | | |
| Ethylene (wt %) | 57 | — | 56 | — |
| Limiting viscosity [$\eta^F$](dl/g) | 4.84 | — | 5.29 | — |
| Composition ratio *2 (wt. %) | 14.1 | — | 13.9 | — |
| Propylene copolymer Limiting viscosity [$\eta_P$](dl/g) | 2.63 | 1.83 | 2.71 | 1.97 |
| Radical generators (X)*3 | 0.01 | 0.01 | 0.01 | 0.01 |
| (Modified) propylene polymer composition | | | | |
| ethylene (wt %) | 8.2 | 2.9 | 7.8 | 2.5 |
| Limiting viscosity [$\eta_T$](dl/g) | 2.39 | 1.80 | 2.43 | 1.85 |
| Melt tension (MS) (cN) | 4.0 | 1.5 | 2.0 | 0.38 |
| MFR (g/10 minutes) | 1.1 | 6.1 | 1.0 | 5.1 |

Remarks:
*1: amount of production per gram of the transition metal compound catalyst component (g)
*2: composition ratio for the propylene (co)polymer composition (wt %)
*3: 2,5-dimethyl-2,5-di(t-butyl peroxy) hexane As explained above by way of embodiments and examples, the modified olefin (co)polymer of the present invention can be obtained by the method comprising the steps of forming the high molecular weight polyethylene by the preliminary polymerization and adding the high molecular weigh polyethylene in the main polymerization of olefin such as polypropylene so as to obtain olefin (co)polymer composition in which the above-mentioned high molecular polyethylene is finely dispersed as a fine particles in polyolefin such as polypropylene, and forming a cross-linked structure in this olefin (co)polymer composition. Such a structure can provided the modified olefin (co)polymer composition that has improved strength expressed by the melt tension or the like and improved crystalline temperature, is excellent in molding properties such as high productivity; the molded modified olefin (co)polymer composition that is excellent in physical property such as heat resistance and rigidity and the method for producing the same.

Industrial Applicability

In order to exhibit the above-mentioned effect, the modified olefin (co)polymer composition of the present invention and the molded modified olefin (co)polymer composition can be used for various kinds of industrial components, various containers such as hollow containers etc., a film, a sheet, a pipe, fiber and other various moldings by the method of hollow molding, foaming molding, extruding molding, thermal molding, injection molding, T-die molding, and the like.

What is claimed is:

1. A modified olefin (co)polymer composition comprising: an olefin (co)polymer composition containing;
   (a) 0.01 to 5.0 parts by weight of high-molecular weight polyethylene that is an ethylene homopolymer or an ethylene-olefin copolymer containing 50 weight % or more of ethylene polymerization units and has a limiting viscosity [$\eta_E$] measured in tetralin at 135° C. in the range from 15 to 100 dl/g; and
   (b) 100 parts by weight of an olefin (co)polymer other than said high molecular weight polyethylene;
   (c) wherein said high molecular weight polyethylene is finely dispersed as fine particles having a numerical average particle size of 1 to 5000 nm, and a cross-linked structure is formed in said olefin (co)polymer composition.

2. The modified olefin (co)polymer composition according to claim 1, wherein said cross-linked structure is formed by irradiating the olefin (co)polymer composition with ionizing radiation and then heating the irradiated olefin (co)polymer composition.

3. The modified olefin (co)polymer composition according to claim 2, wherein the ionizing radiation is at least one selected from the group consisting of a γ ray and an electron ray, and a dose of said ionizing radiation is in the range from 0.1 to 1000 KGy.

4. The modified olefin (co)polymer composition according to claim 2, wherein the heating temperature is in the range from 60 to 350° C.

5. The modified olefin (co)polymer composition according to claim 1, wherein said cross-linked structure is formed by mixing a radical generator with the olefin (co)polymer composition and by melting and kneading the mixed composition.

6. The modified olefin (co)polymer composition according to claim 5, wherein said olefin (co)polymer composition is mixed with 0.001 to 0.5 parts by weight of a radical generator with respect to 100 parts by weight of the olefin (co)polymer other than the high-molecular weight polyethylene.

7. The modified olefin (co)polymer composition according to claim 5, wherein the melting and kneading temperature is in the range from 150 to 300° C.

8. The modified olefin (co)polymer composition according to claim 1, wherein the numerical average particle size of the high molecular weight polyethylene is in the range from 10 to 500 nm.

9. The modified olefin (co)polymer composition according to claim 1, wherein the limiting viscosity [η] measured in tetralin at 135° C. of the olefin (co)polymer composition is in the range from 0.2 to 10 dl/g.

10. The modified olefin (co)polymer composition according to claim 1, wherein the olefin (co)polymer other than the high molecular weight polyethylene is at least one selected from the group consisting of a propylene homopolymer and a propylene-olefin copolymer containing 50 weight % or more of propylene polymerization units.

11. The modified olefin (co)polymer composition according to claim 1, wherein the high molecular weight polyethylene is added before or during production of the olefin (co)polymer other than the high molecular weight polyethylene.

12. The modified olefin (co)polymer composition according to claim 1, wherein the olefin (co)polymer other than the high molecular weight polyethylene is at least one polymer selected from the group consisting of a propylene homopolymer and a propylene-olefin copolymer containing 50 weight % or more of propylene polymerization units, and said modified olefin (co)polymer composition satisfies the following formula:

$$log(MS) > 4.24 \times log[\eta_T] - 0.950$$

wherein MS denotes a melt tension at 230° C. and $[\eta_T]$ denotes a limiting viscosity measured at 135° C. of the modified olefin (co)polymer composition.

13. The modified olefin (co)polymer composition according to claim 1, wherein the olefin (co)polymer other than the high molecular weight polyethylene is a propylene homopolymer or a propylene-olefin copolymer containing 50 weight % or more of propylene polymerization units, and the modified olefin (co)polymer composition satisfies the following formula:

$$4.24 \times log\ [\eta_T] + 0.60 > log(MS) > 4.24 \times log\ [\eta_T] - 0.950$$

wherein MS denotes a melt tension at 230° C. and $[\eta_T]$ denotes a limiting viscosity measured at 135° C. of the modified olefin (co)polymer composition.

14. The modified olefin (co)polymer composition according to claim 1, wherein the olefin (co)polymer other than the high molecular weight polyethylene is an ethylene homopolymer or an ethylene-olefin copolymer containing 50 weight % or more of ethylene polymerization units.

15. The modified olefin (co)polymer composition according to claim 1, wherein 0.001 to 2 parts by weight of at least one stabilizer selected from the group consisting of a phenolic antioxidant and a phosphoric antioxidant is added with respect to 100 parts by weight of the modified olefin (co)polymer composition.

16. A molded modified olefin (co)polymer composition, which is obtained from the modified olefin (co)polymer composition as defined in claim 1.

17. A molded modified olefin (co)polymer composition obtained by: molding an olefin (co)polymer composition comprising;
  (a) at least 0.01 to 5.0 parts by weight of high molecular weight polyethylene that is an ethylene homopolymer or an ethylene-olefin copolymer containing 50 weight % or more of ethylene polymerization units and has a limiting viscosity $[\eta_E]$ measured in tetralin at 135° C. of 15 to 100 dl/g, and
  (b) 100 parts by weight of an olefin (co)polymer other than said high molecular weight polyethylene,
  (c) said high molecular weight polyethylene being finely dispersed as fine particles having a numerical average particle size of 1 to 5000 nm; and irradiating said molding.

18. A method for producing a modified olefin (co)polymer composition comprising the steps of:
  producing an olefin (co)polymer composition by (co)polymerizing olefin in the presence of a preliminarily activated catalyst comprising a polyolefin producing catalyst formed by the combination of a transition metal compound catalyst component, 0.01 to 1000 mol of organic metal compound (AL1) of a metal selected from the group consisting of metals that belong to group I, group II, group XII and group XIII of the periodic table published in 1991 with respect to 1 mol of the transition metal atom and 0 to 500 mol of an electron donor (E1) with respect to 1 mol of the transition metal atom; and a polyethylene supported by this catalyst, being an ethylene homopolymer or an ethylene-olefin copolymer containing 50 weight % or more of ethylene polymerization units, and having a limiting viscosity $[\eta]$ measured in tetralin of 135° C. of 15 to 100 dl/g in an amount of 0.01 to 5,000 g per gram of the transition metal compound catalyst component and
  forming a cross-linked structure in said olefin (co)polymer composition.

19. The method for producing a modified olefin (co)polymer composition according to claim 18, wherein the step of forming the cross-linked structure includes an irradiation with ionization radiation followed by heating.

20. The method for producing a modified olefin (co)polymer composition according to claim 19, wherein the ionizing radiation is at least one selected from the group consisting of a γ ray and an electron ray, and a dose of said ionizing radiation is in the range from 0.1 to 1000 KGy.

21. The method for producing a modified olefin (co)polymer composition according to claim 19, wherein the heating temperature is in the range from 60 to 350° C.

22. The method for producing a modified olefin (co)polymer composition according to claim 18, wherein the step of forming a cross-linked structure is a step of mixing a radical generator with the olefin (co)polymer composition and melting and kneading the mixed composition.

23. The method for producing a modified olefin (co)polymer composition according to claim 22, wherein the melting and kneading temperature is in the range from 150 to 300° C.

24. The method for producing a modified olefin (co)polymer composition according to claim 18, wherein the olefin to be (co)polymerized is propylene alone or a combination of propylene and olefin(s) having 2 to 12 carbon atoms, and the olefin copolymer is a propylene homopolymer or a propylene-olefin copolymer comprising propylene and olefin(s) having 2 to 12 carbon atoms and containing 50 weight % or more of propylene polymerization units.

25. The method for producing a modified olefin (co)polymer composition according to claim 18, wherein, in addition to said preliminarily activated catalyst,
  (a) an organic aluminum compound (AL2) in the total amount of (AL2) and the organic aluminum compounds (AL1) included in the preliminarily activated catalyst of 0.05 to 5000 mol with respect to 1 mol of the transition metal atom in the preliminarily activated catalyst, and
  (b) an electron donor (E2) in the total amount of (E2) and the electron donors (E1) included in the preliminarily activated catalyst of 0 to 3000 mol with respect to 1 mol of the transition metal atom in the preliminarily activated catalyst are added.

26. The method for producing a modified olefin (co)polymer composition according to claim 18, wherein the amount of the catalyst is 0.01 to 1000 mmol converted into the transition metal atom in the catalyst for 1 liter of olefin (co)polymerization volume.

27. The method for producing a modified olefin (co)polymer composition according to claim 18, wherein the preliminarily activated catalyst further comprises a polypropylene supported by the catalyst in addition to the polyethylene, being a propylene homopolymer or a propylene-olefin copolymer containing 50 weight % or more of propylene polymerization units and having a limiting viscosity $[\eta_B]$ measured in tetralin at 135° C. of less than 15 dl/g and being in an amount of 0.01 to 100 g per gram of the transition metal compound catalyst component.

28. The method for producing a modified olefin (co)polymer composition according to claim 27, wherein the amount of the catalyst is 0.01 to 1000 mmol converted into the transition metal atom in the catalyst for 1 liter of olefin (co)polymerization volume.

29. The method for producing a modified olefin (co)polymer composition according to claim 18, wherein olefin(s) having 2 to 12 carbon atoms is main (co)polymerized in the presence of the preliminarily activated catalyst for (co)polymerizing olefin, which is obtained by a method of letting the transition metal compound catalyst component support a polyolefin (B) and polyolefin (A), said method comprising:

(a) a preliminary (co)polymerization step of (co)polymerizing olefin in the presence of the polyolefin producing catalyst formed by the combination of the transition metal compound catalyst component, 0.01 to 1000 mol of the organic metal compound (AL1) of the metal selected from the group consisting of metals that belong to group I, group II, group XII and group XIII of the periodic table published in 1991 with respect to 1 mol of the transition metal atom and 0 to 500 mol of the electron donor (E1) with respect to 1 mol of the transition metal atom, and thereby producing 0.01 to 100 g of the polyolefin (B) having a limiting viscosity $[\eta]$ measured in tetralin at 135° C. of less than 15 dl/g per gram of the transition metal compound catalyst component; and (b) a subsequent preliminary activating (co)polymerization step of (co)polymerizing olefin and producing 0.01 to 5,000 g of the polyolefin (A) having a limiting viscosity $[\eta]$ measured in tetralin of 135° C. of 15 to 100 dl/g per gram of the transition metal compound catalyst component.

30. The method for producing a modified olefin (co)polymer composition according to claim 18, wherein olefin is main (co)polymerized in the presence of a catalyst for (co)polymerizing olefin comprising:

(a) the preliminarily activated catalyst for (co)polymerizing olefin, which is obtained by a method of letting the transition metal compound catalyst component support a polyolefin (B) and polyolefin (A), said method comprising: a preliminary (co)polymerization step of (co)polymerizing olefin in the presence of the polyolefin producing catalyst formed by the combination of the transition metal compound catalyst component, 0.01 to 1000 mol of the organic metal compound (AL1) of the metal selected from the group consisting of metals that belong to group I, group II, group XII and group XIII of the periodic table published in 1991 with respect to 1 mol of the transition metal atom and 0 to 500 mol of the electron donor (E1) with respect to 1 mol of the transition metal atom and thereby producing 0.01 to 100 g of the polyolefin (B) having a limiting viscosity $[\eta]$ measured in tetralin at 135° C. of less than 15 dl/g per gram of the transition metal compound catalyst component; and a sequent preliminary activating (co)polymerization step of (co)polymerizing olefin(s) and producing 0.01 to 5,000 g of the polyolefin (A) having a limiting viscosity $[\eta]$ measured in tetralin of 135° C. of 15 to 100 dl/g per gram of the transition metal compound catalyst component;

(b) an organic metal compound (AL2) of a metal selected from the group consisting of metals that belong to group I, group II, group XII and group XIII of the periodic table published in 1991 in the total amount of (AL2) and the organic metal compound (AL1) included in the preliminarily activated catalyst of 0.05 to 5,000 mol with respect to 1 mol of the transition metal atom in the preliminarily activated catalyst; and (c) an electron donor (E2) in the total amount of E2 and the electron donor (E1) included in the preliminarily activated catalyst of 0 to 3000 mol with respect to 1 mol of the transition metal atom in the preliminarily activated catalyst.

* * * * *

UNITED STATES PATENT AND TRADEMARK OFFICE
CERTIFICATE OF CORRECTION

PATENT NO. : 6,231,804 B1
DATED : May 15, 2001
INVENTOR(S) : Yamauchi et al.

It is certified that error appears in the above-identified patent and that said Letters Patent is hereby corrected as shown below:

<u>Title page,</u>
Item [56], References Cited: "5,468,440 11/1995 McAlphin et al" should read -- 5,468,440 11/1995 McAlphin et al., -- and "6,257,408 5/2000 Winter et al." should read -- 6,057,408 5/2000 Winter et al. --

Signed and Sealed this

Seventh Day of May, 2002

Attest:

Attesting Officer

JAMES E. ROGAN
Director of the United States Patent and Trademark Office